United States Patent [19]
Ikeda et al.

[11] Patent Number: 5,903,546
[45] Date of Patent: May 11, 1999

[54] MEANS AND METHOD OF IMPROVING MULTIPLEXED TRANSMISSION AND RECEPTION BY CODING AND MODULATING DIVIDED DIGITAL SIGNALS

[75] Inventors: Tamotsu Ikeda, Tokyo; Yasunari Ikeda, Kanagawa; Takahiro Okada, Chiba, all of Japan

[73] Assignee: Sony Corporation, Tokyo, Japan

[21] Appl. No.: 08/632,411

[22] PCT Filed: Aug. 31, 1995

[86] PCT No.: PCT/JP95/01736

§ 371 Date: Jul. 18, 1996

§ 102(e) Date: Jul. 18, 1996

[87] PCT Pub. No.: WO96/07260

PCT Pub. Date: Mar. 7, 1996

[30] Foreign Application Priority Data

Aug. 31, 1994 [JP] Japan .................................. 6-207806
Oct. 14, 1994 [JP] Japan .................................. 6-249601

[51] Int. Cl.[6] ........................................................ H04J 3/22
[52] U.S. Cl. ........................ 370/232; 370/235; 375/262; 375/265; 371/43.1
[58] Field of Search .................................. 370/232, 233, 370/234, 235, 343; 375/201, 202, 260, 265, 262; 371/43.1, 41, 37.1

[56] References Cited

U.S. PATENT DOCUMENTS

| | | | |
|---|---|---|---|
| 4,881,241 | 11/1989 | Pommier et al. | 375/285 |
| 5,258,987 | 11/1993 | Wei | 371/43 |
| 5,278,826 | 1/1994 | Murphy et al. | 370/343 |
| 5,673,291 | 9/1997 | Dent | 375/262 |

*Primary Examiner*—Douglas W. Olms
*Assistant Examiner*—Shick Hom
*Attorney, Agent, or Firm*—Frommer Lawrence & Haug LLP; William S. Frommer

[57] ABSTRACT

The present invention is used for example digital television broadcasting and provides a good television picture and sound where the signal level is large on the reception side and provides a television picture and sound of a certain degree of quality even in a case where the signal level is small. The signal transmitting apparatus (10) divides the series of input information in accordance with the significance of the content of the data to obtain a plurality of input signals, encodes the input signals with respectively different encoding rates, multiplexes the same at the time slots for transmission, modulates the same by multi-value modulation methods different for every time slot corresponding to the coded signals, and transmits the resultant data via the communication transmission line (20) such as a satellite communication channel to the signal receiving apparatus (30). The signal receiving apparatus (30) demodulates the respective coded signals from the modulated signals received from the communication transmission line (20) by demodulation methods different for every time slot corresponding to the coded signals contained in the received signals, demultiplexes the same, decodes the result, and reproduces the respective input signals.

28 Claims, 32 Drawing Sheets

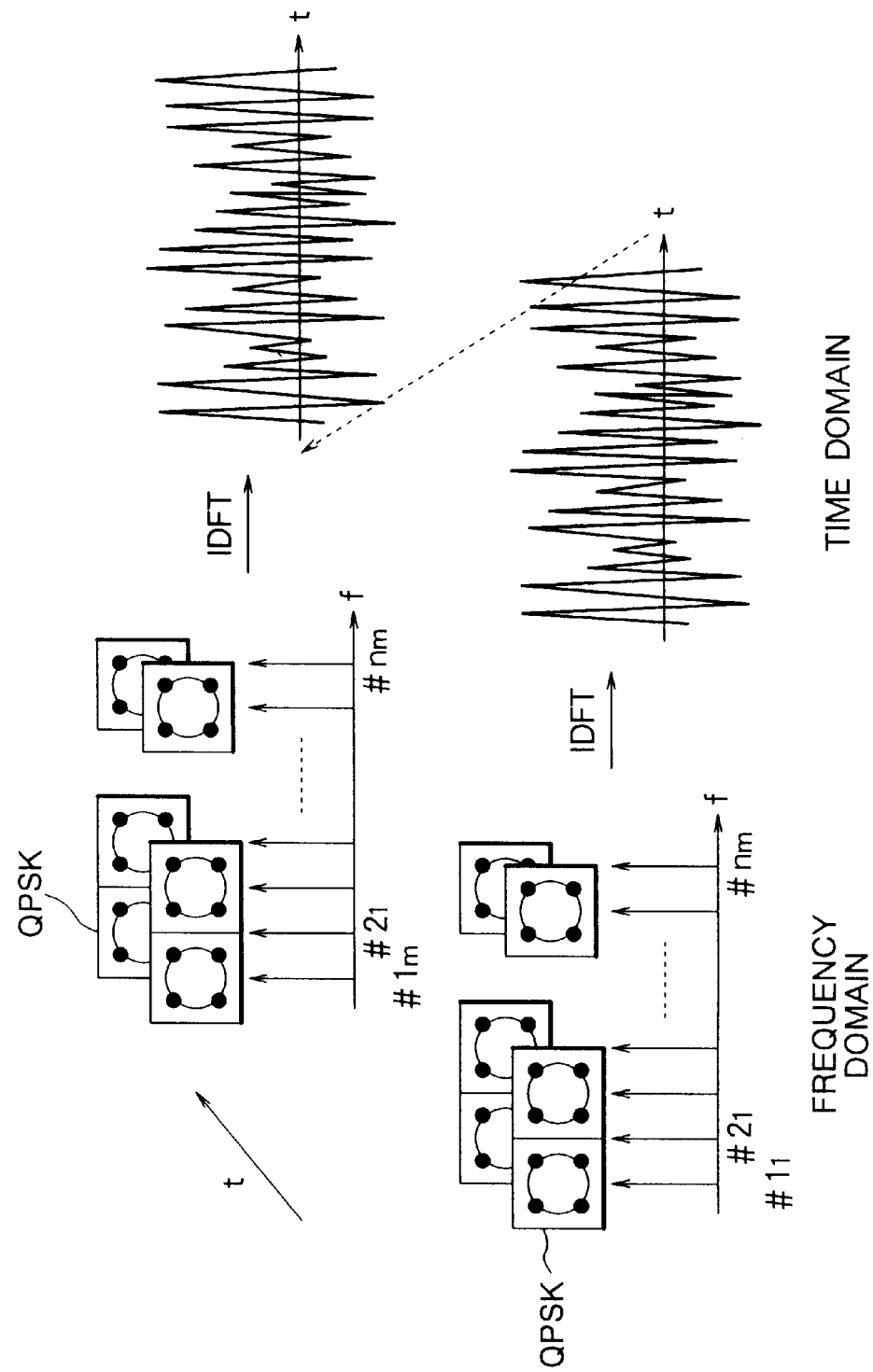

FIG. 24A
FIG. 24B
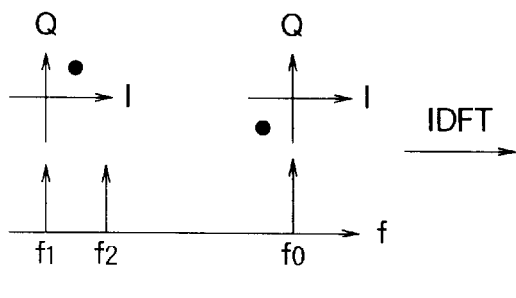
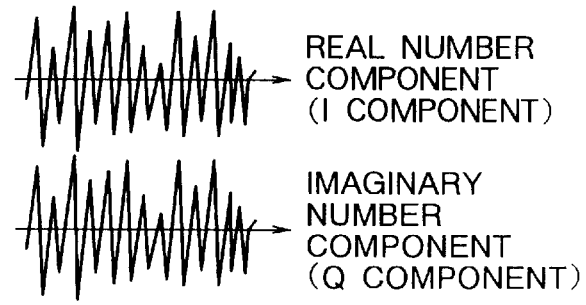
FIG. 24C

MEANS AND METHOD OF IMPROVING MULTIPLEXED TRANSMISSION AND RECEPTION BY CODING AND MODULATING DIVIDED DIGITAL SIGNALS

TECHNICAL FIELD

The present invention relates to a signal transmitting apparatus, a signal receiving apparatus, and a method for the same used for transmitting data of a digital format via a transmission channel such as a wireless line.

BACKGROUND ART

Where data of a digital format is transmitted via a communication channel (transmission channel) in which data error (transmission error) is liable to occur, in general, a method of transmitting the data after performing a predetermined encoding on the data to be transmitted.

For example, where data is transmitted via a wireless channel, particularly, where data is transmitted via a satellite communication channel, the strength of the received signal (signal level) at the reception side becomes very low, so data error is liable to occur. Further, even in a case where data is transmitted via a communication channel using a ground wave (ground wave communication channel), the reception level becomes low at the region at the end of the service range, so data error becomes liable to occur.

Accordingly, where the data to be transmitted is encoded with a high compression rate by the high-efficient coding method, it is necessary to take strict countermeasures against data error at the step of decoding on the reception side.

For example, in the decoding on the reception side, there is a case where data other than the data in which the data error occurs is affected (data error is propagated). In such a case, it is particularly necessary to take strict countermeasures against data error.

Due to the above situation, when transmitting data via a satellite communication channel, since the carrier-to-noise ratio (C/N ratio) of the reception signal becomes small, in general, after the data of the digital format to be transmitted is encoded using a block code such as a Reed-Solomon code, it is further encoded for correction of transmission line error by convolutional coding to generate a transmission line code.

The method has been adopted of transmitting the transmission line code subjected to countermeasures against data error in this way via the communication line after modulation by QPSK modulation method etc.

On the other hand, in a ground wave communication line in which a C/N ratio of the reception signal better than that of a satellite communication line is obtained, to raise the transmission efficiency, data is frequently transmitted by modulating the transmission code by a multi-value modulation method such as a 16-QAM or 32-QAM method.

Further, recently, as a transmission line coding system combining error correction technology and modulation technology, code modulation systems are now being used. Among the code modulation systems, one using a Trellis code as the error correction code is referred to as the Trellis code modulation (TCM) system.

In general, a method using an error correction code for the transmission of data has the characteristic that when the encoding rate is made small, that is, when the ratio between the amount of information to be transmitted and the amount of information actually transmitted on the communication line is made small, the error correction capability becomes high, but the transmission efficiency (throughput) of the digital information to be transmitted is lowered, and conversely when the encoding rate is made large, the throughput becomes large, but the error correction capability becomes low.

On the other hand, transmission of data via a satellite communication line has the characteristic that the level of reception fluctuates greatly according to the gain of the reception antenna or the weather conditions.

Further, transmission of data via a ground wave communication line has the characteristic that the level of reception fluctuates according to the positional relationship between the transmission side and the reception side. That is, where the reception side is at an area near the transmission side, the level of reception becomes high, but when the reception side is at an area distant from the transmission side, the level of reception becomes low.

When transmitting data via these wireless communication channels, when the level of reception is low, the C/N ratio becomes small and data error becomes liable to occur. When the C/N ratio becomes further smaller and data error exceeding the error correction capability possessed by the transmission code is caused, the data error can no longer be corrected. That is, when subjecting the data to high-efficient coding, if the C/N ratio is degraded on the reception side, the original data can no longer be correctly reproduced.

Here, a concrete explanation will be made of the problems in transmission of data via a wireless communication channel and the countermeasures taken with respect to these problems by taking as an example a case where a television signal of digital format subjected to the high-efficient coding is transmitted.

FIG. 1 is a view showing the relationship between the carrier-to-noise ratio (C/N ratio) on the reception side and the signal-to-noise ratio (SIN ratio) of a reproduced television signal when transmitting a television signal via a wireless communication channel and the possibility of reproduction of the data.

FIG. 2 is a view showing the desirable relationship between the C/N ratio on the reception side and the S/N ratio of a reproduced television signal when transmitting a television signal via a wireless communication channel and the possibility of reproduction of the data.

Note that, the signal-to-noise ratio (S/N ratio) of the ordinates of FIG. 1 and FIG. 2 is a value determined by encoding performed on the transmission side on the data to be transmitted.

As indicated by the hatching in FIG. 1, on the reception side, in a region where a predetermined value or more of the C/N ratio of the received signal is secured (reception level II), the data of the television signal can be completely decoded from the received signal, so a good television picture can be reproduced.

On the other hand, at the reception side, in a region where the C/N ratio of the received signal becomes less than the predetermined value (reception level I), the television signal cannot be correctly decoded due to data error, so it becomes completely impossible to reproduce the television picture.

In an actual television broadcast, however, as shown in FIG. 2, it is desirable that the quality of reception of the television signal (S/N ratio) change according to the change of the C/N ratio on the reception side.

That is, desirably, in an actual television broadcast, as shown in FIG. 2, on the reception side, in a region where the signal level is high and a good C/N ratio is obtained (reception level III), a high quality television picture and sound are reproduced, while in the region where the reception level has become slightly higher than the reception level III (reception level II), a television picture and sound having a slightly lower quality are reproduced.

This is desirable because, as shown in FIG. 1, when the C/N ratio becomes less than a certain level, it is more desirable for the TV viewer that, as shown in FIG. 2, while the quality is lowered when the C/N ratio is lowered, a video signal of an extent enabling the content of the picture to be understood be reproduced at the reception side rather than it becoming completely impossible to reproduce the television signal on the reception side.

In order to realize the relationship between the C/N ratio and SIN ratio of the received signal as shown in FIG. 2, on the transmission side, it is necessary to use a hierarchical procedure in the encoding of the data to be transmitted. That is, the procedure of, at the transmission side, transmitting the data to be transmitted encoded hierarchically divided to absolutely necessary important information and additional information and, at the reception side, receiving all of the data at a high transmission speed when the signal level is high and receiving only the important information which is absolutely necessary for the reproduction at a low transmission speed when the signal level on the reception side is low, in other words, the procedure of data transmission enabling change of the throughput corresponding to the state of reception on the reception side, becomes necessary.

The present invention was made in consideration of the problems of the related art explained above and has as an object thereof to provide a signal transmitting apparatus, a signal receiving apparatus, and a method therefore whereby, when for example transmitting a television signal in a digital format, a good television picture and sound can be provided when the signal level is high on the reception side and, at the same time, a certain degree of quality of television picture and sound can be provided even in a case when the signal level is low, i.e., so-called "graceful degradation" can be realized.

Another object of the present invention is to provide a signal transmitting apparatus, a signal receiving apparatus, and a method thereof which can realize the above-mentioned relationship between the C/N ratio of the received signal and the S/N ratio of the reproduced data, that is, a relationship where when the C/N ratio of the received signal on the reception side become less than a certain value, the S/N ratio of the reproduced data is lowered according to the C/N ratio.

Still another object of the present invention is to provide a signal transmitting apparatus, a signal receiving apparatus, and a method thereof which can perform data transmission with a throughput in accordance with the state of reception, that is, the C/N ratio of the received signal.

DISCLOSURE OF INVENTION

To attain the above objects, the signal transmitting apparatus according to the present invention is provided with an encoding means for performing error correction coding on a plurality of input signals with encoding rates corresponding to the respective input signals to generate a plurality of encoded signals, a multiplexing means for multiplexing the plurality of encoded signals in a predetermined order, and a modulating means for modulating and outputting the multiplexed encoded signals.

Preferably, the encoding means encodes the respective plurality of input signals with encoding rates smaller the higher the significance of the input signals and encodes the same with encoding rates larger the lower the significance of the input signals.

Preferably, the plurality of input signals constitute one signal as a whole and are divided to n number of input signals in accordance with their significance and, corresponding to the n number of input signals, the encoding means has n number of systems of block coding means for performing block coding on the input signals, interleaving means for interleaving the input signals subjected to the block coding, and convolutional coding means for performing convolutional coding on the interleaved input signals.

Preferably, the encoding rates are changed by changing the configurations of the n number of systems of convolutional coding means.

Preferably, the apparatus further has a puncturing means for puncturing the signal encoded by the convolutional coding means, and the encoding rates are changed by the puncturing.

Preferably, the plurality of input signals constitute one signal as a whole and are divided into n number of input signals in accordance with their significance and, corresponding to the respective n number of input signals, the encoding means has n number of systems of means for performing block coding on the input signals, interleaving means for interleaving the input signals subjected to the block coding, and Trellis coding means for performing the Trellis coding on the interleaved input signals.

Preferably, the modulating means modulates the multiplexed plurality of encoded signals by individual multi-value modulation methods corresponding to the significance of the input signals.

Preferably, the modulating means performs the modulation by a multi-value modulation method in which the higher the significance of the encoded signals, the smaller the amount of information per signal point and performs the modulation by a multi-value modulation method in which the lower the significance of the encoded signals, the larger the amount of information per signal point.

Preferably, the apparatus further has a transforming means for transforming the multiplexed encoded signals from signals of a frequency domain to signals of a time domain to generate time domain signals, and the modulating means performs OFDM modulation on the output from the converting means and outputs the result.

Preferably, a plurality of OFDM modulation carriers are assigned to the respective plurality of input signals and the modulation is carried out by the same modulation system in all of the OFDM modulation carriers.

Preferably, the apparatus further has a transforming means for transforming the multiplexed encoded signals from signals of a frequency domain to signals of a time domain to generate time domain signals and the modulating means performs OFDM modulation on the output from the transforming means and outputs the result.

Preferably, a plurality of OFDM modulation carriers are assigned to the respective plurality of input signals, and the modulation is carried out changing the modulation system for the respective plurality of OFDM carriers corresponding to the respective input signals.

In the signal transmitting apparatus according to the present invention, the encoding means performs encoding by forming a hierarchy of a plurality of input signals constituting one transmission signal, for example, a television broadcast signal as a whole, that is, for example, a significant basic signal necessary for the reproduction of the basic picture and sound and an additional signal necessary for improvement of the picture quality. That is, the encoding means generates respective encoded signals by encoding the basic signal with a low encoding rate with which error correction can be easily carried out even if the signal receives noise or the like on the communication transmission line and by encoding the additional signal with a encoding rate with which the error correction is not easy but the transmission efficiency is high where the signal receives noise etc. on the communication transmission line.

The multiplexing means multiplexes the generated encoded signals.

The modulating means modulates the multiplexed encoded signals by the multi-value modulation systems corresponding to the respective encoded signals. That is, the modulating means modulates the encoded signal of the basic signal by a multi-value modulation system in which the amount of information per signal point is small and modulates the encoded signal of the additional signal by a multi-value modulation system in which the amount of information per signal point is small.

In this way, an input signal having a high significance (basic signal) is encoded with a low encoding rate in which error correction can be easily carried out and further modulated by a modulation system in which the signal is resistant to noise etc. on the communication transmission line so as to enable reliable reception even in a case where the C/N ratio on the reception side is low.

Further, an input signal having a low significance (additional signal) is encoded with a high encoding rate which is inferior in error correction but has a good transmission efficiency and further modulated by a modulation system by which the transmission rate can be raised and the increase of the width of the transmission band in the communication transmission line is prevented.

The signal receiving apparatus according to the present invention is a signal receiving apparatus which receives a transmission signal obtained by multiplexing in a predetermined order a plurality of encoded signals prepared by performing error correction coding on the respective plurality of input signals with encoding rates corresponding to the respective plurality of input signals and by modulating the multiplexed plurality of encoded signals, comprising a demodulating means for demodulating the modulated transmission signal to generate a demodulated signal, a demultiplexing means for demultiplexing the multiplexed plurality of encoded signals from the demodulated signal, and a decoding means for decoding the respective demultiplexed plurality of encoded signals by error correction decoding systems corresponding to the respective plurality of encoded signals and outputting the same as the decoded signals.

Preferably, the plurality of input signals constitute one signal as a whole and are divided into n number of input signals in accordance with their significance, the respective plurality of input signals are encoded with encoding rates smaller the higher the significance of the input signals and encoded with encoding rates larger the lower the significance of the input signals, and the decoding means outputs only the decoded signals in which uncorrectable error is not generated among the decoded n number of decoded signals.

Preferably, the respective multiplexed plurality of encoded signals are modulated by individual multi-value modulation methods corresponding to the significance of the input signals, and the demodulating means demodulates the received transmission signal by a demodulation system corresponding to the modulation system used for the modulation on the transmission side.

Preferably, the respective n number of input signals are subjected to block coding, interleaving, and convolutional coding and then multiplexed and modulated, and the decoding means comprises a Viterbi decoding means for performing Viterbi decoding for the plurality of encoded signals demultiplexed by the demultiplexing means, a deinterleaving means for deinterleaving the signal subjected to the Viterbi decoding, and a block decoding means for performing block decoding on the deinterleaved signal.

Preferably, the multiplexed encoded signals are transformed from signals of a frequency domain to signals of a time domain, a plurality of OFDM modulation carriers assigned to the respective plurality of input signals are used, and, at the same time, the OFDM modulation is performed by the same modulation system in all OFDM carriers, the demodulating means comprises an OFDM demodulating means for performing demodulation by the same demodulation system in all of the OFDM modulation carriers, and a transforming means for transforming the demodulated signals from time domain signals to frequency domain signals.

Preferably, the respective n number of input signals are subjected to block coding, interleaving, and Trellis coding, and then multiplexed and modulated, and the decoding means comprises a Viterbi decoding means for performing Viterbi decoding on the plurality of encoded signals demultiplexed by the demultiplexing means, a deinterleaving means for deinterleaving the Viterbi-decoded signal, and a block decoding means for performing block decoding on the deinterleaved signal.

Preferably, the multiplexed encoded signals are transformed from signals of a frequency domain to signals of a time domain, a plurality of OFDM modulation carriers assigned to the respective plurality of input signals are used, and, at the same time, the OFDM modulation is performed changing the modulation system for each of the plurality of OFDM carriers corresponding to the respective input signals, and the demodulating means performs the demodulation changing the demodulation system for each of the plurality of OFDM carriers corresponding to the respective input signals.

The signal receiving apparatus according to the present invention is an apparatus which reproduces the input signal from the received signal transmitted from the signal transmitting apparatus according to the present invention via a predetermined communication transmission line. In the signal receiving apparatus according to the present invention, the demodulating means respectively demodulates the encoded signals contained in the received signal by the demodulation system corresponding to the modulation system used in the modulation means of the signal transmitting apparatus.

The demultiplexing means demultiplexes the respective encoded signals demodulated by the demodulating means.

The decoding means decodes the respective encoded signals by a decoding means corresponding to the encoding system of encoding applied to the respective encoded signals in the encoding means of the signal transmitting apparatus to reproduce the input signal.

Where the decoding system in the demodulating means and the encoding means which becomes the object of the decoding do not match, correct decoding cannot be carried out. For this reason, a match (synchronization) between them is promoted by changing the decoding system for the encoded signal by the input changing means so as to achieve a match between the decoding system and the encoding means until at least one of the error rates after decoding of the encoding means becomes less than a predetermined value.

The signal transmitting and receiving method according to the present invention is a signal transmitting and receiving method which divides the digital signals constituting one signal as a whole into a plurality of input signals in accordance with their significance, applies error correction coding and modulation to them, and transmits the same to the reception side via a transmission line, wherein, on the transmission side, a plurality of encoded signals obtained by performing error correction coding on a respective plurality of divided input signals with encoding rates corresponding to the respective plurality of input signals are multiplexed in a predetermined order and the multiplexed plurality of encoded signals are modulated and transmitted, and, on the reception side, the received modulated transmission signal is demodulated, a plurality of encoded signals are demultiplexed from the demodulated signal, and the demultiplexed plurality of encoded signals are respectively decoded by error correction decoding systems corresponding to the respective plurality of encoded signals and output as decoded signals.

Preferably, in the error correction coding on the transmission side, the higher the significance of the input signal, the smaller the encoding rate by which the input signal is encoded and the lower the significance of the input signal, the larger the encoding rate by which the encoding is carried out.

Preferably, on the transmission side, the respective multiplexed plurality of encoded signals are modulated by individual multi-value modulation methods corresponding to the significances of the input signals, and, on the reception side, the received transmission signal is demodulated by demodulation systems corresponding to the modulation systems by which the received transmission signal was modulated on the transmission side.

Preferably, on the transmission side, the higher the significance of the encoded signal, the smaller the amount of information per signal point of the multi-value modulation method by which the modulation is carried out and the lower the significance of the encoded signal, the larger the amount of information per signal point of the multi-value modulation method by which the modulation is carried out.

Preferably, on the transmission side, the multiplexed encoded signals are transformed from signals of a frequency domain to signals of the time domain, the transformed signals are subjected to OFDM modulation and output, and on the reception side, the received signals are subjected to OFDM demodulation, and the demodulated signals are transformed from signals of the time domain to signals of the frequency domain and demultiplexed to the plurality of encoded signals.

Preferably, on the transmission side, as the error correction coding, block coding, interleaving, and convolutional coding are carried out, and, on the reception side, as the error correction decoding, Viterbi decoding, deinterleaving, and block decoding are carried out.

Preferably, on the transmission side, a plurality of OFDM modulation carriers are assigned to the respective plurality of input signals and the modulation is carried out by the same modulation system in all OFDM modulation carriers.

Preferably, on the transmission side, as the error correction coding, block coding, interleaving, and Trellis coding are carried out and, on the reception side, as the error correction decoding, Viterbi decoding, deinterleaving and block decoding are carried out.

Preferably, on the transmission side, a plurality of OFDM modulation carriers are assigned to the respective plurality of input signals, and the modulation is carried out while changing the modulation system for each of the plurality of OFDM carriers corresponding to the respective input signals.

BRIEF DESCRIPTION OF DRAWINGS

FIG. 23 is a view of a situation where the time domain signal generated in an IDFT circuit shown in FIG. 20 is output as the sum of the time direction to the modulation circuit.

FIG. 24A to FIG. 24C are views explaining the situation where a real number component and an imaginary number component of the time domain signal generated in the IDFT circuit shown in FIG. 20 are subjected to orthogonal modulation.

BEST MODE FOR CARRYING OUT THE INVENTION

First embodiment

Below, a first embodiment of the present invention will be explained referring to FIG. 3 to FIG. 8.

In the first embodiment, the principle of the present invention is explained by taking as an example a signal transmission system 1 according to the present invention.

Figure 3:
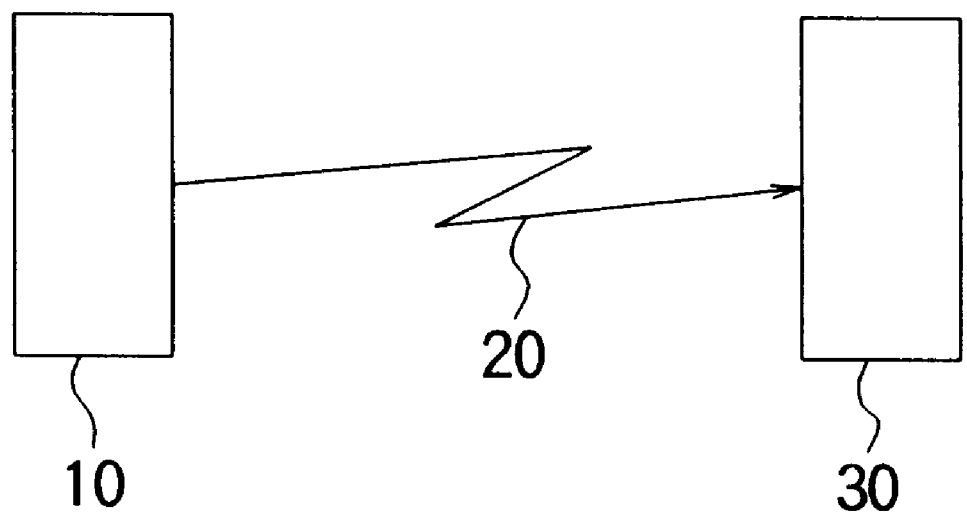
FIG. 3 is a view of the configuration of a signal transmission system according to a first embodiment of the present invention.

FIG. 3 is a view of the configuration of the signal transmission system according to the first embodiment of the present invention.

As shown in FIG. 3, the signal transmission system 1 is constituted by a signal transmitting apparatus (StR) 10, a communication transmission line 20, and a signal receiving apparatus (SRV) 30.

Figure 4:
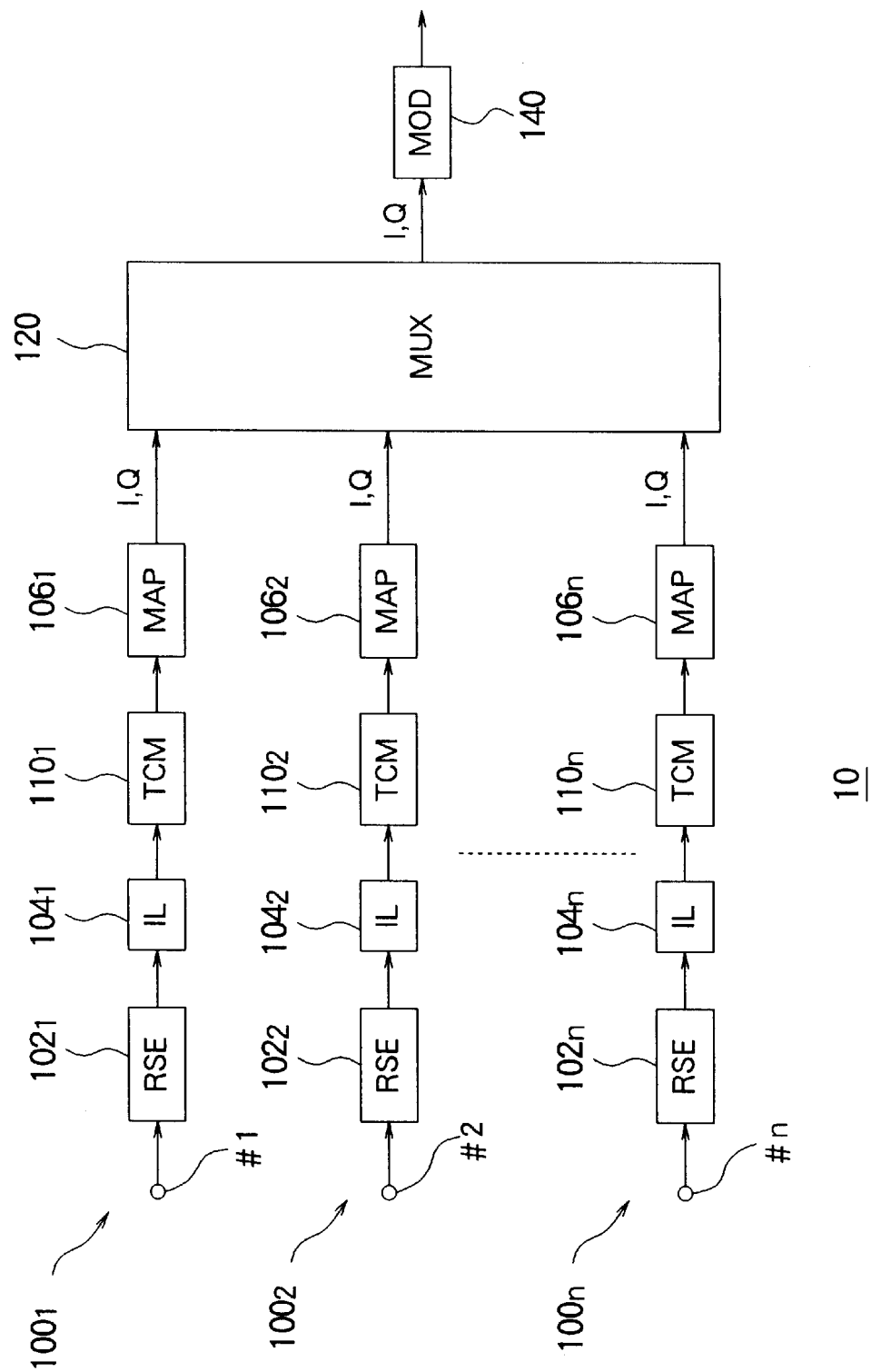
FIG. 4 is a view of the configuration of a signal transmitting apparatus shown in FIG. 3.

FIG. 4 is a view of the configuration of the signal transmitting apparatus 10 shown in FIG. 3.

As shown in FIG. 4, the signal transmitting apparatus 10 is constituted by n number of encoding circuits $100_i$ (i and n are integers, $1 \leq i \leq n$, the same below in the first embodiment) provided corresponding to the respective input signals $IN_1$ to $IN_n$, a multiplexing circuit (MUX) 120, and a modulation circuit 140.

The respective encoding circuits $100_i$ are constituted by input terminals #i, Reed-Solomon encoding circuits (RSE) $102_i$, interleave circuits (IL) $104_i$, Trellis coding circuits (TCM) $110_i$, and mapping circuits (MAP) $106_i$.

By these constituent parts, in the signal transmission system 1, the signal transmitting apparatus 10 divides the data to be transmitted (series of input information) in accordance with the significance of the content of that data to obtain a plurality of input signals $IN_1$ to $IN_n$ (series of information), performs Trellis coding for the input signals $IN_1$ to $IN_n$ by respectively different encoding rates, multiplexes the same in the time slots for transmission, modulates the same by a multi-value modulation method different for every time slot corresponding to the encoded signals, and transmits the same to the signal receiving apparatus 30 via a communication transmission line 20 such as a satellite communication line.

Figure 5:
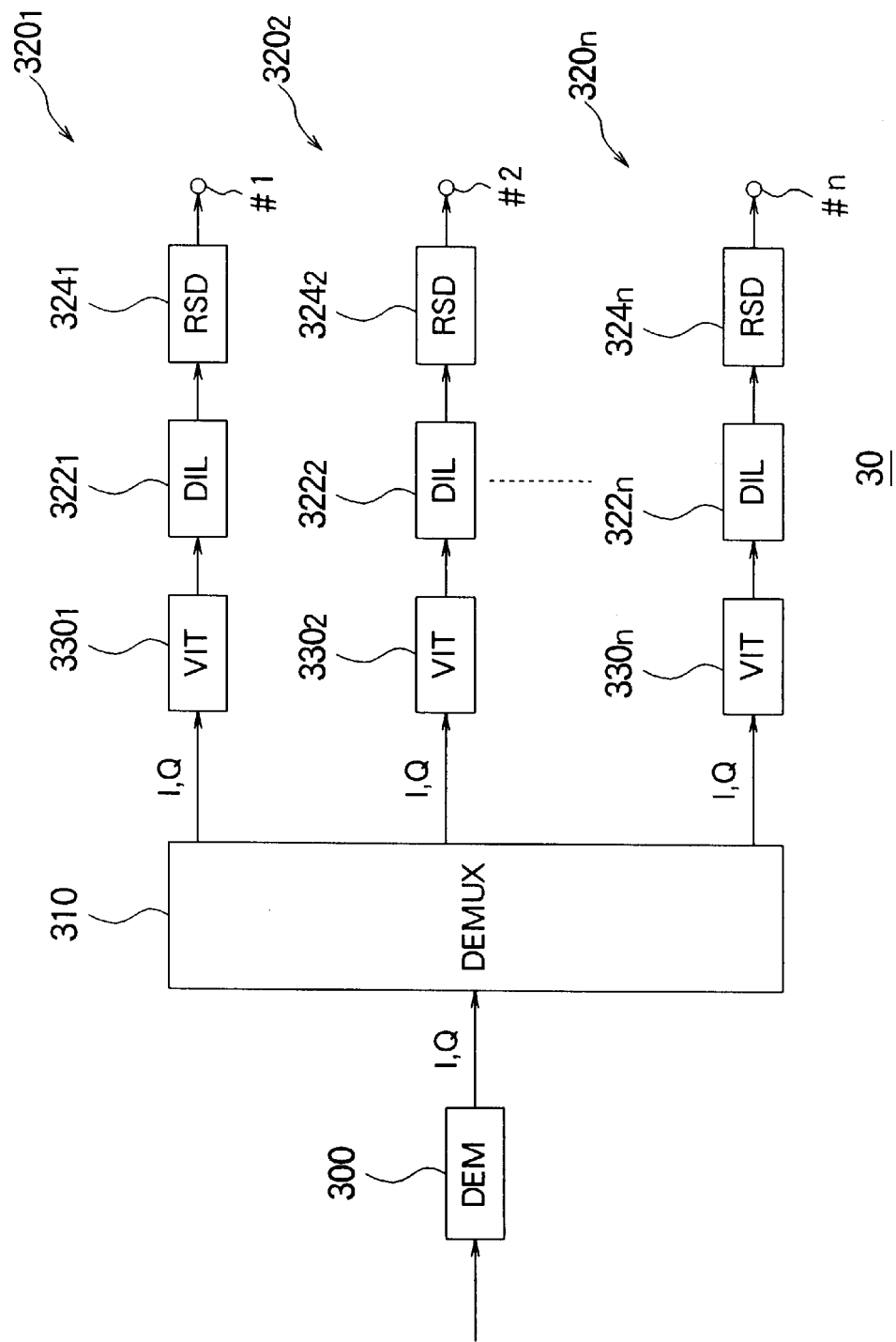
FIG. 5 is a view of the configuration of a signal receiving apparatus shown in FIG. 3.

FIG. 5 is a view of the configuration of the signal receiving apparatus 30 shown in FIG. 3.

As shown in FIG. 5, the signal receiving apparatus 30 is constituted by a demodulation circuit (DEM) 300, a demultiplexing circuit (DEMUX) 310, and n number of decoding circuits $320_i$.

The respective decoding circuits $320_i$ are constituted by Viterbi decoding circuits (VIT) $330_i$, deinterleaving circuits (DIL) 322, Reed-Solomon decoding circuits (RSD) $324_i$, and output terminals #i. Note that, the configurations of the respective Viterbi decoding circuits $300_1$ to $330_n$ are made to correspond to those of the Trellis coding circuits $110_1$ to $110_n$.

By these constituent parts, in the signal transmission system 1, the signal receiving apparatus 30 demodulates the encoded signals from the modulated signal received from the communication transmission line 20 by demodulation methods different for every time slot corresponding to the encoded signals, demultiplexes the respective demodulated encoded signals and performs Viterbi decoding, and reproduces the respective input signals $IN_1$ to $IN_n$ of the signal transmitting apparatus 10.

Figure 6:
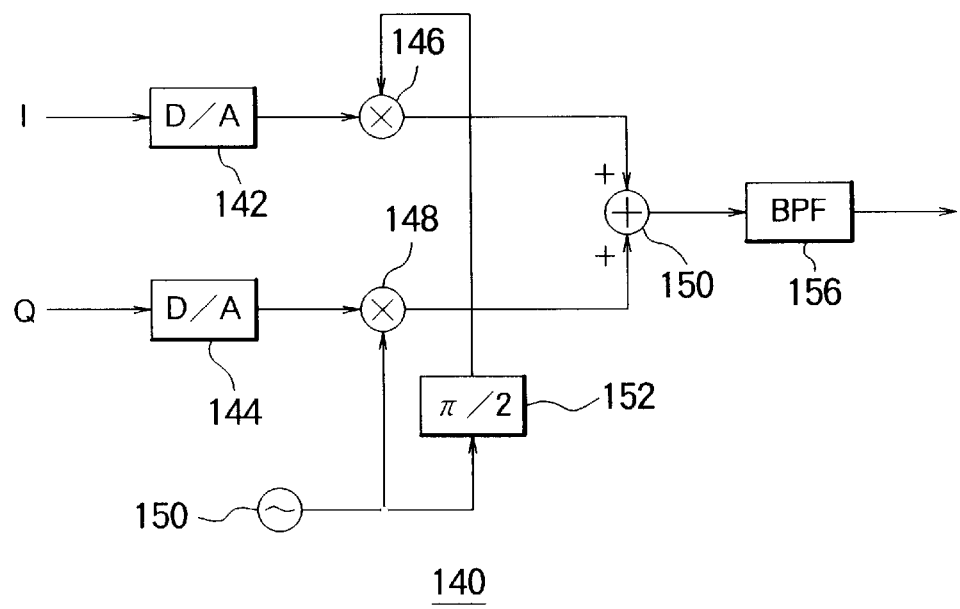
FIG. 6 is a view of the configuration of a modulation circuit shown in FIG. 4.

FIG. 6 is a view of the configuration of the modulation circuit (MOD) shown in FIG. 4.

As shown in FIG. 6, the modulation circuit 140 of the signal transmitting apparatus 10 is constituted by digital/analog conversion circuits (D/A conversion circuits) 142 and 144, multiplying circuits 146 and 148, an oscillation circuit 150, a phase shift circuit 152, an addition circuit 154, and a band-pass filter (BPF) 156.

The orthogonal signal components I and Q input to the modulation circuit 140 are respectively converted to signals of an analog format at the D/A conversion circuits 142 and 144 and output to the multiplying circuits 146 and 148. On the other hand, the oscillation circuit 150 generates a carrier signal and outputs the same to the multiplying circuit 148 and the phase shift circuit 152. The phase shift circuit 152 shifts the phase of the carrier signal by 90° ($\pi/2$ radian) and outputs the result to the multiplying circuit 146.

The multiplying circuits 146 and 148 respectively multiply the carrier signals having a phase difference of 90° from the orthogonal signal components I and Q of the analog format. The addition circuit 154 adds the results of the multiplication and outputs the same to the band-pass filter 156.

The band-pass filter 156 limits the result of addition of the addition circuit 154 to a predetermined frequency band width and outputs the resultant signal as an orthogonally modulated signal.

Figure 7:
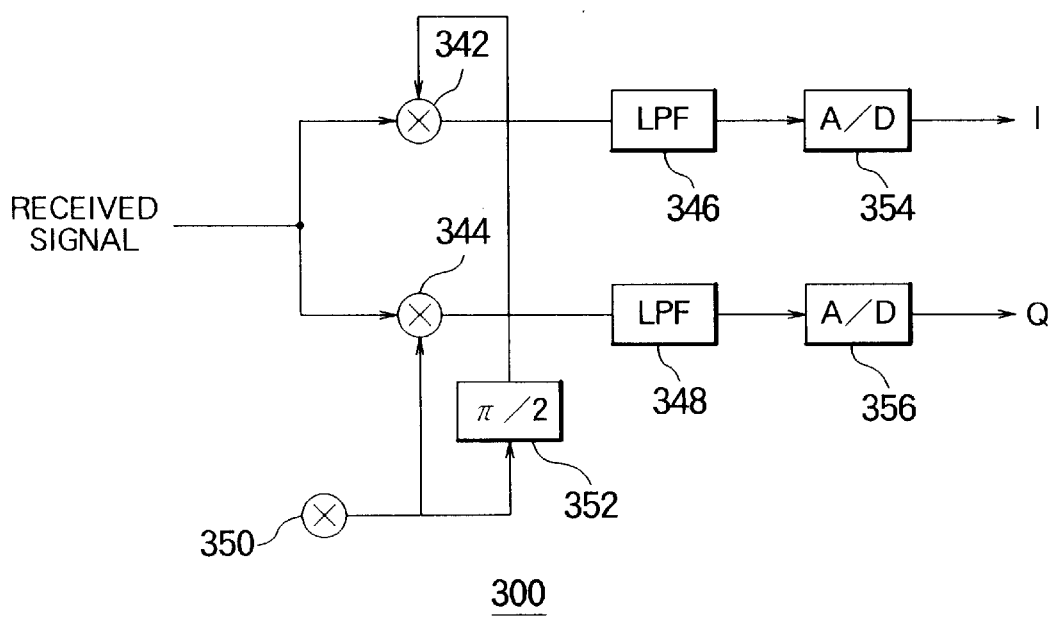
FIG. 7 is a view of the configuration of a demodulation circuit shown in FIG. 5.

FIG. 7 is a view of the configuration of the demodulation circuit (DEM) shown in FIG. 5.

AS shown in FIG. 7, the demodulation circuit 300 is constituted by multiplying circuits 342 and 344, an oscillation circuit 350, a phase shift circuit (π/2) 352, low-pass filters (LFP) 346 and 348, and analog/digital conversion circuits (A/D conversion circuits) 354 and 346. Converse to the modulation circuit 140, the demodulation circuit 300 demodulates the signals transmitted from the signal transmitting apparatus and outputs the same as the orthogonal signal components I and Q of a digital format.

Below, the operation of the signal transmission system 1 will be explained.

The data to be transmitted is preliminarily divided into n number of portions (input signals $IN_i$) in accordance with their significance before being input to the signal transmitting apparatus 10. The input signals $IN_i$ are sequentially input to the input terminals #i, for example, an input signal $IN_i$ having the highest significance among the divided input signals $IN_i$ is input to the input terminal #1, an input signal $IN_2$ having the next highest significance is input to an input terminal #2, and the input signal n having the lowest significance is input to the input terminal #n.

The input signals $IN_i$ respectively input to the input terminals #i are subjected to Reed-Solomon encoding by the Reed-Solomon encoding circuits $102_i$ and output as the Reed-Solomon encoded signals $RSE_i$ to the interleave circuits $104_i$.

Here, a Reed-Solomon (RS) code is an error correction code of a type of BCH coding and was proposed by I. S. Reed and G. Solomon in 1960. While a usual error correction code performs error correction in units of single bits in, an RS code is characterized in that it performs the error correction in units of a plurality of bits. The RS code is an error correction code suited to a case when data is handled in units of bytes and a case where a lot of errors are generated.

The Reed-Solomon encoded signals $RSE_i$ input to the interleave circuits $104_i$ are interleaved and output as interleaved signals $IS_i$ to the Trellis coding circuits $110_i$.

Here, "interleave" means the technology used for efficiently drawing out the capability of the error correction code by dispersing data errors generated in bursts on a transmission line to transform them to average errors.

The interleaved signals $IS_i$ input to the transmission coding circuits $110_i$ are subjected to Trellis coding with encoding rates corresponding to the input signals $IN_i$. That is, the interleaved signal $IS_1$ corresponding to the input signal $IN_1$ having the highest significance is encoded by the Trellis coding circuit $110_1$ by Trellis coding of the smallest ratio of the amount of data before the Trellis coding to the amount of data after the Trellis coding (small encoding rate) than even the interleave signals $IS_2$ to $IS_n$ and output as the Trellis coded signal $TCS_1$ to the mapping circuit $106_1$.

Here, in the usual digital transmission, the portion for performing the error correction coding of the data and the portion for performing the modulation for transmitting the same are constituted as mutually independent portions. What connects this encoding and modulation and improves the transmission characteristic is "code modulation". The Trellis coding system (Trellis code modulation system) is one type of a code modulation system and has been the subject of active research and development starting from the paper on a Trellis code modulation system combining convolutional coding and the digital modulation by G. Ungerboech published in the 1980s.

Further, the interleaved signals $IS_i$ are coded by the Trellis coding circuits $110_i$ by Trellis coding of encoding rates smaller the higher the significance of the corresponding input signals $IN_i$ and are output as the Trellis coded signals $TCS_i$ to the mapping circuits $106_i$.

Similarly, the interleaved signal $IS_n$ is encoded by Trellis coding of an encoding rate larger than those of the interleaved signals $IS_1$ to $IS_{n-1}$ by the Trellis coding circuit $110_n$ since the significance of the corresponding input signal $IN_n$ is the lowest and is output as the Trellis coded signal $TCS_n$ to the mapping circuit $106_n$.

As mentioned above, the Trellis coded signals $TCS_i$ have a higher capability of correcting the data error and has a high reliability as the encoding rate is smaller. Accordingly, by performing the encoding with encoding rates corresponding to the significance of the input signals $IN_i$ in the respective Trellis coding circuits $110_i$, Trellis coded signals $TCS_i$ having correction capabilities with respect to data error in accordance with the significance of the respective input signals $IN_1$ to $IN_n$ can be generated.

The Trellis coded signals $TCS_i$ input to the mapping circuits $106_i$ are applied to the signal points of for example the QAM modulation method corresponding to those values. That is, the mapping circuits $106_i$ assign the Trellis coded signals $TCS_i$ to the amplitude and phase information corresponding to the digital modulation signal points of the corresponding QAM modulation method and outputs the same as the mapping signals $MPS_i$ comprised by two mutually orthogonal orthogonal signal components I and Q to the multiplexing circuit 120.

The mapping signals $MPS_i$ input to the multiplexing circuit 120 are multiplexed assigned to the corresponding time slots (time slots $TS_i$) among the n number of transmission time slots $TS_1$ to $TS_n$ and output as the multiplexed signals comprised by the mutually orthogonal signal components I and Q to the modulation circuit 140.

The multiplexed signals input to the modulation circuit 140 are modulated by the modulation methods corresponding to the respective time slots $TS_i$. That is, where the encoded signal $CS_i$ transmitted by the time slot $TS_i$ is 3-bit data and the encoded signal $CS_{i+1}$ transmitted by the time slot $TS_{i+1}$ is 4-bit data, the modulation circuit 140 performs 8-PSK (8-QAM) modulation on the encoded signal $CS_i$ at the time slot $TS_i$ and performs 16-QAM modulation on the encoded signal $CS_{i+1}$ at the time slot $TS_{i+1}$. The modulated signals generated by modulating the multiplexed signals I and Q by the modulation circuit 140 are transmitted via the communication transmission line 20 to the signal receiving apparatus 30.

Below, the modulated signals transmitted from the signal transmitting apparatus 10 via the communication transmission line 20 to the signal receiving apparatus 30 will be explained referring to FIG. 8.

Figure 8:
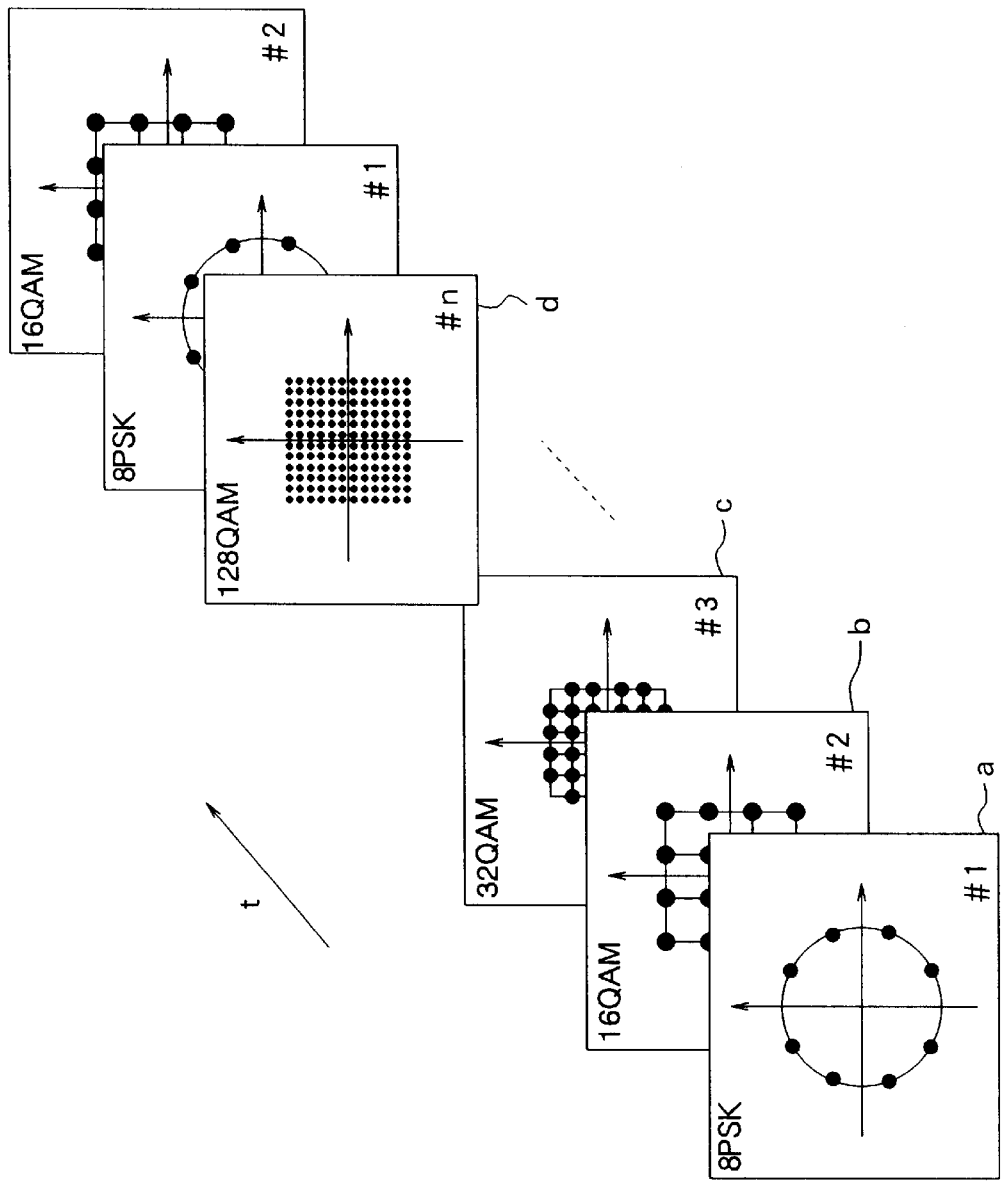
FIG. 8 is a view explaining a modulated signal transmitted from the signal transmitting apparatus shown in FIG. 3.

FIG. 8 is a view explaining the modulated signals transmitted from the signal transmitting apparatus shown in FIG. 3.

As shown in FIG. 8, in the signal transmission system 1, the modulated signals transmitted by the signal transmitting apparatus 10 via the communication transmission line 20 to the signal receiving apparatus 30 gradually change in modulation system every time slot.

As mentioned above, the input signals $IN_i$ input from the input terminals #1 to #n become the mapping signals $MPS_i$ after passing through the encoding circuit $100_i$, are multiplexed by the multiplexing circuit 120, and are modulated at the modulation circuit 140 to become the modulated signals.

13

In these modulated signals, encoded signals $CS_1$ to $CS_n$ subjected to 8-PSK, 16-QAM, 32-QAM, . . . , and 128-QAM modulation are multiplexed at the time slots $TS_1$ to $TS_n$ respectively indicated by the symbols a to d in FIG. 8.

Below, an explanation will be made of the operation of the signal receiving apparatus 30.

The signal receiving apparatus 30 which receives the modulated signals from the signal transmitting apparatus 10 via the communication transmission line 20 sequentially performs processing on the modulated signals substantially reverse to that of the signal transmitting apparatus 10 to decodes the input signals $IN_i$.

The modulated signals transmitted from the signal transmitting apparatus 10 via the communication transmission line 20 to the signal receiving apparatus 30 are demodulated by the demodulation circuit 300 and output as demodulated signals comprised by the orthogonal signal components I and Q to the demultiplexing circuit 310.

Here, the demodulation circuit 300 performs a demodulation operation for 8-PSK modulation at the start of reception, but when the received signal is one subjected to for example 32-QAM modulation, of course it is not correctly demodulated and the data error rate in the Viterbi decoding circuit $330_i$ becomes large. When the demodulation circuit 300 demodulates 8-PSK modulated signal thereafter, however, the data error rate in the Viterbi decoding circuit $330_i$ becomes small. Accordingly, by changing the demodulation method in order such as 16-QAM, 32-QAM, . . . , 128-QAM, and 8-PSK from this time on, correct demodulation becomes possible. The demodulated signals correspond to the multiplexed signals output from the multiplexing circuit 120 of the signal transmitting apparatus 10 to the modulation circuit 140.

The demodulated signals input to the demultiplexing circuit 310 are demultiplexed at every time slot and output as the demultiplexed signals $DS_i$ to the Viterbi decoding circuits $330_i$ of the decoding circuit $320_i$. The demultiplexed signals $DS_i$ correspond to the mapping signals $MPS_i$ output from the mapping circuits $106_i$ to the multiplexing circuit 120.

The demultiplexed signals $DS_i$ input to the Viterbi decoding circuit $330_i$ are subjected to Viterbi decoding and output as the Viterbi-decoded signals $VDS_i$ to the deinterleave circuits $322_i$. The Viterbi-decoded signals $VDS_i$ correspond to the interleaved signals $IS_i$ which are output from the interleave circuits $104_i$ to the Trellis coding circuits $110_i$.

Here, the Viterbi decoding system is a method of decoding convolutional codes among error correction codes and was proposed by A. J. Viterbi in 1967. According to the Viterbi decoding system, maximum likelihood decoding finding the code nearest to the original data to the received data can be effectively carried out.

The Viterbi decoded signals $VDS_i$ input to the deinterleave circuits $322_i$ are subjected to the reverse processing to that of the interleave circuits $104_i$ and output as the deinterleaved signals $IS_i$ to the Reed-Solomon decoding circuits $324_i$. The deinterleaved signals $IS_i$ correspond to the Reed-Solomon-coded signals $RSE_i$ output from the Reed-Solomon encoding circuits $102_i$ to the interleave circuits $104_i$.

The deinterleaved signals $IS_i$ input to the Reed-Solomon decoding circuits $324_i$ are subjected to Reed-Solomon decoding and decoded to the input signals $IN_i$ before the transmission and output from the output terminals #i.

Here, where there is a decoding circuit $320_i$ which becomes unable to perform the error correction in the Viterbi decoding circuit $330_i$ since the state of reception becomes bad for the above reasons, that decoding circuit $320_i$ is not used. Only the output signals of the other decoding circuits $320_x$ (i is not equal to x) are used. This method is the same also in the later mentioned second to seventh embodiments.

As mentioned above, in the signal transmission system 1, the signal transmitting apparatus 10 encodes the input signals $IN_i$ divided as portions having a high significance in the data to be transmitted by a Trellis code having a small encoding rate, whereby even in a case where the state of reception becomes poor on the signal receiving apparatus 30 side (the C/N ratio of the received signal is low), the transmission can be secured.

Further, the signal transmitting apparatus 10 encodes the input signals $IN_i$ divided as portions having a low significance by a Trellis code having a large encoding rate, whereby in a case where the state of reception on the signal receiving apparatus 30 side is good (the C/N ratio of the received signal is high), the input signals $IN_i$ can be received with a good efficiency.

Second embodiment

Below, a second embodiment of the present invention will be explained referring to FIG. 9 to FIG. 16.

Figure 9:
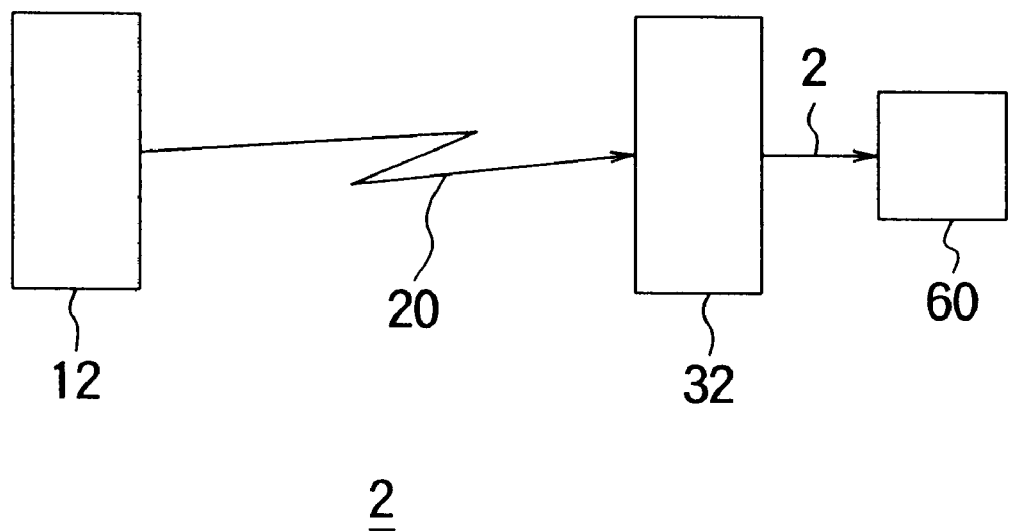
FIG. 9 is a view of the configuration of the signal transmission system according to a second embodiment of the present invention.

First, the configuration of the signal transmission system 2 will be explained referring to FIG. 9 to FIG. 11. FIG. 9 is a view of the configuration of the signal transmission system 2 according to the second embodiment of the present invention.

As shown in FIG. 9, the signal transmission system 2 explained in the second embodiment is obtained by replacing the signal transmitting apparatus 10 and the signal receiving apparatus 30 of the signal transmission system 1 shown in the first embodiment by a signal transmitting apparatus (StR) 12 and a signal receiving apparatus (SRV) 32 performing the transmission and demodulation of a television signal of a digital format, respectively, and further adding an image processing and displaying device (IPD) 60 which reproduces and displays the image etc. from the input signals $IN_i$ decoded by the signal receiving apparatus 32.

Figure 10:
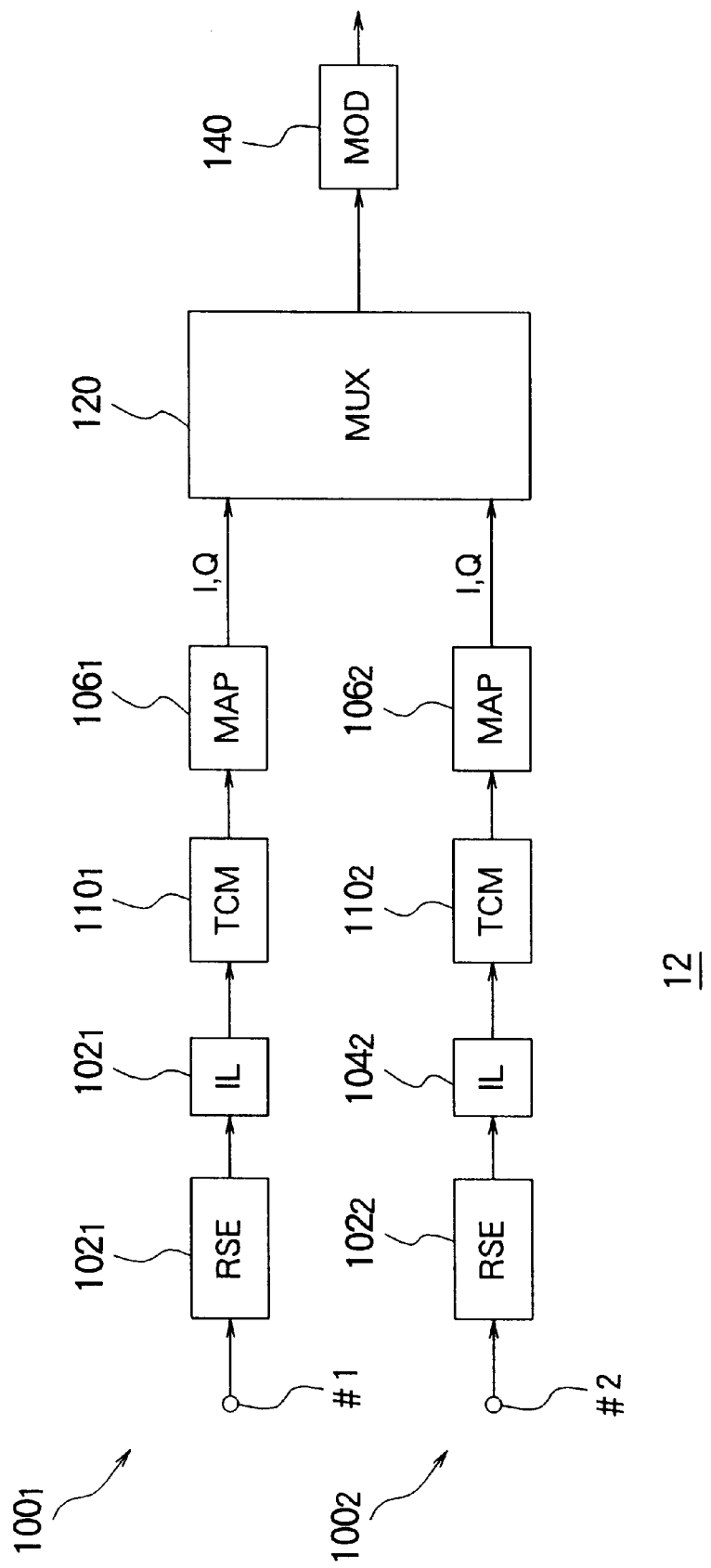
FIG. 10 is a view of the configuration of a signal transmitting apparatus shown in FIG. 9.

FIG. 10 is a view of the configuration of the signal transmitting apparatus 12 shown in FIG. 9.

As shown in FIG. 10, the signal transmitting apparatus 12 is constituted by two encoding circuits $100_i$, the multiplexing circuit 120, and the modulation circuit 140.

The encoding circuits $100_i$ are respectively constituted by Reed-Solomon encoding circuits $102_i$, interleave circuits $104_i$, Trellis coding circuits $110_i$, and mapping circuits $106_i$ (i=1,2; the same below in the second embodiment).

Note that, the configuration of the Trellis coding circuits $110_1$ and $110_2$ will be explained later referring to FIG. 12 and FIG. 13.

The signal transmitting apparatus 12 is the signal transmitting apparatus 10 shown in the first embodiment used for transmission of a television signal of a digital format and with n=2, where the input signals $IN_i$ to be input to the input terminals #i of the signal transmitting apparatus 12 are divided into 2 levels in accordance with their significance. The input signals $IN_1$ are signals having the high significance necessary for transmitting the basic picture and sound in the television signals, and the input signals $IN_2$ are additional data used for enhancing the quality of the picture and sound and are signals having lower significance than the input signals $IN_1$.

Note that, the encoding circuits $100_i$, the multiplexing circuit 120, the modulation circuit 140, the Reed-Solomon encoding circuits $102_i$, the interleave circuits $104_i$, the Trellis coding circuits $110_i$, and the mapping circuits $106_i$ of the signal transmitting apparatus 12 correspond to the components of the signal transmitting apparatus 10 indicated by the same symbols in FIG. 4. The components of the signal transmitting apparatus 12 have functions corresponding to the components of the corresponding signal transmitting apparatus 10 and perform corresponding operations.

Figure 11:
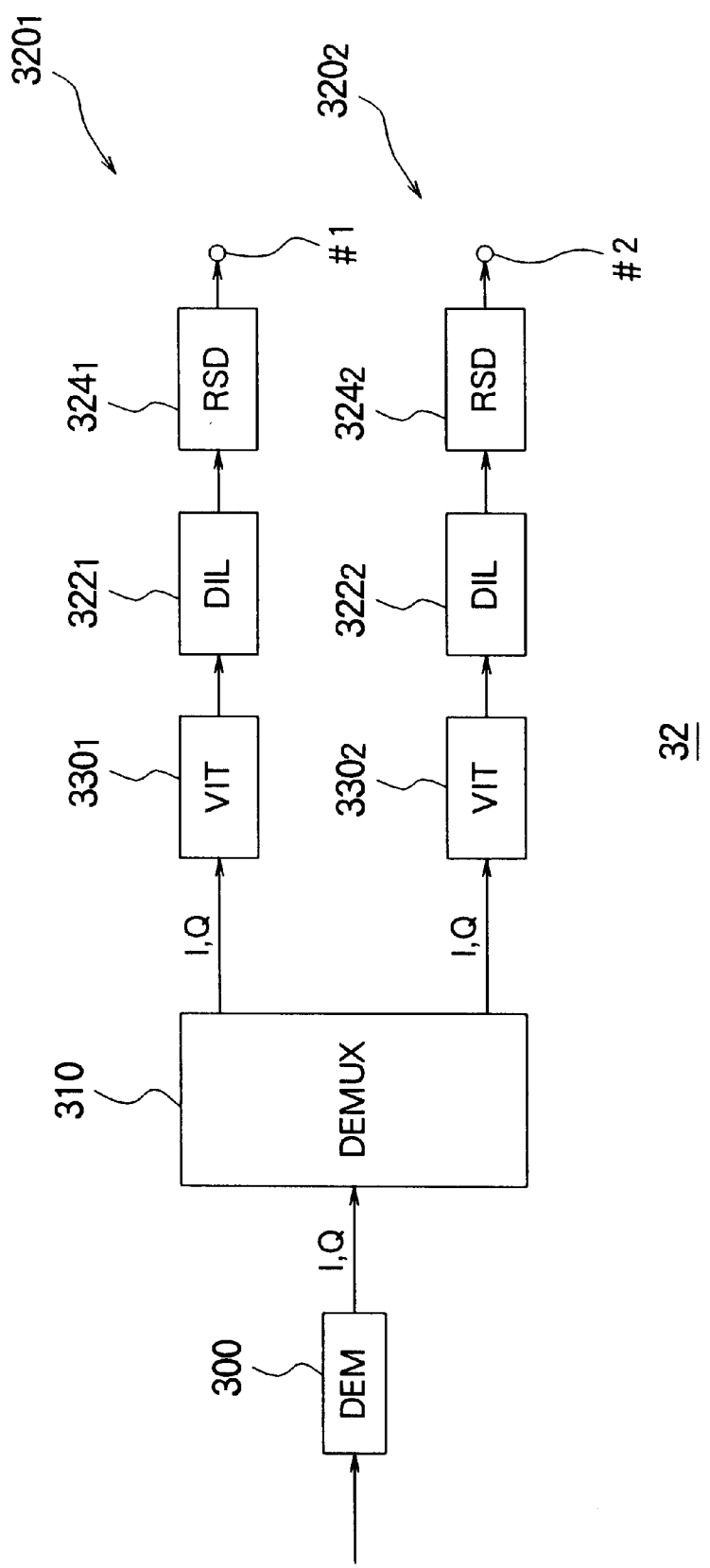
FIG. 11 is a view of the configuration of a signal receiving apparatus shown in FIG. 9.

FIG. 11 is a view of the configuration of the signal receiving apparatus 32 shown in FIG. 9.

As shown in FIG. 11, the signal receiving apparatus 32 is constituted by a demodulation circuit 300, a demultiplexing circuit 310, and two decoding circuits $320_i$.

The decoding circuits $320_i$ are constituted by Viterbi decoding circuits $330_i$, deinterleave circuits $322_i$, and Reed-Solomon decoding circuits $324_i$.

The signal receiving apparatus 32 is the signal receiving apparatus 30 shown in the first embodiment which is used for the reception of a television signal of a digital format and where n=2 and decodes the input signals $IN_i$ from the received modulated signals.

The demodulation circuit 300, demultiplexing circuit 310, decoding circuits $320_i$, Viterbi decoding circuits $330_i$, deinterleave circuits $322_i$, and Reed-Solomon decoding circuits $324_i$ of the signal receiving apparatus 32 respectively correspond to the components of the signal receiving apparatus 30 shown in FIG. 5 and are indicated by the same symbols, while the components of the signal receiving apparatus 32 have functions corresponding to those of the components of the corresponding signal receiving apparatus 30 and perform the corresponding operations. Note that, the Viterbi decoding circuits $330_1$ and $330_2$ respectively correspond to the Trellis coding circuits $110_1$ and $110_2$.

Below, the configuration and operation of the Trellis coding circuits $110_1$ will be explained.

Figure 12:
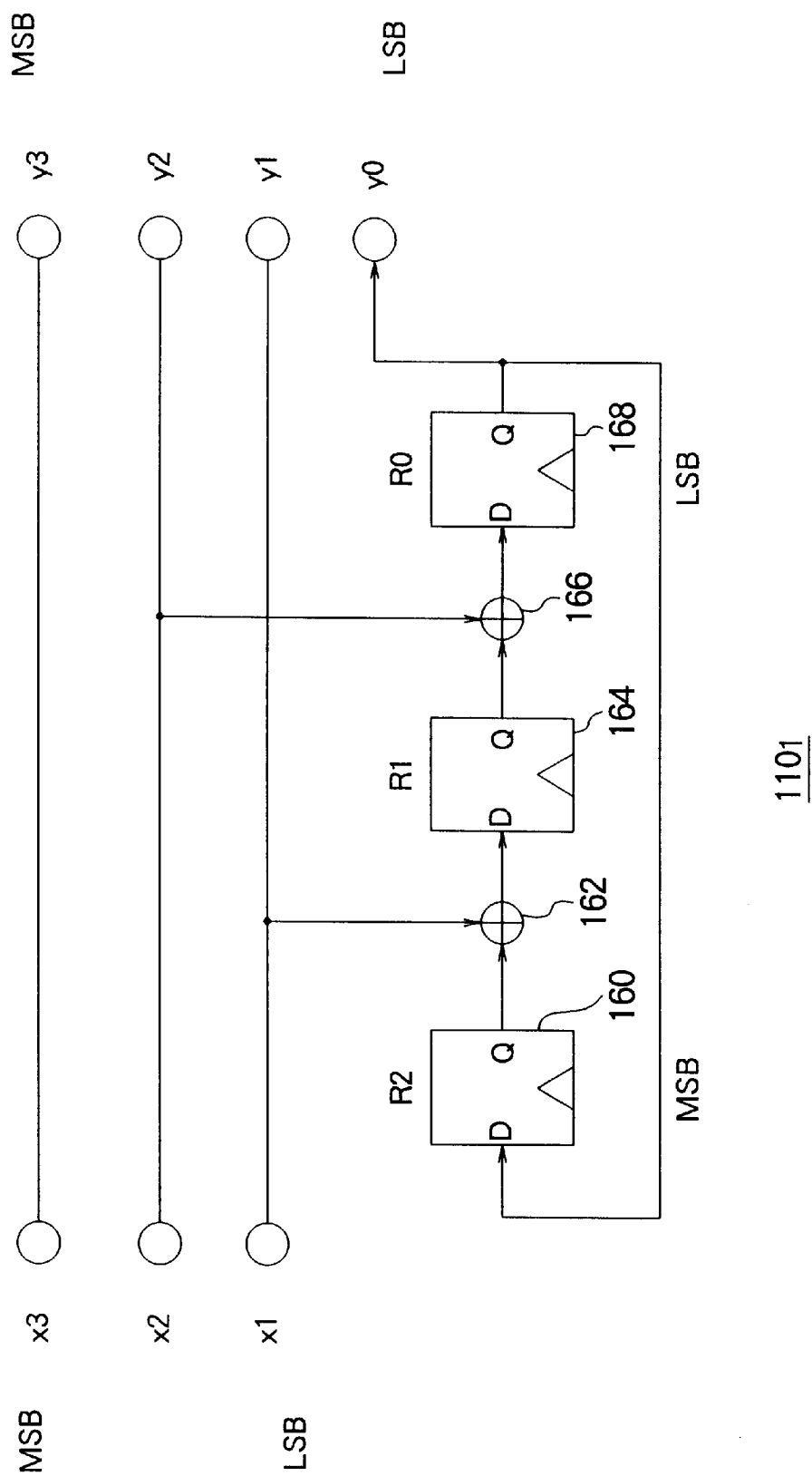
FIG. 12 is a view of the configuration of a first Trellis coding circuit ($110_1$) shown in FIG. 10.

FIG. 12 is a view of the configuration of the Trellis coding circuit $110_1$ shown in FIG. 10.

As shown in FIG. 12, the Trellis coding circuit $110_1$ is constituted by latch circuits (R2, R1, R0) 160, 164, and 168 which hold logical values of signals respectively input to the input terminal D whenever 1 bit of a new interleaved signal $IS_1$ is input and output the same from the output terminal Q and XOR circuits 162 and 166 which calculate the exclusive OR of the input two signals.

The Trellis coding circuit $110_i$ encodes the 3-bit interleave signal $IS_1$ (x3 (MSB), x2, x1 (LSB)) input from the interleave circuit $104_1$ to the 4-bit Trellis coded signal $TCS_1$ (y1 to y4) by the configuration shown in FIG. 12 and outputs the result to the mapping circuit $106_1$.

Below, the configuration and operation of the Trellis coding circuit $110_2$ will be explained. FIG. 13 is a view of the configuration of the Trellis coding circuit $110_2$ shown in FIG. 10.

Figure 13:
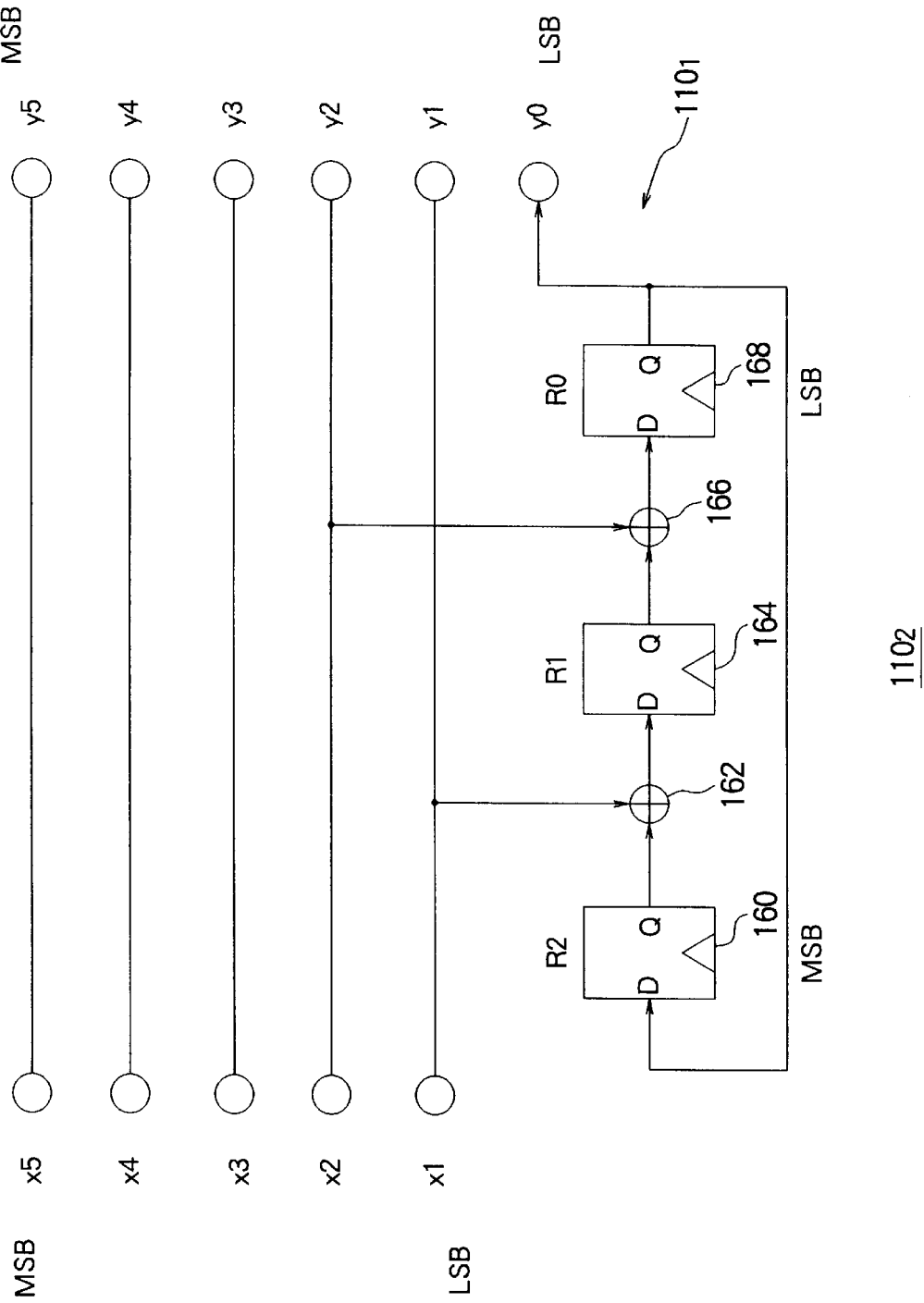
FIG. 13 is a view of the configuration of a second Trellis coding circuit ($110_2$) shown in FIG. 10.

As shown in FIG. 13, the Trellis coding circuit $110_2$ is constituted by latch circuits (R2, R1, R0) 160, 164, and 168 which hold logical values of signals respectively input to the input terminal D whenever 1 bit of a new interleave signal $IS_2$ is input and output the result from the output terminal Q and XOR circuits 162 and 166 which calculate the exclusive-OR of the input two signals.

That is, as is seen from a comparison between FIG. 12 and FIG. 13, the Trellis coding circuit $110_2$ comprises the Trellis coding circuit $110_1$ plus two parallel paths (x5–y5, x4–y4) by-passing the Trellis coding circuit $110_2$.

The Trellis coding circuit $110_2$ encodes the 5-bit interleave signal $IS_2$ (x5 (MSB), . . . , x1 (LSB)) input from the interleave circuit $104_2$ to a 6-bit Trellis coded signal $TCS_2$ (y1 to y6) by the configuration shown in FIG. 13 and outputs the result to the mapping circuit $106_2$.

Below, an explanation will be made of the method of performing Trellis coding with an encoding rate of 5/6 on the input signal $IN_2$ by adding the parallel paths to a Trellis code of a transmission encoding rate of 3/4 in the Trellis coding circuit $110_2$.

Figure 14:
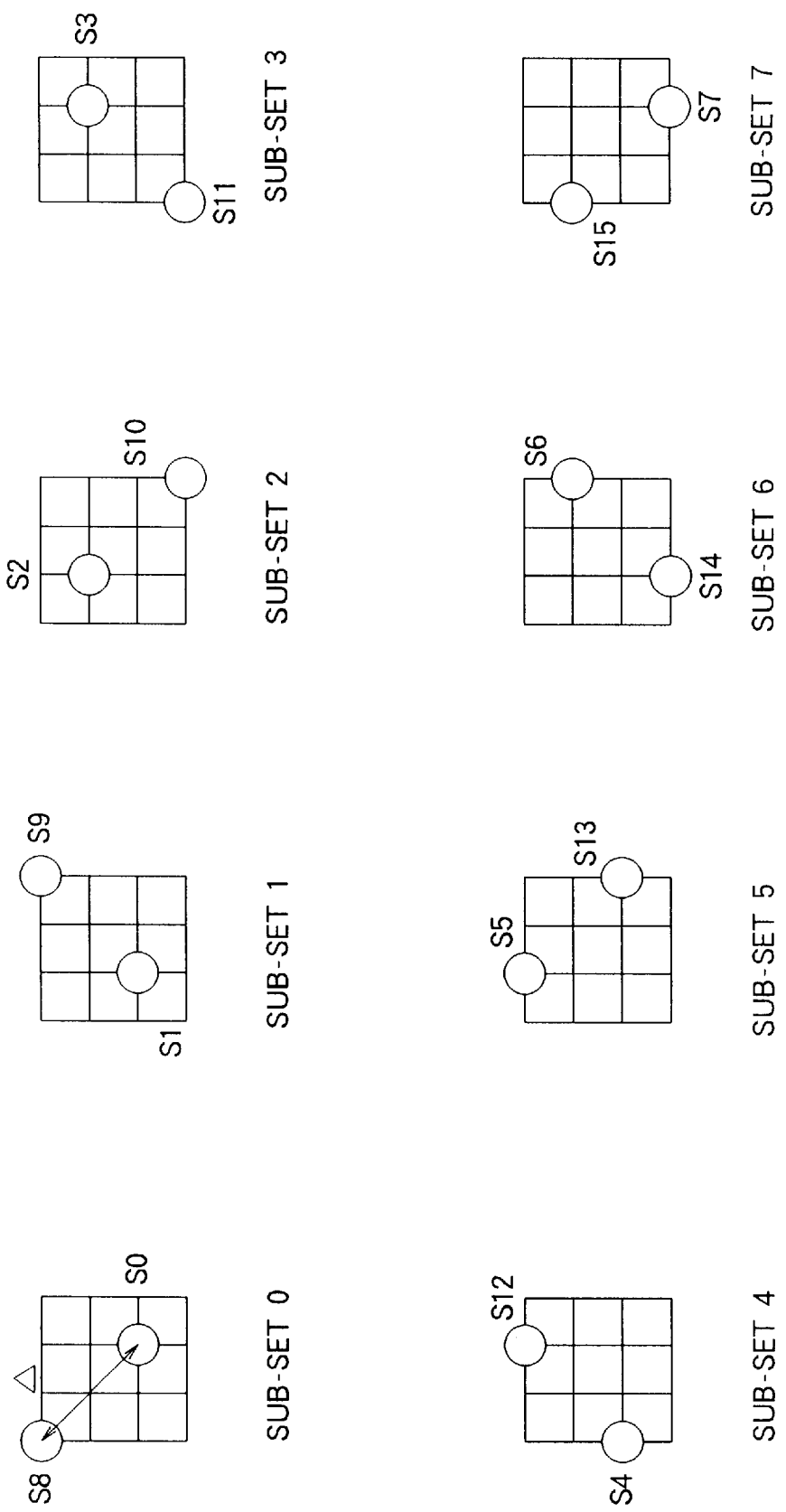
FIG. 14 is a view of a signal point where a first mapping signal multiplexed by a multiplexing circuit shown in FIG. 10 is subjected to 16-QAM modulation.

FIG. 14 is a view of the signal point when the first mapping signal multiplexed by the multiplexing circuit 120 shown in FIG. 10 is subjected to 16-QAM modulation.

Figure 15:
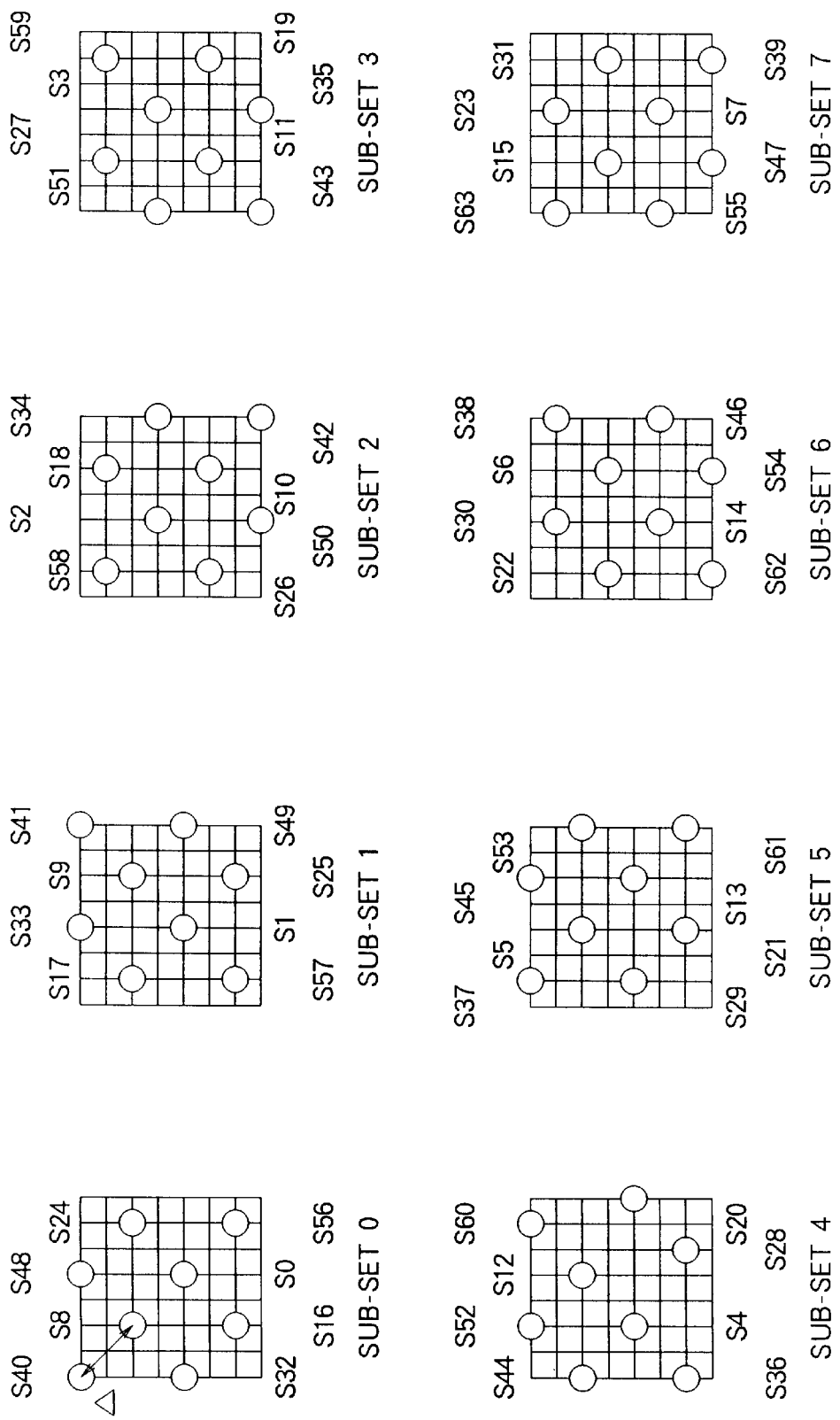
FIG. 15 is a view of a signal point where a second mapping signal multiplexed by a multiplexing circuit shown in FIG. 10 is subjected to 64-QAM modulation.

FIG. 15 is a view of the signal point when the second mapping signal multiplexed by the multiplexing circuit 120 shown in FIG. 10 is subjected to 64-QAM modulation.

As mentioned above, the Trellis coding circuit $110_2$ is comprised of the Trellis coding circuit $110_1$ plus two parallel paths. For this reason, in the Trellis coded signal $TCS_2$ output from the Trellis coding circuit $110_2$, the information per symbol is increased from 3 bits to 5 bits compared with the Trellis coded signal $TCS_1$ and the transmission rate becomes high. On the other hand, the Trellis coded signal $TCS_2$ has a high encoding rate as seen from the comparison between FIG. 14 and FIG. 15 and the minimum distance $\Delta$ between signal points in the sub-set becomes small. Accordingly, it is seen that the Trellis coded signal $TCS_2$ is more susceptible to data error than the Trellis coded signal $TCS_1$.

As mentioned above, in general, as the encoding rate is made larger, the transmission efficiency is improved, and the capability of correcting the data error is lowered.

It is known that when two parallel paths are added to a Trellis coding circuit having an encoding rate of 3/4 and Trellis coding of an encoding rate of 5/6 is carried out as in the Trellis coding circuit $110_2$, the C/N ratio of the received signal by which the latter gives a data error rate of $1.0\times10^{-6}$ on the reception side is larger than the C/N ratio of the received signal by which the former gives a data error rate of $1.0\times10^{-8}$ on the reception side by about 6.5 dB.

That is, when comparing the Trellis coded signal $TCS_1$ having an encoding rate of 3/4 and the Trellis coded signal $TCS_2$ having an encoding rate of 5/6, the former is more advantageous than the latter in view of the C/N ratio of the received signal on the reception side by about 6.5 dB, while the throughput becomes higher in the latter than the former by 67 percent.

Below, the operation of the signal transmission system 2 will be simply explained.

Input signals $IN_1$ and $IN_2$ respectively input from the input terminals #1 and #2 of the signal transmitting apparatus 12 are processed by the Reed-Solomon encoding circuit $102_i$ and the interleave circuits $104_i$ and output as interleave signals $IS_1$ and $IS_2$ to the Trellis coding circuits $110_1$ and $110_2$, respectively.

The interleave signal $IS_1$ input to the Trellis coding circuit $110_1$ is subjected to the Trellis coding with the encoding rate of 3/4 and output as the Trellis coded signal $TCS_1$ to the mapping circuit $106_1$.

The interleave signal $IS_2$ input to the Trellis coding circuit $110_2$ is subjected to the Trellis coding with the encoding rate of 5/6 and output as the Trellis coded signal $TCS_2$ to the mapping circuit $106_2$.

The interleave signal $IS_1$ input to the mapping circuit $106_1$ is processed by the mapping circuit $106_1$ and becomes the mapping signals $MPS_1$ and $MPS_2$ which are output to the multiplexing circuit 120.

The mapping signals $MPS_1$ and $MPS_2$ input to the multiplexing circuit 120 are multiplexed and output as multiplexed signals to the modulation circuit 140.

The modulation circuit 140 performs 16-QAM modulation on the mapping signal $MPS_1$ corresponding to the input signals $IN_1$ and $IN_2$ multiplexed at the time slot $TS_1$ of the multiplexed signals and performs 64-QAM modulation on the mapping signal $MPS_2$ corresponding to the input signal $IN_2$ multiplexed at the time slot $TS_2$ of the multiplexed signals and outputs the same as the modulated signals via the communication transmission line 20 to the signal receiving apparatus 32.

The modulated signals transmitted to the signal receiving apparatus 32 are input to the demodulation circuit 300. Here, the operation of the demodulation circuit 300 is as explained in the first embodiment.

The signals contained in the time slot $TS_2$ of the modulated signals input to the demodulation circuit 300 are subjected to 16-QAM demodulation, while the signals contained in the time slot $TS_1$ are subjected to 64-QAM demodulation. These are output as the demodulated signals to the demultiplexing circuit 310.

The demodulated signals input to the demultiplexing circuit 310 are demultiplexed for every time slot and output as the demultiplexed signals $DS_i$ to the Viterbi decoding circuits $330_i$.

The demultiplexed signal $DS_1$ input to the Viterbi decoding circuit $330_1$ is subjected to Viterbi decoding by the Viterbi decoder for the Trellis code of the encoding rate of 3/4 and output as the Viterbi decoded signal $VDS_1$ to the deinterleave circuit $322_1$.

The demultiplexed signal $DS_2$ input to the Viterbi decoding circuit $330_2$ is subjected to Viterbi decoding by the Viterbi decoder for the Trellis code of the encoding rate of 5/6 and output as the Viterbi decoded signal $VDS_2$ to the deinterleave circuit $322_2$.

The Viterbi decoded signals $VDS_i$ are deinterleaved by the deinterleave circuits $322_i$ and decoded by the Reed-Solomon decoding circuits $324_i$ and output as the original input signals $IN_i$ to the image processing and displaying device 60.

The image processing and displaying device 60 reproduces the television picture and sound by using both of the input signals $IN_1$ and $IN_2$ when the C/N ratio of the received signal is more than a predetermined value and displays and outputs the same.

Further, the image processing and displaying device 60 reproduces the television picture and sound by using only the input signal $IN_1$ when the C/N ratio of the received signal is less than a predetermined value and displays and outputs the same.

Figure 16:
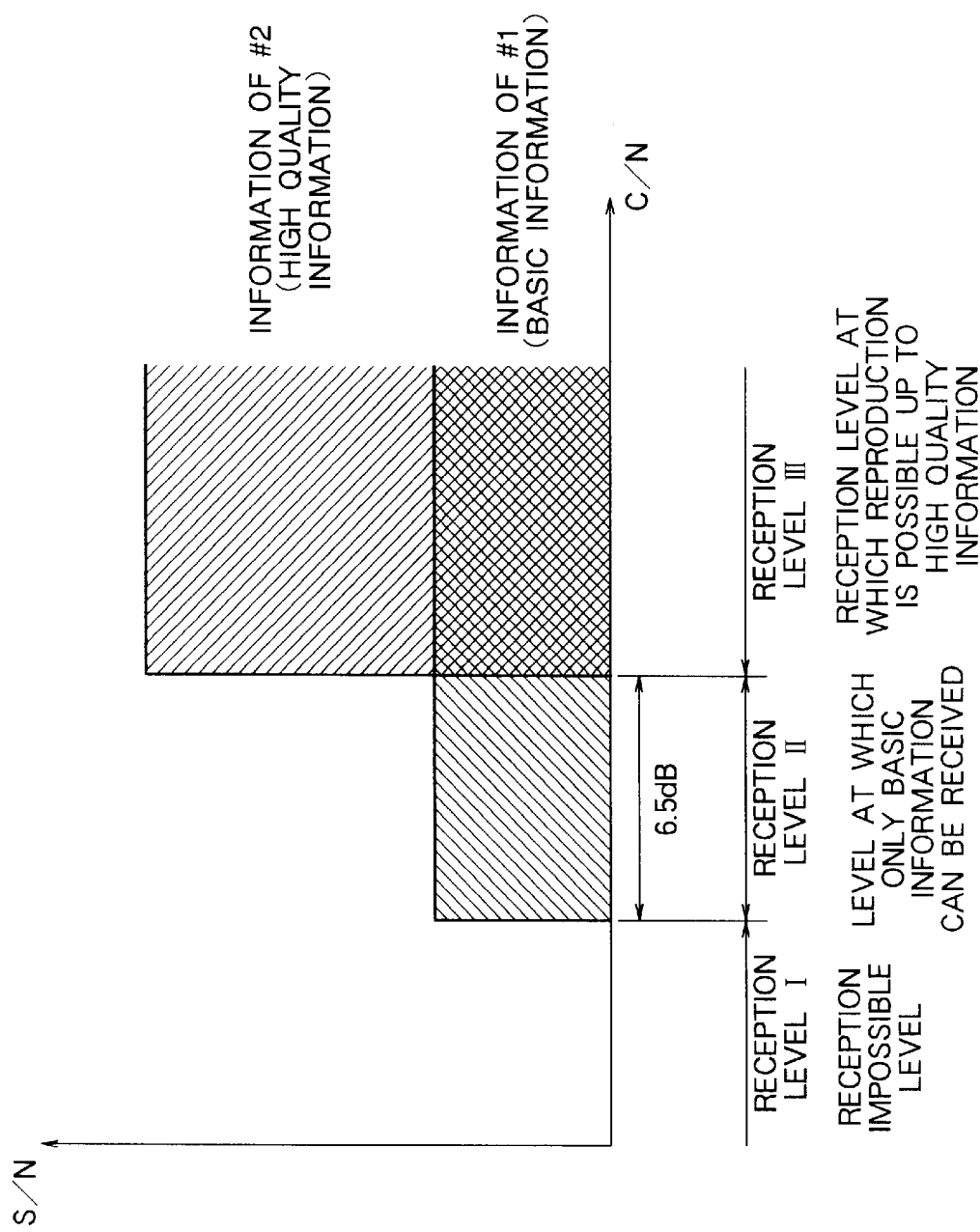
FIG. 16 is a view of relationship between the C/N ratio on the reception side and the S/N ratio of a reproduced television signal when transmitting a television signal via a wireless communication channel by the signal transmission system of the second embodiment and the possibility of reproduction of the data.

As explained above, the relationship between the C/N ratio and the S/N ratio in the signal transmission system 2 becomes as shown in FIG. 16.

FIG. 16 is a view of the relationship between the carrier-to-noise ratio (C/N ratio) on the reception side and the signal-to-noise ratio (S/N ratio) of a reproduced television signal when transmitting a television signal by the signal transmission system in the second embodiment via the wireless communication channel and the possibility of the reproduction of data.

That is, in the region where the C/N ratio of the received signal in the signal receiving apparatus 32 is larger than a predetermined value (reception level III), reproduction is possible up to the input signal $IN_2$ in the signal receiving apparatus 32, so the image processing and displaying device 60 can display a high quality picture added with the additional information and output the sound.

Further, in the region where the C/N ratio of the received signal in the signal receiving apparatus 32 is lowered and becomes smaller than the predetermined value (reception level II), the additional information cannot be reproduced, but the input signal $IN_1$ can be reproduced, so the image processing and displaying device 60 can display the basic picture not added with the additional information and can output the sound. The region of this reception level II is continued up to the region where the C/N ratio of the received signal becomes further lower than the predetermined value by 6.5 dB.

In the region where the C/N ratio of the received signal is further lowered (reception level I), however, the image processing and displaying device 60 becomes unable to display the video signal etc.

Here, the S/N ratio on the ordinate in FIG. 16 is a value obtained where only the reproduced input signal $IN_1$ is used in the region of the reception level II and is a value obtained where the signals of both of the reproduced input signals $IN_1$ and $IN_2$ are used in the region of the reception level I.

In the signal transmission system 2 shown in the second embodiment, there were two input signals and there were also two coding circuits $100_1$ and the decoding circuits $320_i$ corresponding to them, but the number of the input signals is not restricted to two. Further, where the number of the input signals is increased, it is necessary to increase the number of the encoding circuits $100_i$ and decoding circuits $320_i$ in accordance with the number of the input signals.

Figure 1:
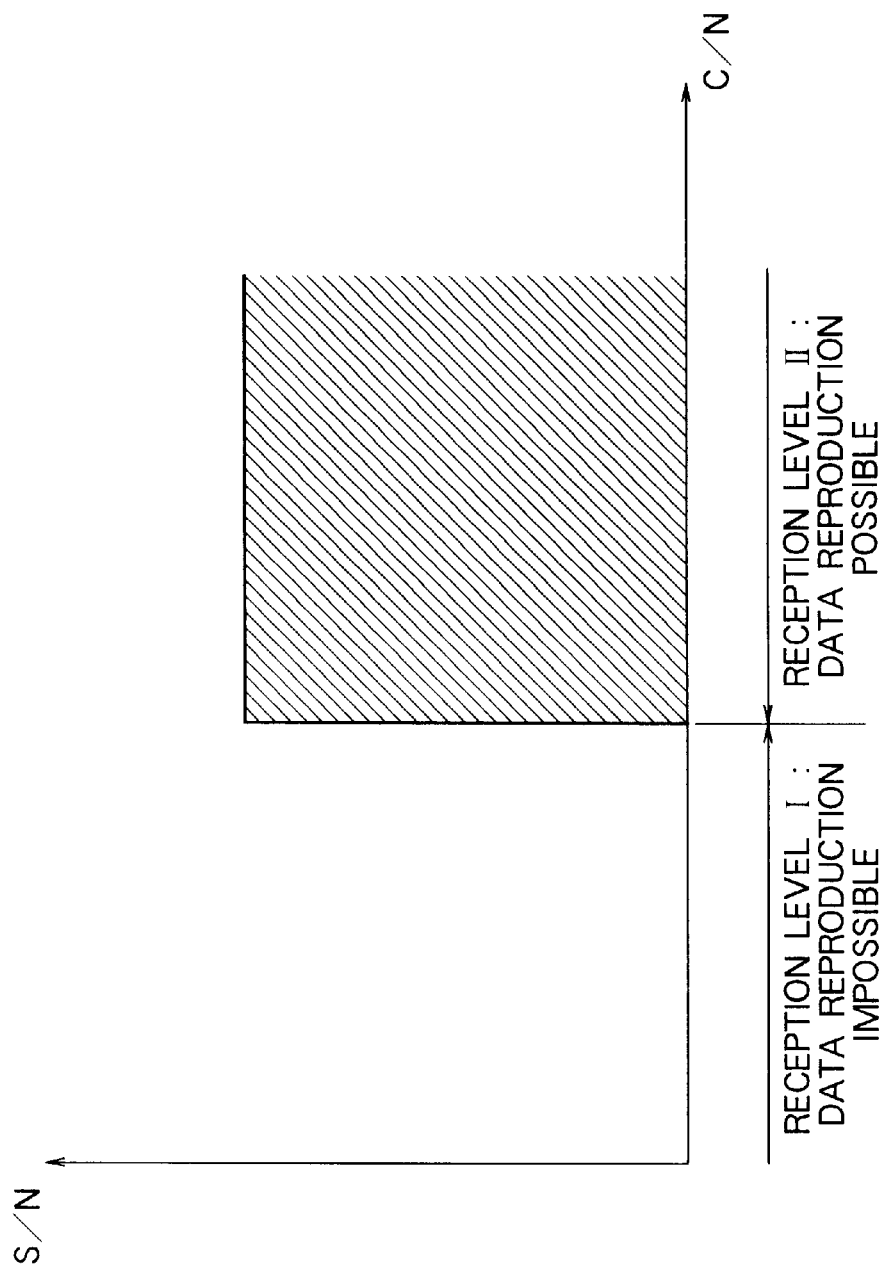
FIG. 1 is a view of the relationship between a C/N ratio on the reception side and an S/N ratio of a reproduced television signal when transmitting a television signal via a wireless communication channel and the possibility of reproduction of the data.
Figure 2:
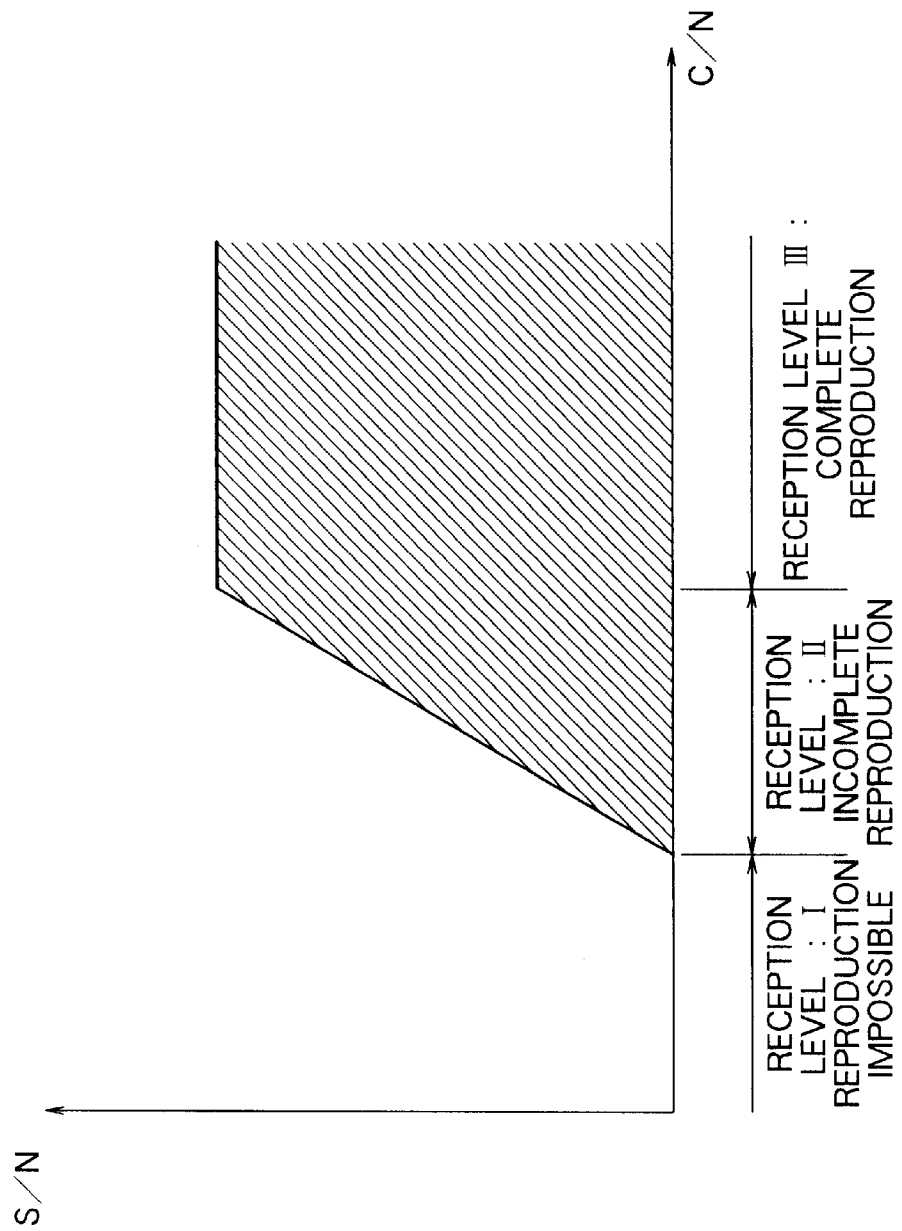
FIG. 2 is a view of the desirable relationship between the C/N ratio on the reception side and the S/N ratio of a reproduced television signal when transmitting a television signal via a wireless communication channel, and the possibility of reproduction of the data.

In this way, when increasing the number of the input signals, the regions of the reception level shown in FIG. 16 can be made smaller, so the characteristics can be made further closer to the desirable characteristic shown in FIG. 2.

According to the signal transmission systems 1 and 2 according to the present invention explained above, the amount of information corresponding to the received signal (C/N ratio of the received signal) can be received on the reception side. Accordingly, data transmission corresponding to the "graceful degradation" shown in FIG. 2 can be carried out.

Further, in the signal transmitting apparatuses 10 and 12 of the signal transmission systems 1 and 2 according to the present invention, a plurality of input signals are respectively subjected to the Reed-Solomon encoding and subjected to the Trellis code modulation and then these series are multiplexed. Further, in the signal receiving apparatuses 30 and 32, the respective input signals (information series) are decoded from the received signal, so the operating speed of the coding modulation circuit and the decoding circuit can be slower than that in the case where the encoding is carried out after multiplexing the series of information as in the conventional apparatus. Accordingly, the signal receiving apparatuses 30 and 32 can perform the encoding and decoding with respect to the modulated signals at a higher speed than a conventional apparatus.

Third embodiment

Below, an explanation will be made of a third embodiment of the present invention referring to FIG. 17 to FIG. 19.

Figure 17:
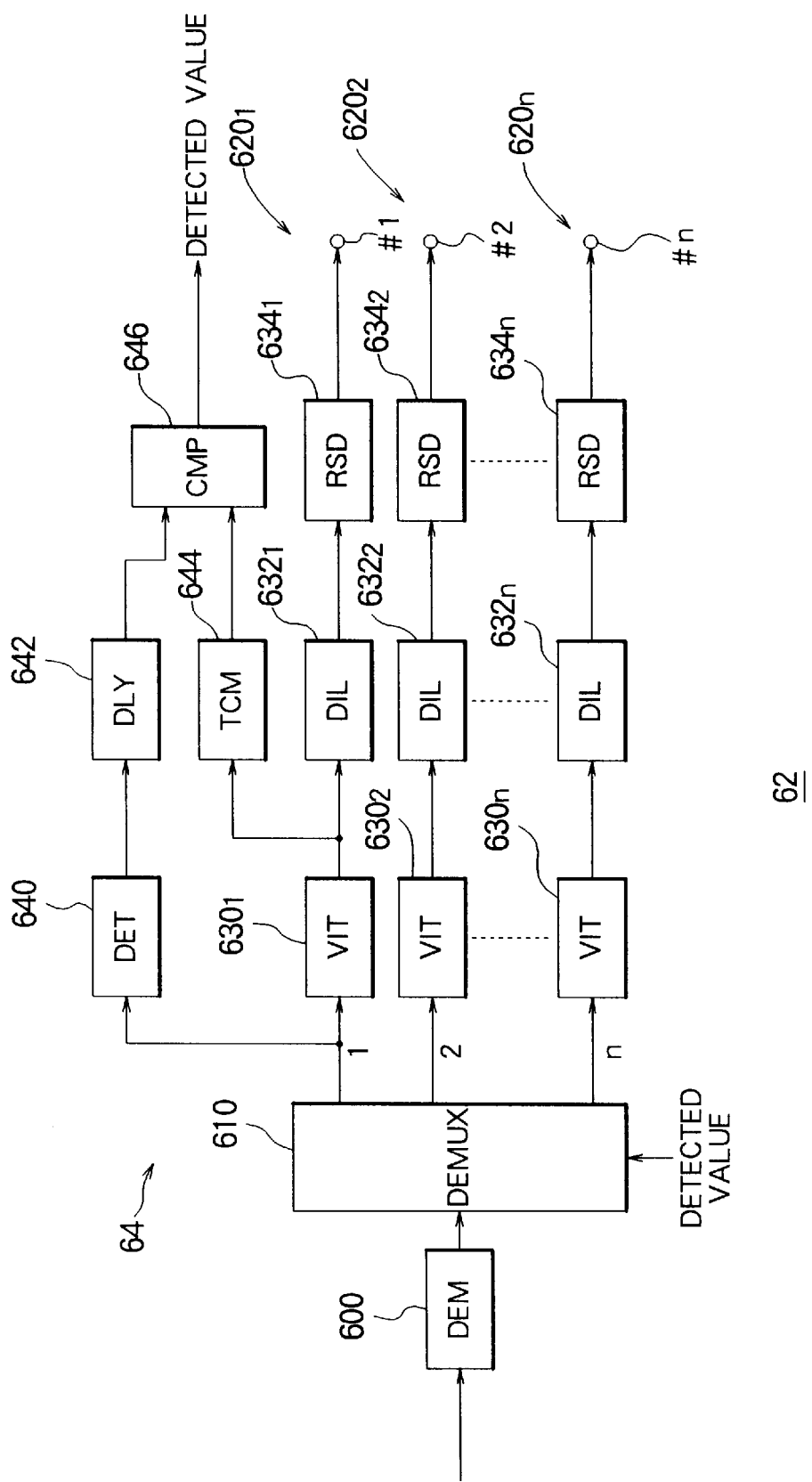
FIG. 17 is a view of the configuration of the signal receiving apparatus according a third embodiment of the present invention.

FIG. 17 is a view of the configuration of the signal receiving apparatus 62 according to the third embodiment of the present invention.

In the signal receiving apparatus 62, to correctly decode the transmitted signal, correct correspondence between the data divided when input to the transmission side, for example, the signal transmitting apparatus 10, and the data received on the signal receiving apparatus 62 side is necessary.

Specifically, the data transmitted from the signal transmitting apparatus side as the transmission data #1 must be encoded at an encoding circuit corresponding to the transmission data #1 and must be decoded at a decoding circuit corresponding to the data #1 in the signal receiving apparatus 62. Below, in the third embodiment, the "state where the correspondence of data between the signal transmitting apparatus 10 side and the signal receiving apparatus 62 side is established" is defined as the "state where synchronization is established".

The signal receiving apparatus 62 has a phase shift function and out-of-synchronization detection function for establishment of synchronization.

The phase shift function shown here is a function where when for example input signals $IN_1, \ldots, IN_n$ are brought into correspondence with decoding circuits #1, #2 . . . , #n, respectively, the correspondence is shifted (phase shifted) one by one so as to correspond to the decoding circuits #2, #3, . . . , #n and #1.

The out-of-synchronization detection function is based on the principle explained below.

If noise etc. is not added during the transmission and the synchronization of data can be established even in the signal receiving apparatus, when the result obtained by performing the decoding by the Viterbi decoding circuit corresponding to the received input signal $IN_i$ is encoded by the Viterbi coding circuit corresponding to the input signal $IN_i$ again, the same information as the received input signal $IN_i$ should be obtained. On the other hand, even when noise is added during the transmission, if the added noise is of a level where transmission is possible, it coincides with the received series with a certain degree of probability.

Conversely, where synchronization of data is not established in the signal receiving apparatus, this means that for example the data corresponding to an input signal $IN_i$ is decoded by the not corresponding Viterbi decoding circuit j (i is not equal to j), so even if the result of this decoding is encoded by a Viterbi coding circuit j corresponding to the Viterbi decoding circuit j again, the result of encoding does not coincide with the input signal $IN_i$. The probability that the result of encoding by the Viterbi coding circuit j and the input signal $IN_i$ coincide with each other becomes near 1/2.

Here, the out-of-synchronization detection function indicated here is for detecting the out-of-synchronization of the data by utilizing the above fact. Use of any of the input signals $IN_1$ to $IN_2$ for the detection of the out-of-synchronization state is optional, but when the data having the least transmission error, that is, the data having the smallest encoding rate, is used for the detection of the out-of-synchronization state, the out-of-synchronization state can be most preferably detected. As shown in FIG. 17, the signal receiving apparatus 62 is constituted by a demodulation circuit 600, a demultiplexing circuit 610, n number of decoding circuits $620_i$, and a synchronization circuit 64.

The synchronization circuit 64 is constituted by a hard determination circuit (DET) 640, a delay circuit (DLY) 642, an encoding circuit (TCM) 644 corresponding to the decoding circuit $620_1$, and a comparison circuit 646.

The demodulation circuit 600, demultiplexing circuit 610, decoding circuits $620_i$, Viterbi decoding circuits $630_i$, deinterleave circuits $632_i$, and Reed-Solomon decoding circuits $634_i$ of the signal receiving apparatus 62 correspond to the demodulation circuit 300, demultiplexing circuit 310, decoding circuits $320_i$, Viterbi decoding circuits $330_i$, deinterleave circuits $332_i$, and Reed-Solomon decoding circuits $324_i$ of the signal receiving apparatus 30, respectively. The components of the signal receiving apparatus 62 have functions corresponding to the corresponding components of the signal receiving apparatus 30 and perform corresponding operations.

The signals received and input to the signal receiving apparatus 62 are demodulated by the demodulation circuit 600 and divided into the input signals $IN_1$ to $IN_n$ by the demultiplexing circuit 610.

The divided input signals $IN_1$ are input to the Viterbi decoding circuits $630_i$ and, at the same time, input to the hard determination circuit 640 of the synchronization circuit 64.

The hard determination circuit 640 determines the data corresponding to the signal point corresponding to the signal point of FIG. 14 having the smallest square Euclidean distance from the received signal point. Where there is no transmission error, the data obtained as the result of determination coincides with the result of encoding in the encoding circuit on the signal transmitting apparatus 10 side.

The result of determination by the hard determination circuit 640 is delayed at the delay circuit 642 exactly by the processing time in the Viterbi decoding circuit $630_1$ and output to the comparison circuit 646.

The Viterbi decoding circuit $630_1$ performs the Viterbi decoding on the input signal $IN_1$ and outputs the result to the deinterleave circuit $632_1$ and the encoding circuit 644.

The encoding circuit 644 perform Viterbi coding once again on the result of the Viterbi decoding by the Viterbi decoding circuit $630_1$ and outputs the data obtained to the comparison circuit 646.

Figure 18:
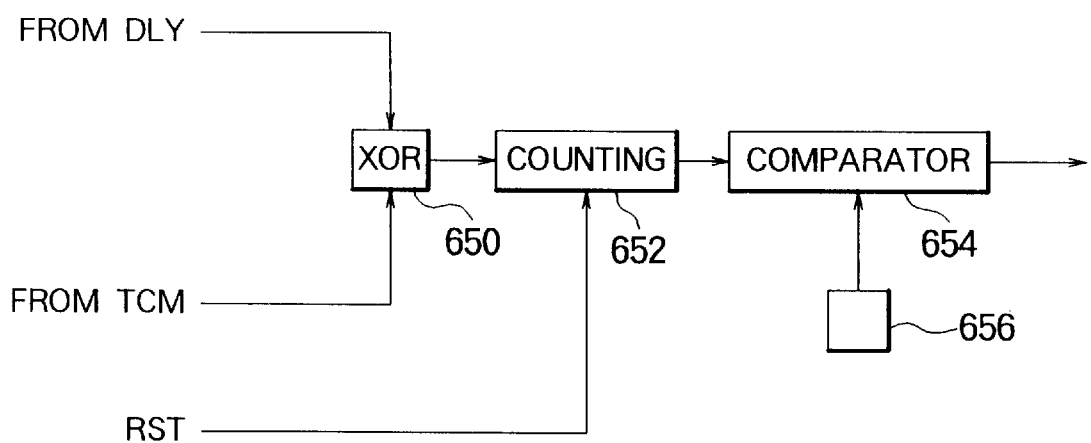
FIG. 18 is a view of the configuration of a comparison circuit shown in FIG. 17.

FIG. 18 is a view of the configuration of the comparison circuit (CMP) 646 shown in FIG. 17.

As shown in FIG. 18, the comparison circuit 646 is constituted by an exclusive-OR circuit (XOR) 650, a counting circuit 652, a comparator (comparison) circuit 654, and a register (REG) 656.

The comparison circuit 646 compares the data input from the encoding circuit 644 and the data delayed at the delay circuit 642 and where it detects that the error rate is larger than a predetermined number, outputs a detection value indicating that the out-of-synchronization state has occurred.

In the comparison circuit 646, the exclusive-OR (XOR) circuit 650 detects the mismatch of the data input from the delay circuit 642 and the encoding circuit 644 for every bit.

The counting circuit 652 counts the number of mismatches of the data detected at the comparison circuit 646 for example at every predetermined time and outputs the result of the count to the comparator 654.

The register 656 stores the reference value of the out-of-synchronization state. The comparator circuit 654 outputs a predetermined detection value, for example, a logical value 0 where the result of the count of the counting circuit 652 becomes larger than the reference value stored in the register 656.

As the reference value to be stored in the register 656, it is preferable to select a reference value compared to which the value counted at the counting circuit 652 becomes smaller within a range where the signal can be transmitted from for example the signal transmitting apparatus 10 (service is possible) and where synchronization is established and a reference value compared to which the value counted at the counter 652 becomes larger out of the service range or where the synchronization is not established within the service range.

As explained above, by monitoring the detection value output from the comparison circuit 646 of the synchronization circuit 64, the out-of-synchronization detection function can be realized.

Figure 19:
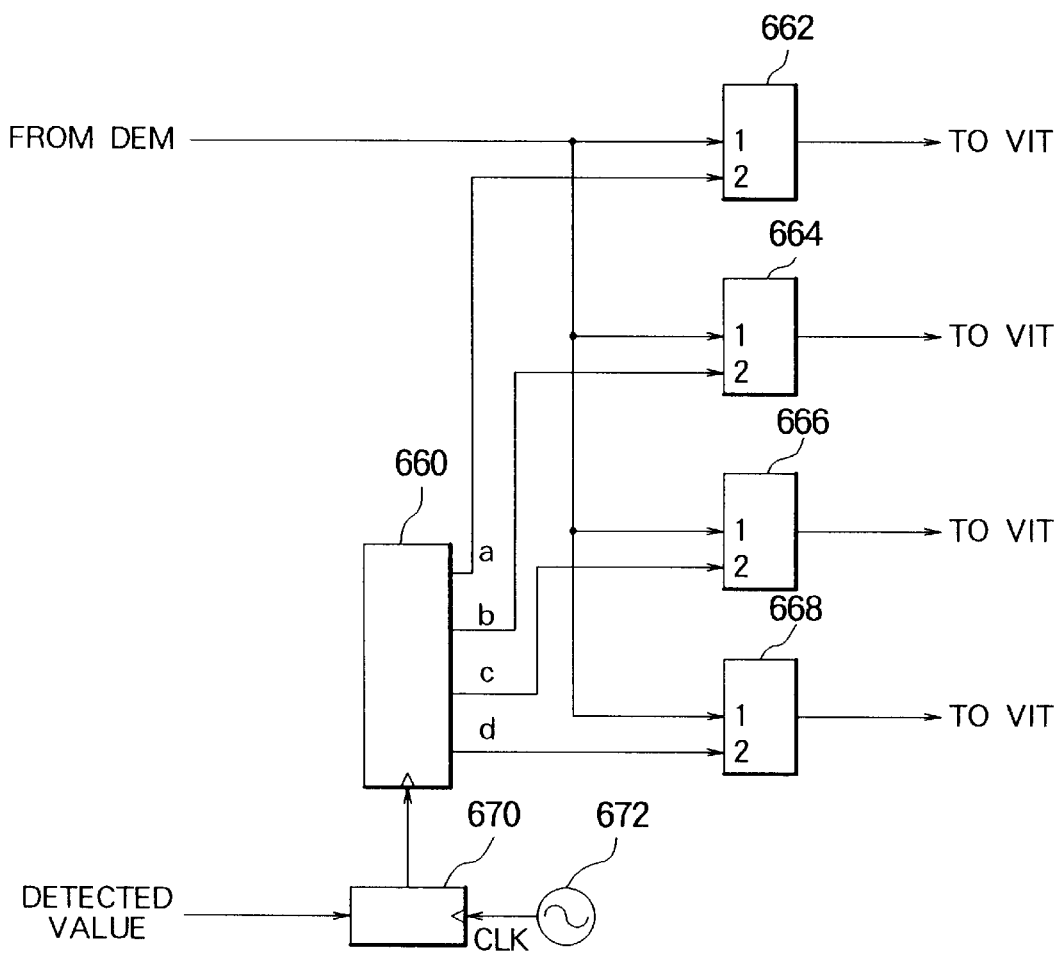
FIG. 19 is a view of the configuration of a demultiplexing circuit shown in FIG. 17 where n=4.

FIG. 19 is a view of the configuration of the demultiplexing circuit (DEMUX) 610 shown in FIG. 17 where n=4.

As shown in FIG. 19, the demultiplexing circuit 610 is constituted by latch circuits 662, 664, 666, and 668, a counting circuit (CTC) 660, a gate circuit (GATE) 670, and a clock generation circuit 672.

In the demultiplexing circuit 610, the output signal of the demodulation circuit 600 is input as the first input signal to the latch circuits 662, 664, 666, and 668.

On the other hand, the clock generation circuit 672 generates a clock signal CLK in synchronization with the output signal of the demodulation circuit 600 and outputs the same to the gate circuit 670.

The gate circuit 670 holds the clock signal CLK at the logical value 0 for 1 cycle only in a case where the detection value input from the synchronization circuit 64 is the logical value 0 and outputs the same to the counting circuit 660.

The counting circuit 660 changes the output signals (a, b, c, d) in the order of (1, 0, 0, 0),(0, 1, 0, 0), (0, 0, 1, 0), (0, 0, 0, 1), and (1, 0, 0, 0), . . . whenever the clock signal CLK is input.

The latch circuits 662, 664, 666, and 668 output the first input signal where the logical value of the second input signal is 1 and holds the output signal at that point of time where the second input signal has the logical value of 0.

Where the detection value of the synchronization circuit 64 is always the logical value 1, the output signals a to d of the counting circuit 660 become the logical value 1 in order and are input to the respective latch circuits 662, 664, 666, and 668 as the second input signals. Accordingly, the input signals 1 to 4 from the demultiplexing circuit 610 are respectively output to the Viterbi decoding circuits $630_1$ to $630_4$.

Where the detection value of the synchronization circuit 64 is the logical value 0, the clock signal CLK is not output from the gate circuit 670 to the counting circuit 660 exactly for the period of that cycle. Accordingly, even at the cycle of for example the next clock signal CLK, the output signal a of the counting circuit 660 becomes the logical value 1 and the other output signals b to d become the logical value 0. In this way, when the detection value of the synchronization circuit 64 becomes the logical value 0, the phases of the data supplied from the demultiplexing circuit 610 to the Viterbi decoding circuits $630_1$ to $630_4$ will shift.

In this way, during the period where the out-of-synchronization state is detected by the synchronization circuit 64, the phases of the data supplied from the demultiplexing circuit 610 to the Viterbi decoding circuits $630_1$ to $630_4$ are sequentially shifted. The phase shift is ended at the point of time when the out-of-synchronization state is no longer detected by the synchronization circuit 64.

The demultiplexing circuit 610 realizes the phase shift function as explained above.

Below, the operation of the signal receiving apparatus 62 will be simply explained.

The signal input to the signal receiving apparatus 62 is demodulated by the demodulation circuit 600, demultiplexed by the demultiplexing circuit 610, and input to the Viterbi decoding circuits $630_1$ to $630_4$ and the synchronization circuit 64.

The synchronization circuit 64 detects whether or not the signals output by the demultiplexing circuit 610 are input to the corresponding Viterbi decoding circuits $630_1$ to $630_4$, that is, synchronization is established.

The demultiplexing circuit 610 sequentially shifts the phases of the demultiplexed data during the period where the synchronization circuit 64 detects the out-of-synchronization state and supplies the resultant signals to the Viterbi circuits $630_1$ to $630_4$. After the synchronization circuit 64 no longer detects the out-of-synchronization states, its stops the shift of the phase of the demultiplexed data.

After the phase shift by the demultiplexing circuit 610 is ended, the signals output from the demultiplexing circuit 610 are correctly decoded by the respective Viterbi decoding circuits $630_1$ to $630_4$, deinterleave circuits $632_1$ to $632_4$, and Reed-Solomon decoding circuits $634_1$ to $634_4$ and signals corresponding to the input signals before transmission are reproduced.

According to the signal transmission systems 1 and 2 and the signal receiving apparatus 62 according to the present invention explained above in the first to third embodiments, when for example a television signal is transmitted by the digital format, a good television picture and sound can be provided when the signal level is large on the reception side and, at the same time, a television picture and sound having a certain degree of quality can be provided even in a case where the signal level is small.

Further, according to the signal transmission systems 1 and 2 and the signal receiving apparatus 62 according to the present invention explained above in the first to third embodiments, it does not become completely impossible to perform demodulation of signals where the C/N ratio of the received signal becomes less than a predetermined value, the signals can be decoded with am S/N ratio in accordance with a C/N ratio corresponding to the significance of the data transmitted, and in addition the throughput of the signal transmission is improved.

Fourth embodiment

Below, an explanation will be made of a fourth embodiment of the present invention referring to FIG. 20 to FIG. 25.

Figure 20:
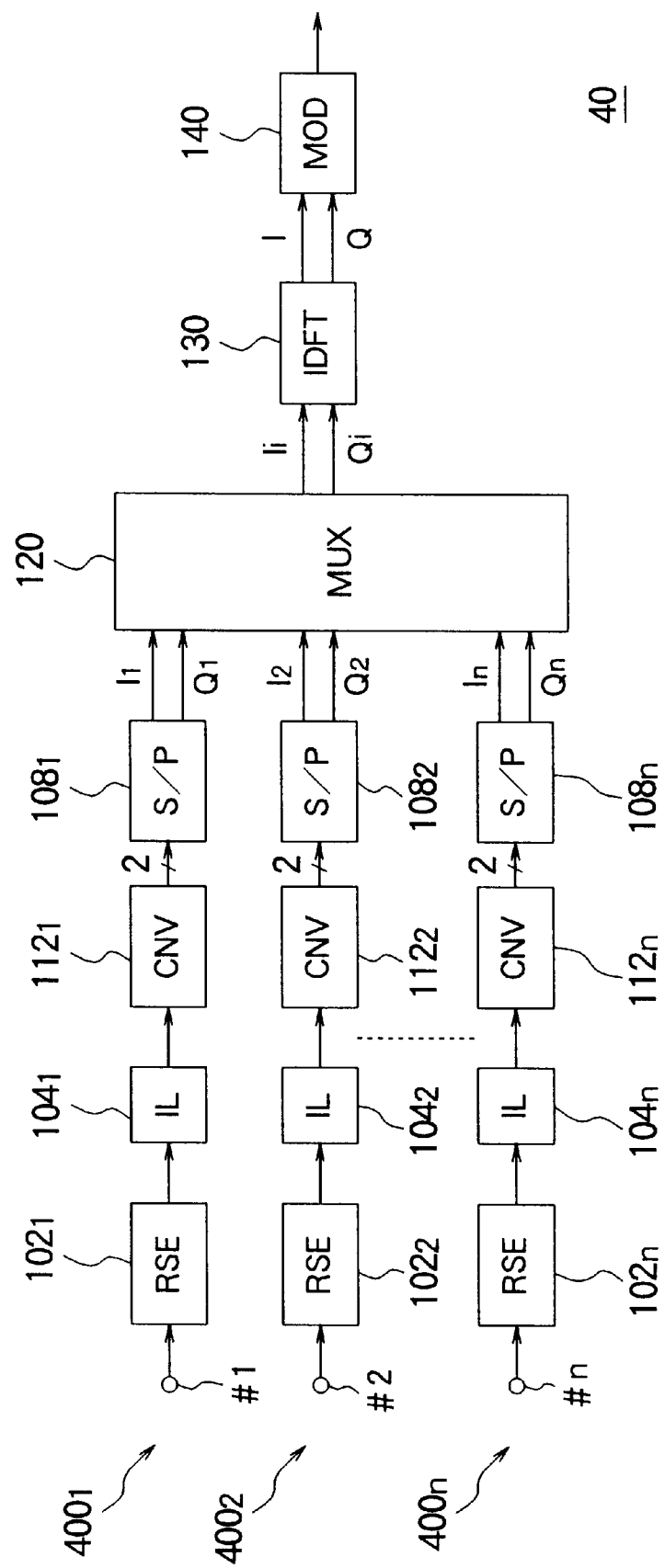
FIG. 20 is a view of a signal transmitting apparatus according to a fourth embodiment of the present invention.

FIG. 20 is a view of the configuration of a signal transmitting apparatus 40 according to the fourth embodiment of the present invention.

The signal transmitting apparatuses, signal receiving apparatuses, and methods of the same according to the fourth to seventh embodiments of the present invention explained below are constituted so as to perform the modulation and demodulation of the signals by utilizing inverse discrete Fourier transformation and discrete Fourier transformation unlike the signal transmitting apparatuses 10 and 12 and the signal receiving apparatuses 30, 32, and 62 shown in the first to the third embodiments.

The principle of operation in the fourth embodiment will be explained by taking as an example a case where the signal transmitting apparatus 10 and the signal receiving apparatus 30 used in the signal transmission system 1 shown in FIG. 3 in the first embodiment are replaced by the signal transmitting apparatus 40 and the signal receiving apparatus 50, respectively.

As shown in FIG. 20, the signal transmitting apparatus 40 is constituted by n number of coding circuits $400_i$ (i and n are integers, $1 \leq i \leq n$, the same below in the fourth embodiment) provided corresponding to the respective input signals $IN_1$ to $IN_n$, a multiplexing circuit (MUX) 120, an IDFT circuit 130, and a transformation circuit (MOD) 140.

The respective coding circuits 400, are constituted by input terminals #i, Reed-Solomon encoding circuits (RSE circuits) $102_i$, interleave circuits (IL) $104_i$, convolutional coding circuits (CNV circuit) $112_i$, and serial/parallel transformation circuits (S/P transformation circuit) $108_i$.

Further, the Reed-Solomon encoding circuits $102_i$ and interleave circuits $104_i$ of the signal transmitting apparatus 40 correspond to the components given the same symbols in the signal transmitting apparatus 10 shown in FIG. 4, have the same functions, and perform the same operations.

In the signal transmission system 1 using the signal transmitting apparatus 40 and the signal receiving apparatus 50, the signal transmitting apparatus 40 receives as input the data to be preliminarily transmitted (series of input information) as a plurality of input signals (series of information) divided in accordance with the significance of content of that data.

Due to these components, the signal transmitting apparatus 40 becomes a transmission apparatus using a type of an orthogonal frequency division multiplexing modulation system (OFDM modulation system). That is, the signal transmitting apparatus 40 establishes m number of carrier signals for the respective n number of input signals in the transmission band as shown in FIG. 23, gives QPSK modulation data to the respective carrier signals, modulates these carrier signals by the IDFT processing together, and transmits the same. In other words, the signal transmitting apparatus 40 performs convolutional coding on the input signals with respectively different encoding rates, multiplexes the same at the time slots for transmission, and further performs inverse discrete Fourier transformation (IDFT) using each of the multiplexed coded signals as the signal component of the frequency domain.

By the IDFT processing, the signals of the frequency domain are transformed to signals of the time domain to generate time domain signals. The time domain signals are transmitted via a communication transmission line 20 such as a satellite communication line to the signal receiving apparatus 50.

Here, the convolutional code means an error correction code in which the information is encoded while being sequentially convoluted in the code unlike a block code such as a Hamming code or RS code. As the method of decoding the convolutional code, the Viterbi decoding method is most frequently used.

Figure 21:
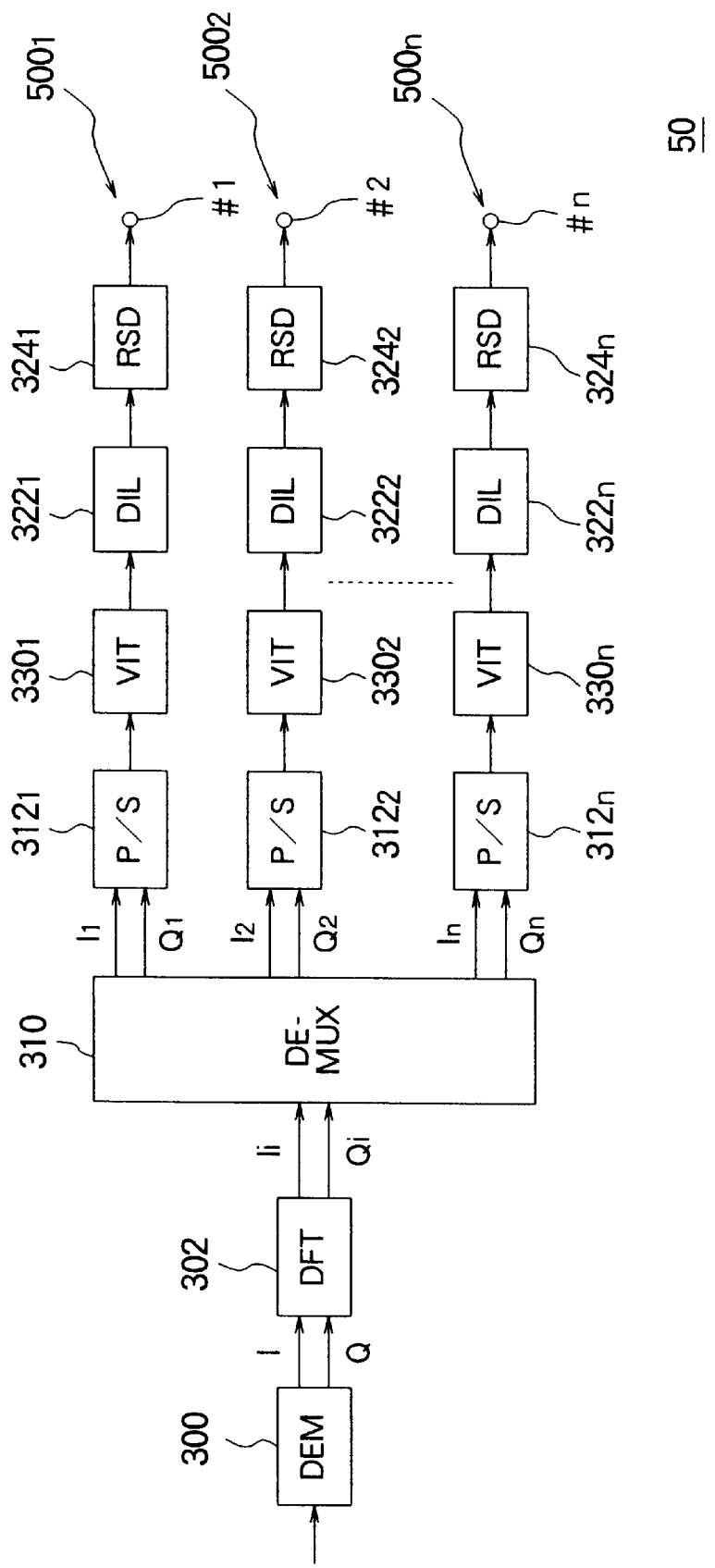
FIG. 21 is a view of a signal receiving apparatus according to the fourth embodiment of the present invention.

FIG. 21 is a view of the configuration of the signal receiving apparatus 50 according to the fourth embodiment of the present invention.

As shown in FIG. 21, the signal receiving apparatus 50 is constituted by the demodulation circuit (DEM) 300, DFT circuit 302, demultiplexing circuit (DEMUX) 310, and n number of decoding circuits $500_i$.

The decoding circuits $500_i$ are respectively constituted by parallel/serial transformation circuits (P/S transformation circuits) $312_i$, deinterleave circuits (DIL) $322_i$, Viterbi decoding circuits (VIT circuits) $330_i$, Reed-Solomon decoding circuits (RSD circuits) $324_i$, and the output terminals #i.

Note that, the Reed-Solomon decoding circuits $324_i$ and the deinterleave circuits $322_i$ of the signal receiving apparatus 50 correspond to the components of the signal receiving apparatus 30 shown in FIG. 5 given the same symbols, have the same functions, and perform the same operations.

Due to these components, the signal receiving apparatus 50 performs discrete Fourier transformation (DfT) on the modulated signals of the time domain of the OFDM modulation system transmitted from the signal transmitting apparatus 40 via the communication transmission line 20, transforms the same to signals of the frequency domain, reproduces the multiplexed transmission signal, demultiplexes it into the respective coded signals, and performs Viterbi decoding to reproduce the respective input signals of the signal transmitting apparatus 40.

Below, an explanation will be made of the operation of the signal transmission system 1 using the signal transmitting apparatus 40 and the signal receiving apparatus 50.

As mentioned above, the data to be transmitted is preliminarily divided into n number of portions (input signals $IN_i$) in accordance with their significance before being input to the signal transmitting apparatus 40. The input signals $IN_i$ are input to the respective input terminals #i in the manner that for example the input signal $IN_1$ having the highest significance among the input signals $IN_i$ is input to the input terminal #1, the input signal $IN_2$ having the second highest significance is input to the input terminal #2, and the input signal having the lowest significance is input to the input terminal #n.

The input signals $IN_i$ respectively input to the input terminals #i are subjected to Reed-Solomon encoding at the RSE circuits $102_i$ and output as the Reed-Solomon encoded signals $RSE_i$ to the interleave circuits $104_i$.

The Reed-Solomon encoded signals RSE, input to the interleave circuits $104_i$ are interleaved and output as the interleaved signals $IS_i$ to the CNV circuits $112_i$.

Figure 22:
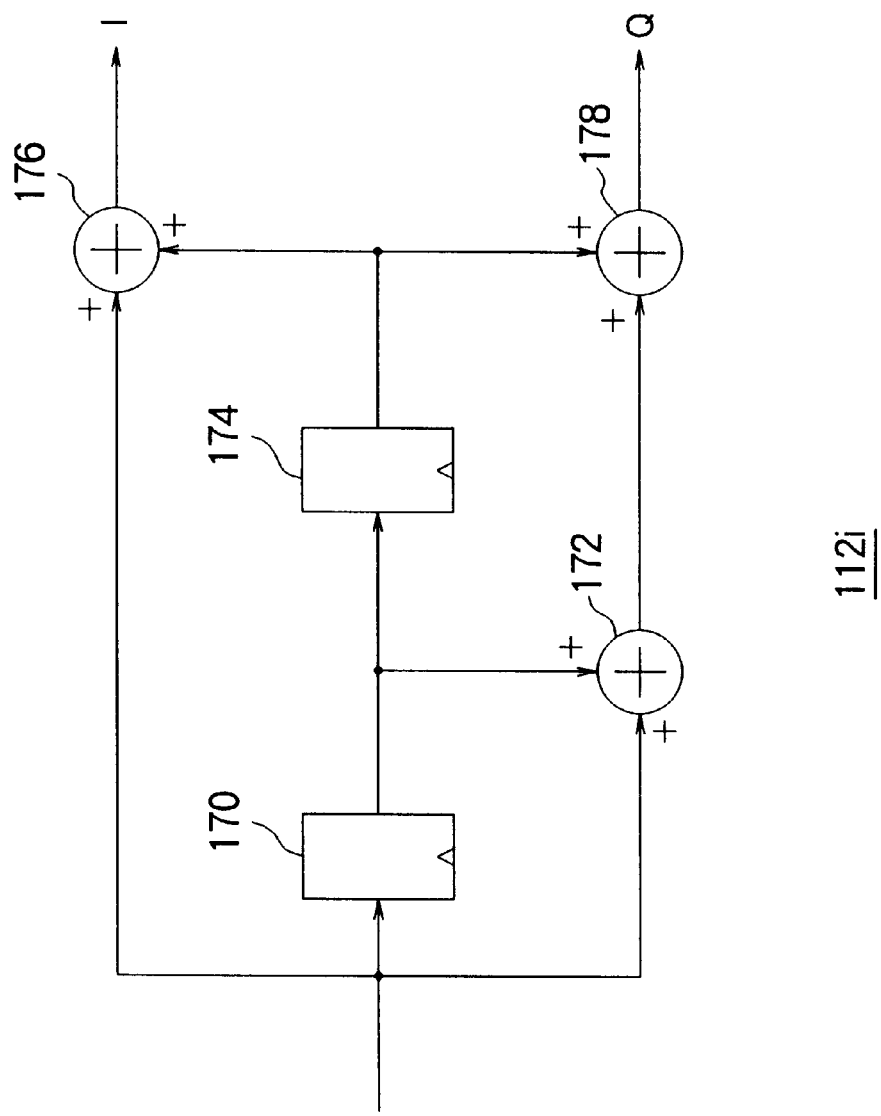
FIG. 22 is a view of one example of the configuration of a CNV circuit shown in FIG. 20.

FIG. 22 is a view of one example of the configuration of the CNV circuits $112_i$ shown in FIG. 20.

FIG. 22 shows a case where the constraint length is 3 and the encoding rate is 1/2 and the CNV circuits $112_i$ are constituted by register circuits 170 and 174 and addition circuits (exclusive-OR circuit) 172, 176, and 178.

The interleaved signals $IS_1$ input from the interleave circuits $104_i$ are input to the register circuit 170 and the addition circuits 172 and 176.

The register circuits 170 and 174 shift the interleaved signals $IS_i$ every cycle at which an interleaved signal $IS_i$ is input and output the interleaved signals $IS_i$ to the addition circuit 172 and the addition circuits 176 and 178, respectively.

The addition circuit 172 adds the input interleaved signals $IS_i$ and the interleaved signals $IS_i$ of one cycle before held by the register circuit 170 (calculates the exclusive-OR) and outputs the result to the addition circuit 178.

The addition circuit 176 adds the input interleaved signals $IS_i$ and the interleaved signals $IS_i$ of two cycles before held by the register circuit 174 and outputs the Y1 component of the convolutional coded signals $CNS_i$.

The addition circuit 178 adds the result of addition of the addition circuit 172 and the interleaved signals $IS_i$ of two cycles before held by the register circuit 174 and outputs the Y2 component of the convolutional coded signals $CNS_i$. Here, although not illustrated, the CNV circuits $112_i$ include circuits for transforming these plurality of outputs to serial signals. The serial signals are output to the serial/parallel transformation circuits (S/P transformation circuits) $108_i$. The real number component I and the imaginary number component Q of the convolutional coded signals $CNS_i$ are output from the serial/parallel transformation circuits (S/P transformation circuits) $108_i$.

FIG. 22 shows a case of an encoding rate of 1/2. Since the encoding rate is changed in accordance with the significance of the interleaved signals $IS_i$, by changing the configuration for every CNV circuit $112_i$, the convolutional coding is carried out while changing the encoding rate. Further, where the same circuit shown in FIG. 22 is used for all of the CNV circuits $112_i$, as will be mentioned later in the fifth embodiment, it is also possible to use a punctured circuit according to need and realize convolutional coding of an encoding rate in accordance with the significance of the interleaved signals by the puncturing.

Due to these components, the interleaved signals $IS_i$ input to the CNV circuits $112_i$ are subjected to convolutional coding with encoding rates corresponding to the input signals $IN_i$. That is, the interleaved signal $IS_i$ corresponding to the input signal $IN_1$ having the highest significance is encoded by convolutional coding of the smallest ratio of the amount of data before the convolutional coding with respect to the amount of data after the convolutional coding (small encoding rate) compared with those of the interleaved signals $IS_2$ to $IS_n$ and output as the convolutional coded signal $CNS_1$ to the S/P transformation circuit $108_1$.

Further, the interleaved signals $IS_2$ to $IS_{n-1}$ are coded by convolutional coding, where the higher the significance of the corresponding input signals $IN_2$ to $IN_{n-1}$ the smaller the encoding rate, by the CNV circuits $112_i$ and output as the convolutional coded signals $CNS_2$ to $CNS_{n-1}$ to the S/P transformation circuits $108_i$.

Similarly, since the significance of the corresponding input signal $IN_n$ is the lowest, the interleaved signal $IS_n$ is encoded by convolutional coding having a larger encoding rate than the interleaved signals $IS_1$ to $IS_{n-1}$ by the CNV circuit $112_n$ and output as the convolutional coded signal $CNS_n$ to the S/P transformation circuit $108_n$.

As mentioned above, the convolutional coded signal $CNS_i$ has a higher capability of correcting the data error and has a high reliability as the encoding rate is smaller. Accordingly, in the respective CNV circuits $112_i$, by performing the encoding with encoding rates corresponding to the significance of the input signals $IN_i$, convolutional coded signals $CNS_i$ having an ability to correct data error in accordance with the significance of the respective input signals can be generated.

The convolutional coded signals $CNS_i$ input to the S/P transformation circuits $108_i$ are transformed to signals of a 2 bit-parallel format and output as the parallel signals $PRS_i$ consisting of two mutually orthogonal signal components I and Q to the multiplexing circuit 120. Note that, the orthogonal signal components I and Q of the parallel signals $PRS_i$ indicate the signal points in the frequency domain in the modulation circuit 140.

The parallel signals $PRS_i$ input to the multiplexing circuit 120 are multiplexed assigned to corresponding time slots (time slots $TS_i$) in n number of time slots for transmission and output as the multiplexed signals consisting of the mutually orthogonal orthogonal signal components I and Q to the IDFT circuit 130.

The parallel signals PRS, sequentially input to the IDFT circuit 130 are subjected to IDFT (inverse discrete Fourier transformation) and output to the modulation circuit 140. That is, the IDFT circuit 130 performs IDFT processing on the orthogonal signal components I and Q of each of the parallel signals $PRS_1$ to $PRS_n$ sequentially input as the multiplexed signals as the signal component of the frequency domain to transform the same to the signals of the time domain and outputs the result as the time domain signals to the modulation circuit 140.

Note that, the reason why the parallel signals $PRS_i$ are multiplexed by the multiplexing circuit 120 is that there is a limit to the number of the input/output terminals of the IDFT circuit 130, that is, there is a problem of the pins of the IDFT circuit 130. That is, where the IDFT circuit 130 performs IDFT processing on 1024 input signals, a number of input/output terminals commensurate with this becomes necessary, but in general it is difficult to provide such a large number of input/output terminals. Therefore, the IDFT circuit 130 is constituted so that the signals multiplexed by the multiplexing circuit 120 are buffered in an input/output memory provided inside the IDFT circuit 130 and then used for the IDFT processing.

The modulation circuit 140 performs orthogonal modulation on the time domain signals and transmits the result via the communication transmission line 20 to the signal receiving apparatus 50.

That is, by the IDFT processing of the IDFT circuit 130, the data obtained by multiplexing the data corresponding to each encoding rate (parallel signals $PRS_i$) are collectively modulated and the parallel signals PRS, that is, the signals of the real number component and the signals of the imaginary number component of the time domain are shifted to the carrier band by the modulation circuit 140.

Below, an explanation will be made of the time domain signals referring to FIG. 23 and FIG. 24.

FIG. 23 is a view of the situation where the time domain signals generated in the IDFT circuit 130 are output as the sum of the time direction to the modulation circuit 140. FIG. 24 is a view for explaining the situation of orthogonal modulation on the real number component and the imaginary number component of the time domain signals generated in the IDFT circuit 130.

When assuming that m number of carrier signals (carriers) are individually assigned to the respective n number of classified input signals, the number of the carrier signals of the OFDM modulation becomes N=n×m. When the signals input to the input terminals $\#_i$ are assigned to the (j×n+i)-th carrier signal ($0 \leq j \leq m-1$; j is an integer) as shown in FIG. 23, the influence of selective fading etc. can be reduced by the interleave effect of the frequency. In the IDFT circuit 130, the signals which are successively input are recognized as the modulated information of the respective carrier signals in the frequency domain, collectively modulated to QPSK signals for every n number of carrier signals (for every symbol), and a signal of the sum of the time domain signals of each carrier signal is generated and output to the modulation circuit 140 in the time direction in the order for every symbol.

Further, as shown in FIG. 24A, for the respective n number of carrier signals of the frequencies $f_{11}, f_{21}, \ldots, f_{n1}$, $f_{12}, f_{22}, \ldots, f_{n2}, \ldots, f_{nm}$, the signal point of the QPSK modulation of the frequency domain with respect to a carrier signal of for example the frequency $f_{11}$ is modulated to have an amplitude of $\sqrt{2}$ and a phase of 45°, and the signal point of the QPSK modulation of the frequency domain corresponding to the carrier signal of the frequency $f_{nm}$ is modulated to have an amplitude of $\sqrt{2}$ and a phase of 225°.

N number of frequency domain signals including these amplitude information and phase information are transformed to signals of the time domain by the IDFT circuit 130, where the real number component (orthogonal signal component I) and the imaginary number component (orthogonal signal component Q) are obtained as shown in FIG. 24B.

The modulation circuit 140 performs the orthogonal modulation on the time domain signals shown in FIG. 24B to generate the transmission signal as shown in FIG. 24C and transmits the same to the signal receiving apparatus.

Below, an explanation will be made of the operation of the signal receiving apparatus 50.

The signal receiving apparatus 50 which receives the time domain signals from the signal transmitting apparatus 40 via the communication transmission line 20 sequentially performs processing substantially reverse to that of the signal transmitting apparatus 40 on the time domain signals to decode the input signals $IN_i$.

The time domain signals transmitted from the signal transmitting apparatus 40 via the communication transmission line 20 to the signal receiving apparatus 50 are demodulated at the demodulation circuit 300 and output as the demodulated signals consisting of the orthogonal signal components I and Q to the DFT circuit 302. The demodulated signals correspond to the time domain signals output from the IDFT circuit 130 to the modulation circuit 140 in the signal transmitting apparatus 40.

The demodulated signals input to the DFT circuit 302 are transformed from the signals of the time domain to the signals of the frequency domain by the Fourier transformation by the DFT circuit 302 and output as the frequency domain signals to the demultiplexing circuit 310. Note that, the frequency domain signals correspond to the multiplexed signals output from the multiplexing circuit 120 to the IDFT circuit 130 in the signal transmitting apparatus 40.

The frequency domain signals input to the demultiplexing circuit 310 are demultiplexed for every time slot and output as the demultiplexed signals $DS_i$ including the mutually orthogonal orthogonal signal components I and Q to the P/S transformation circuits $312_i$ of the decoding circuits $500_i$. The demultiplexed signals $DS_i$ correspond to the multiplexed signals output from the S/P transformation circuits $108_i$ to the multiplexing circuit 120.

The demultiplexed signals $DS_i$ input to the P/S transformation circuits $312_i$ are subjected to parallel/serial transformation and output as the serial signals $SRS_i$ to the Viterbi decoding circuits $330_i$. The serial signals $SRS_i$ correspond to the convolutional coded signals $CNS_i$ which are output from the CNV circuits $112_i$ to the S/P transformation circuits $108_i$ in the signal transmitting apparatus 40.

The serial signals $SRS_i$ input to the Viterbi decoding circuits $330_i$ are Viterbi-decoded and output as the Viterbi decoded signals $VDS_i$ to the deinterleave circuits $322_i$. The Viterbi decoded signals $VDS_1$ correspond to the interleaved signals $IS_i$ output from the interleave circuits $104_i$ to the CNV circuits $112_i$.

The Viterbi decoded signals $VDS_i$ input to the deinterleave circuits $322_i$ are subjected to processing reverse to that of the interleave circuits $104_i$ and output as the deinterleaved signals $IS_i$ to the RSD circuits $324_i$. The deinterleaved signals $IS_i$ correspond to the Reed-Solomon encoded signals $RSE_i$ output from the RSE circuits $102_i$ to the interleave circuits $104_i$.

The deinterleaved signals $SI_i$ input to the RSD circuits $324_i$ are subjected to Reed-Solomon decoding to be decoded to the input signals $IN_i$ before transmission and are output from the output terminals #i.

As mentioned above, in the signal transmission system 1, among the data to be transmitted, the signal transmitting apparatus 40 encodes the input signals $IN_i$ divided as portions having a high significance by a convolutional code having a small encoding rate, whereby the transmission thereof can be secured even in a case where the state of reception becomes poor (C/N ratio of the received signal is low) on the signal receiving apparatus 50 side.

Further, the signal transmitting apparatus 40 encodes the input signals $IN_i$ divided as the portions having a low significance among the data to be transmitted by a convolutional code having a large encoding rate, whereby it can transmit the input signals $IN_i$ with a good efficiency where the state of reception of the signal receiving apparatus 50 side is good (the C/N ratio of the received signal is high).

Fifth embodiment

Below, a fifth embodiment of the present invention will be explained referring to FIG. 25 and FIG. 26.

Figure 25:
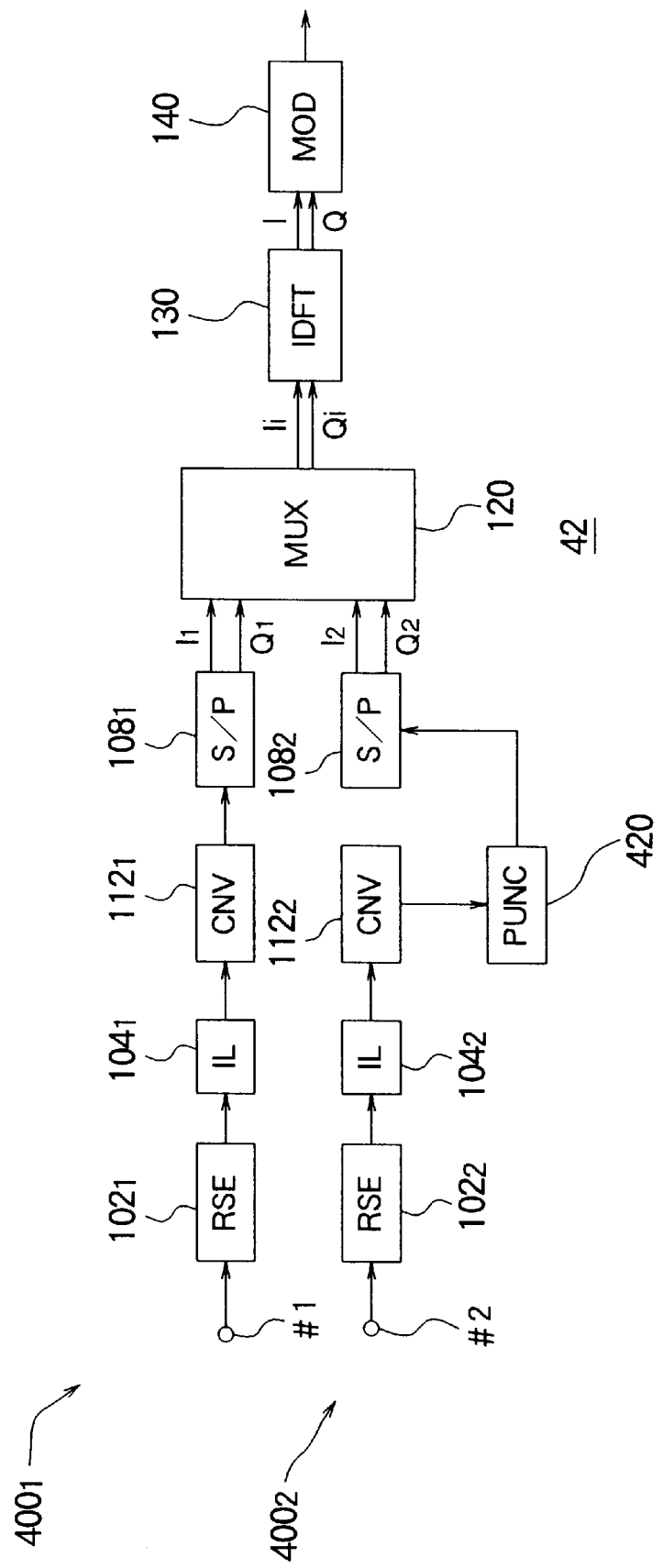
FIG. 25 is a view of a signal transmitting apparatus according to a fifth embodiment of the present invention.

FIG. 25 is a view of the configuration of a signal transmitting apparatus 42 according to the fifth embodiment of the present invention.

Figure 26:
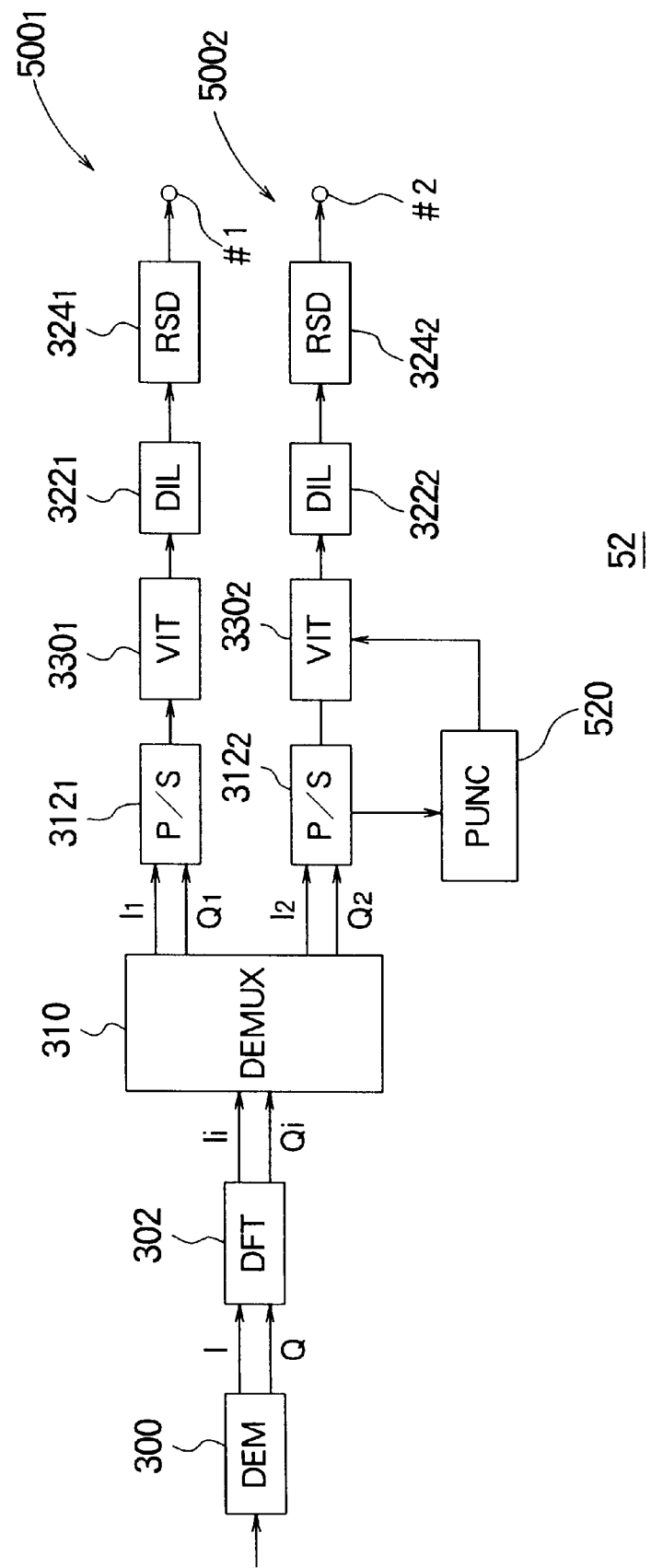
FIG. 26 is a view of a signal receiving apparatus according to the fifth embodiment of the present invention.

FIG. 26 is a view of the configuration of the signal receiving apparatus 52 according to the fifth embodiment of the present invention.

The signal transmitting apparatus 42 and the signal receiving apparatus 52 respectively shown in FIG. 25 and FIG. 26 are specific embodiments of the signal transmitting apparatus 40 and the signal receiving apparatus 50 shown in the fourth embodiment. For example, they are used replacing with the signal transmitting apparatus 12 and the signal receiving apparatus 32, respectively, in the signal transmission system 2 (FIG. 9).

As shown in FIG. 25, the signal transmitting apparatus 42 is constituted by two encoding circuits $400_i$, a multiplexing circuit 120, an IDFT circuit 130, and a modulation circuit 140.

The encoding circuits $400_i$ are respectively constituted by RSE circuits $102_i$, interleave circuits $104_i$, CNV circuits $112_i$, and S/P transformation circuits $108_i$. The encoding circuit $400_2$ further has a punctured circuit (PUNC) 420 (i=1, 2; the same below in the fifth embodiment).

Note that, the configuration of the CNV circuits $112_1$ and $112_2$ is the configuration shown in for example FIG. 22. The circuits perform the same operation. Note that, as mentioned above, the encoding rate of the CNV circuit $112_2$ is changed by the processing in the punctured circuit 420.

The signal transmitting apparatus 42 comprises the signal transmitting apparatus 40 shown in the fourth embodiment used for the transmission of a television signal of a digital format and where n=2. The input signals $IN_i$ input to the input terminals i of the signal transmitting apparatus 42 are divided into two classes corresponding to their significance. The input signal $IN_1$ is a signal having a high significance necessary for transmitting the basic picture and sound in the television signal, and the input signal $IN_2$ is additional data used for achieving a high quality for the picture and sound and is a signal having a lower significance than the input signal $IN_1$.

Note that, the encoding circuits $400_i$, multiplexing circuit 120, IDFT circuit 130, modulation circuit 140, RSE circuits $102_i$, interleave circuits $104_i$, CNV circuits $112_i$, and the S/P transformation circuits $108_i$ of the signal transmitting apparatus 42 correspond to the encoding circuits $400_i$, multiplexing circuit 120, IDFT circuit 130, modulation circuit 140, RSE circuits $102_i$, interleave circuits $104_i$, CNV circuits $112_i$, and S/P transformation circuits $108_i$ of the signal transmitting apparatus 40 shown in FIG. 20, respectively. The components of the signal transmitting apparatus 42 have functions corresponding to the components of the corresponding signal transmitting apparatus 40 and perform the corresponding operations.

As shown in FIG. 26, the signal receiving apparatus 52 is constituted by the demodulation circuit 300, the DFT circuit 302, the demultiplexing circuit 310, and two decoding circuits $500_i$.

The decoding circuit $500_1$ is constituted by the P/S transformation circuit $312_1$, Viterbi decoding circuit $330_1$, deinterleave circuit $322_1$, and RSD circuit $324_1$. The decoding circuit $500_2$ further has a punctured circuit 520 in addition to these components.

The signal receiving apparatus 52 comprises the signal receiving apparatus 50 shown in the fourth embodiment used for reception of a television signal of a digital format and where n=2. It decodes the input signals $IN_i$ from the time domain signals received from the communication transmission line 20.

Note that, the demodulation circuit 300, DFT circuit 302, demultiplexing circuit 310, decoding circuits $500_i$, P/S transformation circuits $312_i$, Viterbi decoding circuits $330_i$, deinterleave circuits $322_i$, and RSD circuits $324_i$ of the signal receiving apparatus 52 correspond to the demodulation circuit 300, DFT circuit 302, demultiplexing circuit 310, decoding circuits $500_i$, P/S transformation circuits $312_i$, Viterbi decoding circuits $330_i$, deinterleave circuits $322_i$, and the RSD circuits $324_i$ of the signal receiving apparatus 50 shown in FIG. 21, respectively. The components of the signal receiving apparatus 52 have functions corresponding to the components of the corresponding signal receiving apparatus 50.

Below, the operation of the signal transmission system 1 (FIG. 3) in the case of using the signal transmitting apparatus 42 and the signal receiving apparatus 52 will be simply explained.

The RSE circuits $102_i$ and the interleave circuits $104_i$ process the input signals $IN_1$ and $IN_2$ respectively input from the input terminals #1 and #2 of the signal transmitting apparatus 40 and output the results as the interleaved signals $IS_1$ and $IS_2$ to the CNV circuits $112_1$ and $112_2$, respectively.

The CNV circuit $112_1$ performs convolutional coding on the interleaved signal $IS_1$ with an encoding rate of 1/2 and outputs the result as the convolutional coded signal $CNS_1$ to the S/P transformation circuit $108_1$.

The CNV circuit $112_2$ performs convolutional coding on the interleaved signal $IS_2$ with an encoding rate of 1/2, further increases the encoding rate via the punctured circuit 420, and outputs the result as the convolutional coded signal $CNS_2$ to the S/P transformation circuit $108_2$.

The punctured circuit 420 removes the predetermined bit of the convolutional coded signal $CNS_2$ input from the CNV circuit $112_2$, performs the puncturing, and makes the encoding rate 3/4. Note that, the removed bit is subjected to bit position detection on the signal receiving apparatus 52 side and an adequate value is applied.

The S/P transformation circuits $108_i$ transform the convolutional coded signal $CNS_1$ input from the CNV circuit $112_1$ and the convolutional coded signal $CNS_2$ input from the punctured circuit 420 to the parallel signals $PRS_1$ and $PRS_2$ and output the same to the multiplexing circuit 120.

The multiplexing circuit 120 multiplexes the parallel signals $PRS_1$ and $PRS_2$ and outputs the result as the multiplexed signals to the IDFT circuit 130.

The IDFT circuit 130 performs the IDFT processing on the parallel signals $PRS_1$ and $PRS_2$ and outputs the result to the modulation circuit 140.

The modulation circuit 140 modulates the signals contained at the time slots $TS_1$ and $TS_2$ of the multiplexed signals by the QPSK modulation system and transmits the result to the signal receiving apparatus 52.

The signals transmitted to the signal receiving apparatus 52 are input to the demodulation circuit 300.

The demodulation circuit 300 demodulates the input signals by the QPSK demodulation system, respectively, and outputs the results to the DFT circuit 302.

The DFT circuit 302 performs DFT processing on the signals of the base band input from the demodulation circuit 300 and outputs the result as the frequency domain signals to the demultiplexing circuit 310.

The demultiplexing circuit 310 demultiplexes the frequency domain signals for every time slot and outputs the results as the demultiplexed signals $DS_i$ to the Viterbi decoding circuit $330_1$ via the P/S transformation circuit $312_1$ or via the P/S transformation circuit $312_2$ and the punctured circuit 520.

The Viterbi decoding circuit $330_1$ performs the Viterbi decoding on the demultiplexed signal $DS_1$ by the Viterbi decoder for the convolutional code of the encoding rate of 1/2 and outputs the result as the Viterbi decoded signal $VDS_1$ to the deinterleaving circuit $322_1$.

The Viterbi decoding circuit $330_2$ performs the Viterbi decoding on the signal with the bit inserted at the punctured circuit 520 by the Viterbi decoder for the convolutional code of the encoding rate of 1/2 and outputs the result as the Viterbi decoded signal $VDS_2$ to the deinterleave circuit $322_2$.

The punctured circuit 520 performs the processing reverse to that at the punctured circuit 420, that is, detects the position of the bit removed at the punctured circuit 420 of the signal transmitting apparatus 42, supplements an appropriate value for this, and outputs the result to the deinterleave circuit $322_2$.

The deinterleave circuit $322_i$ performs deinterleaving on the Viterbi decoded signals $VDS_i$ and outputs the result to the RSD circuits $324_i$. The RSD circuits $324_i$ perform Reed-Solomon decoding on the input signals and reproduce the original input signals $IN_i$.

Below, an explanation will be made by using FIG. 27 of the relationship between the C/N ratio and the S/N ratio in the signal transmission system 2 (FIG. 9) using the signal transmitting apparatus 42 and the signal receiving apparatus 52 shown in the fifth embodiment and constituted so that the signal decoded by the signal receiving apparatus 52 is displayed on the image processing and displaying device 60.

Figure 27:
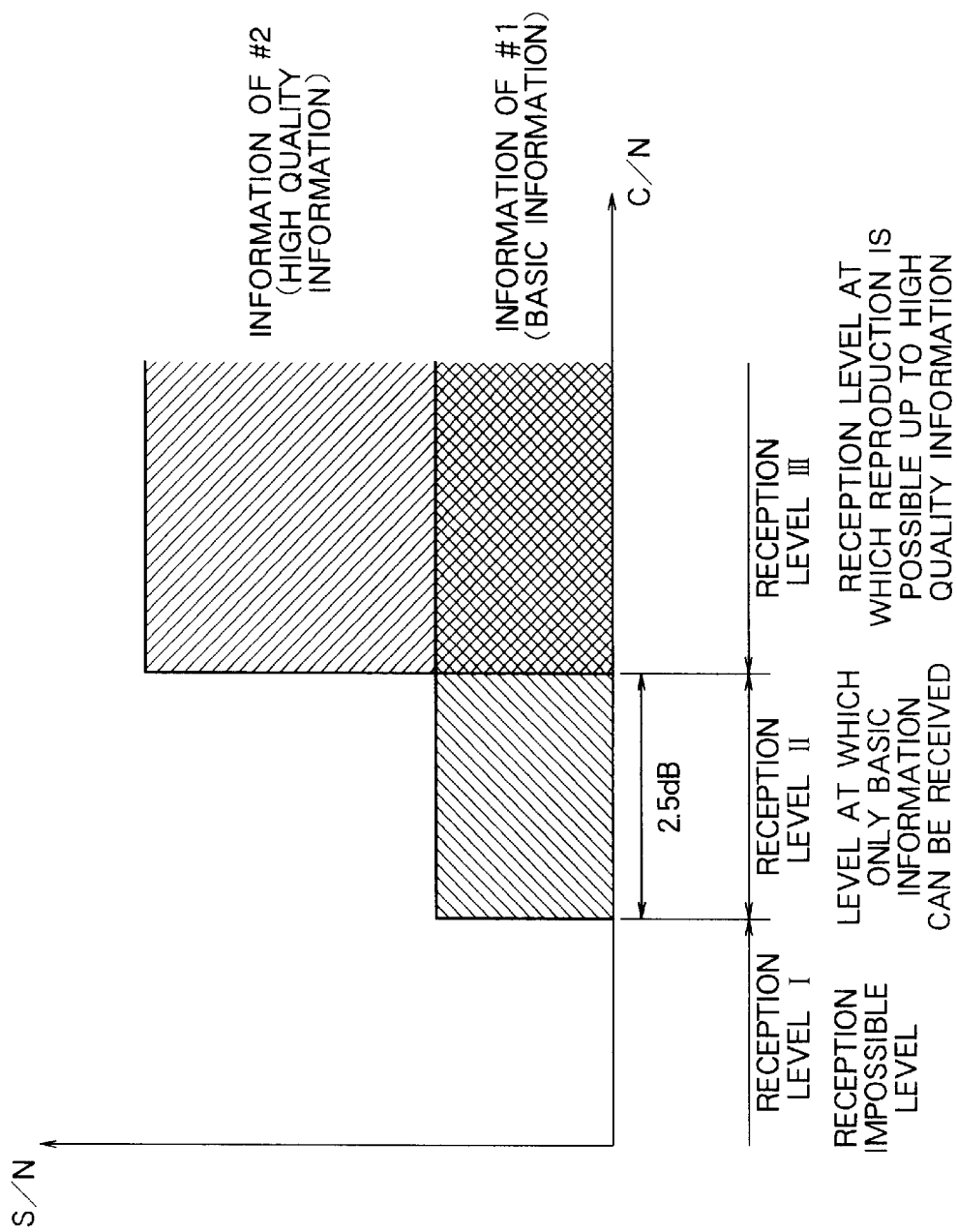
FIG. 27 is a view of the relationship between the C/N ratio and the S/N ratio in the signal transmission system when the signal transmitting apparatus and signal receiving apparatus shown in the fifth embodiment are used and the signal decoded by the signal receiving apparatus is displayed on an image processing and displaying device.

As shown in FIG. 27, in the region where the C/N ratio of the received signal in the signal receiving apparatus 52 is larger than a predetermined value (reception level III), reproduction is possible up to the input signal $IN_2$ in the signal receiving apparatus 52, so the image processing and displaying device 60 can display a high quality picture with the additional information and can output the sound.

Further, in the region where the C/N ratio of the received signal in the signal receiving apparatus 52 is lowered and becomes smaller than a predetermined value (reception level II), the additional information cannot be reproduced, but the input signal IN, can be reproduced, so the image processing and displaying device 60 can display a basic picture without the additional information and can output the sound. The region of this reception level II continues up to the region where the C/N ratio of the received signal becomes further lower than the predetermined value by 2.5 dB.

In the region where the C/N ratio of the received signal is further lowered (reception level I), however, the display of the video signal etc. by the image processing and displaying device 60 becomes impossible.

Here, the S/N ratio of the ordinate in FIG. 27 is the value obtained where only the reproduced input signal $IN_1$ is used in the region of the reception level II and is a value obtained where both of the reproduced input signals $IN_1$ and $IN_2$ are used in the region of the reception level I.

In the signal transmitting apparatus 42 shown in the fifth embodiment, there were two input signals and there were two coding circuits $400_i$ and decoding circuits $500_i$ corresponding to them, but the number of the input signals is not restricted to two.

Further, when increasing the number of the input signals, it is necessary to increase the number of the encoding circuits $400_i$ and decoding circuits $500_i$ in accordance with the number of the input signals. In this way, where the signal transmitting apparatus 42 and the signal receiving apparatus 52 are constituted so as to handle finely divided input signals, the region of the reception level shown in FIG. 27 can be made smaller, so the characteristic can be brought closer to the desirable characteristic shown in FIG. 2.

According to the signal transmission system 1 according to the present invention using the signal transmitting apparatus 40 and the signal receiving apparatus 50 shown in the fourth embodiment or the signal transmitting apparatus 42 and the signal receiving apparatus 52 shown in the fifth embodiment explained above, the amount of information corresponding to the reception level (C/N ratio of the received signal) can be received on the reception side. Accordingly, transmission of data corresponding to "graceful degradation" can be carried out.

Further, in the signal transmitting apparatuses 40 and 42 of the signal transmission systems 1 and 2 according to the present invention, a plurality of input signals are respectively subjected to Reed-Solomon encoding and subjected to convolutional coding and then multiplexed and subjected to OFDM modulation. Further, in the signal receiving apparatuses 50 and 52, the respective input signals (information series) are decoded from the received signal, so the operating speed of the code modulation circuit and decoding circuit can be slower than that of the case where the encoding is carried out after multiplexing the series of information as in the conventional system. Accordingly, the encoding and decoding can be carried out on a time domain signal of a higher speed compared with the conventional system.

Sixth embodiment

Below, a sixth embodiment according to the present invention will be explained referring to FIG. 28 to FIG. 31.

In the sixth embodiment, an explanation will be made of the operating principle of the signal transmission system wherein the signal transmitting apparatuses 10 and 40 and the signal receiving apparatuses 30 and 50 in the signal transmission system 1 shown in the first and fourth embodiments are replaced by the signal transmitting apparatus 44 and signal receiving apparatus 54 shown in FIG. 28 and FIG. 29, respectively.

Figure 28:
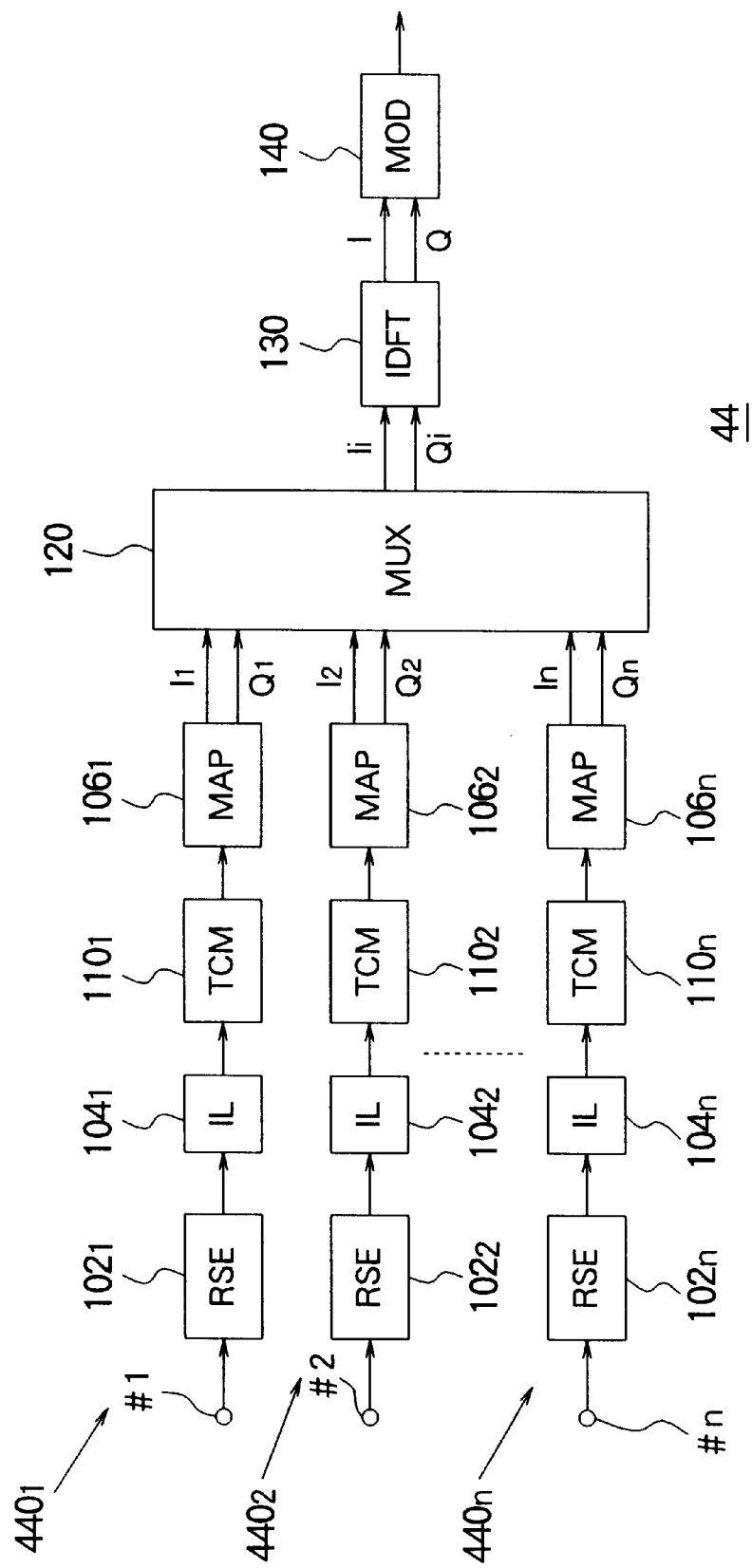
FIG. 28 is a view of the configuration of a signal transmitting apparatus according to a sixth embodiment of the present invention.

FIG. 28 is a view of the configuration of the signal transmitting apparatus 44 according to the sixth embodiment of the present invention.

As shown in FIG. 28, the signal transmitting apparatus 44 is constituted by n number of coding circuits $440i$, a multiplexing circuit 120, a IDFT circuit 130, and a modulation circuit 140.

The encoding circuits $440_i$ are respectively constituted by the RSE circuits $102_i$, interleave circuits $^{104}i$, Trellis coding circuits (TCM circuits) $110_i$, and mapping circuits $106_i$.

The signal transmitting apparatus 44 comprises a signal transmitting apparatus of a type of OFDM modulation system by these components similar to the signal transmitting apparatus 40.

Figure 29:
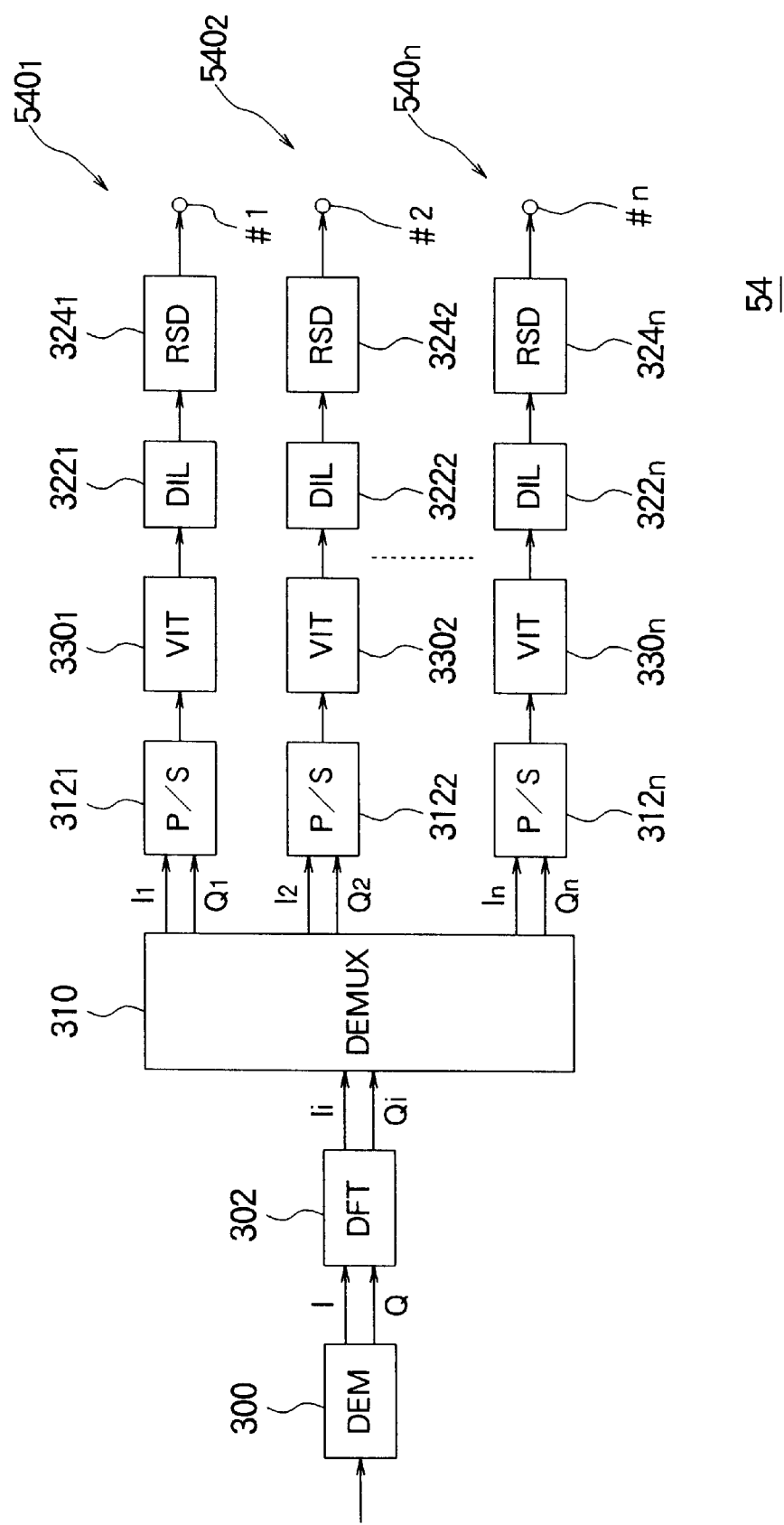
FIG. 29 is a view of the configuration of a signal receiving apparatus according to the sixth embodiment of the present invention.

FIG. 29 is a view of the configuration of the signal receiving apparatus 54 according to the sixth embodiment of the present invention.

As shown in FIG. 29, the signal receiving apparatus 54 is constituted by the demodulation circuit 300, DFT circuit 302, demultiplexing circuit 310, and n number of decoding circuits $540_i$.

The decoding circuits $540_i$ are respectively constituted by P/S transformation circuits $312_i$, Viterbi decoding circuits $330_i$, deinterleave circuits $322_i$, and RSD circuits $324_i$.

The signal receiving apparatus 54 can demodulate the signals sent from the signal transmitting apparatus 44 by the OFDM system by the above components similar to the signal receiving apparatus 50.

The configurations of the Trellis coding circuits (TCM circuit) $110_i$ are the same as those of FIG. 12 and FIG. 13. They perform the same operation. Further, the configuration of the mapping circuits $106_i$ are the same as that of the case of the first and second embodiments.

Below, an explanation will be made of the operation of the signal transmitting apparatus 44 and the signal receiving apparatus 54.

Similar to the signal transmitting apparatus 40, the data to be transmitted is preliminarily divided into n number of portions (input signals $IN_1$ to $IN_n$) in accordance with their significance before being input to the signal transmitting apparatus 44 and then are respectively input to the input terminals #i.

The input signals $IN_i$ respectively input to the input terminals #i are subjected to Reed-Solomon encoding at the RSE circuits $102_i$, interleaved at the interleave circuits $104_i$, subjected to Trellis coding at the TCM circuits $110_i$ with encoding rates corresponding to the input signals $IN_i$, and output to the mapping circuits $106_i$.

Note that, similar to the CNV circuits $112_i$ of the signal transmitting apparatus 40, the TCM circuits $110_i$ of the signal transmitting apparatus 44 perform the encoding with encoding rates smaller the higher the significance of the input signals $IN_i$ and with encoding rates higher the lower the significance of the input signals $N_i$.

On the basis of the encoded information, the amplitude and phase information corresponding to the modulated signal points are assigned at the mapping circuits $106_i$. The results are output as the mapping signals $MPS_i$ each consisting of two mutually orthogonal signal components I and Q to the multiplexing circuit 120.

The multiplexing circuit 120 multiplexes the mapping signals $MPS_i$ and outputs the result as the multiplexed signals to the IDFT circuit 130.

The orthogonal signal components I and Q of the multiplexed mapping signals $MPS_i$ are input to the IDFT circuit 130 as the modulated signals of the carrier.

In the IDFT circuit 130, the successively input frequency domain signals are defined as the modulated signals of the carrier wave, subjected to multi-value encoding, and modulated collectively for every n number of carriers, for example, 8 PSK modulation is carried out for 3-bit information and 16-QAM modulation is carried out for 4-bit information. The resultant signals are output as the sum of the time domain signals of the carriers. The signals of the time domain are subjected to orthogonal modulation in the modulation circuit 140.

Figure 30:
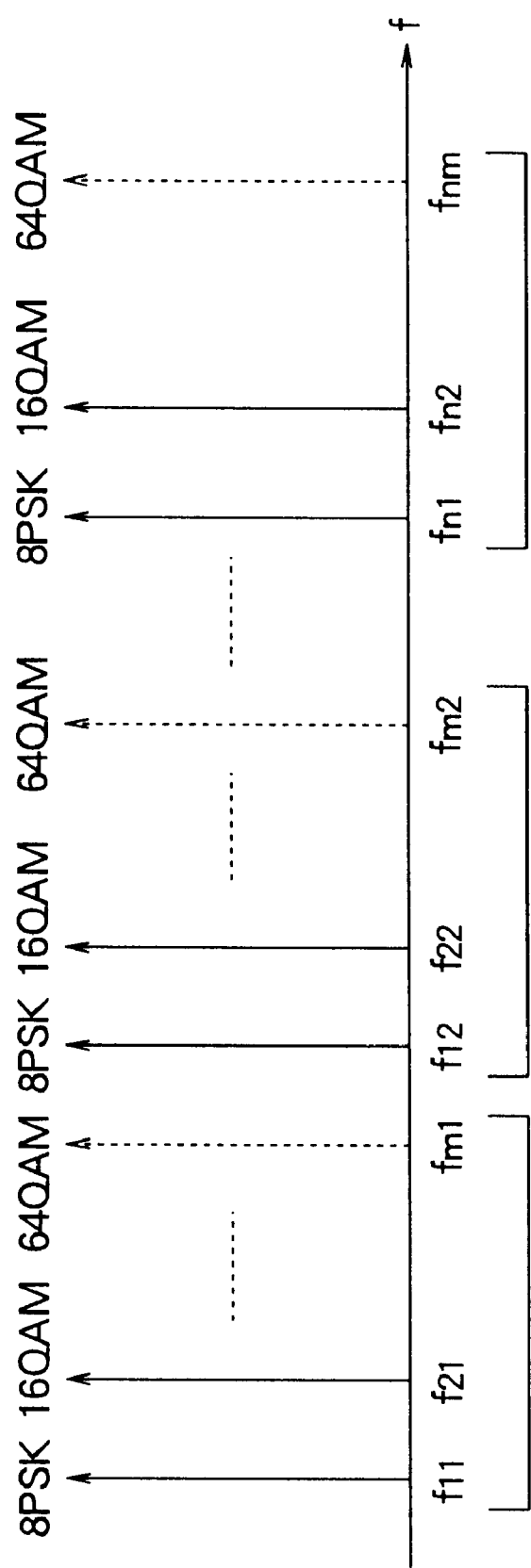
FIG. 30 is a view of the assignment of the carrier waves.

FIG. 30 is a view of the assignment of the carriers. As shown in FIG. 30, when assuming that the number of the carrier signals to be assigned to the respective n number of input signals hierarchied at the signal transmission apparatus 44 is m (m is an integer), the total number of the carriers of the OFDM modulation becomes N=m×n. However, it is not necessary that the number of the m number of carriers be the same for the respective n number of classes of input signals by the IDFT processing of the IDFT circuit 130.

As shown in FIG. 30, among the n×m=N number of carrier signals of the frequencies $f_{11}$, $f_{21}$, ..., $f_{n1}$, $f_{12}$, $f_{22}$, ..., $f_{n2}$, ..., $f_{nm}$ respectively corresponding to the parallel signals contained in the multiplexed signals output from the multiplexing circuit 120, the frequency domain signals corresponding to the carrier signals of for example the frequencies $f_{11}$ to $f_{1m}$ are modulated by 8 PSK, and the frequency domain signals corresponding to the carrier signals of the frequencies $f_{21}$ to $f_{2m}$ are modulated by 16 QAM.

Figure 31:
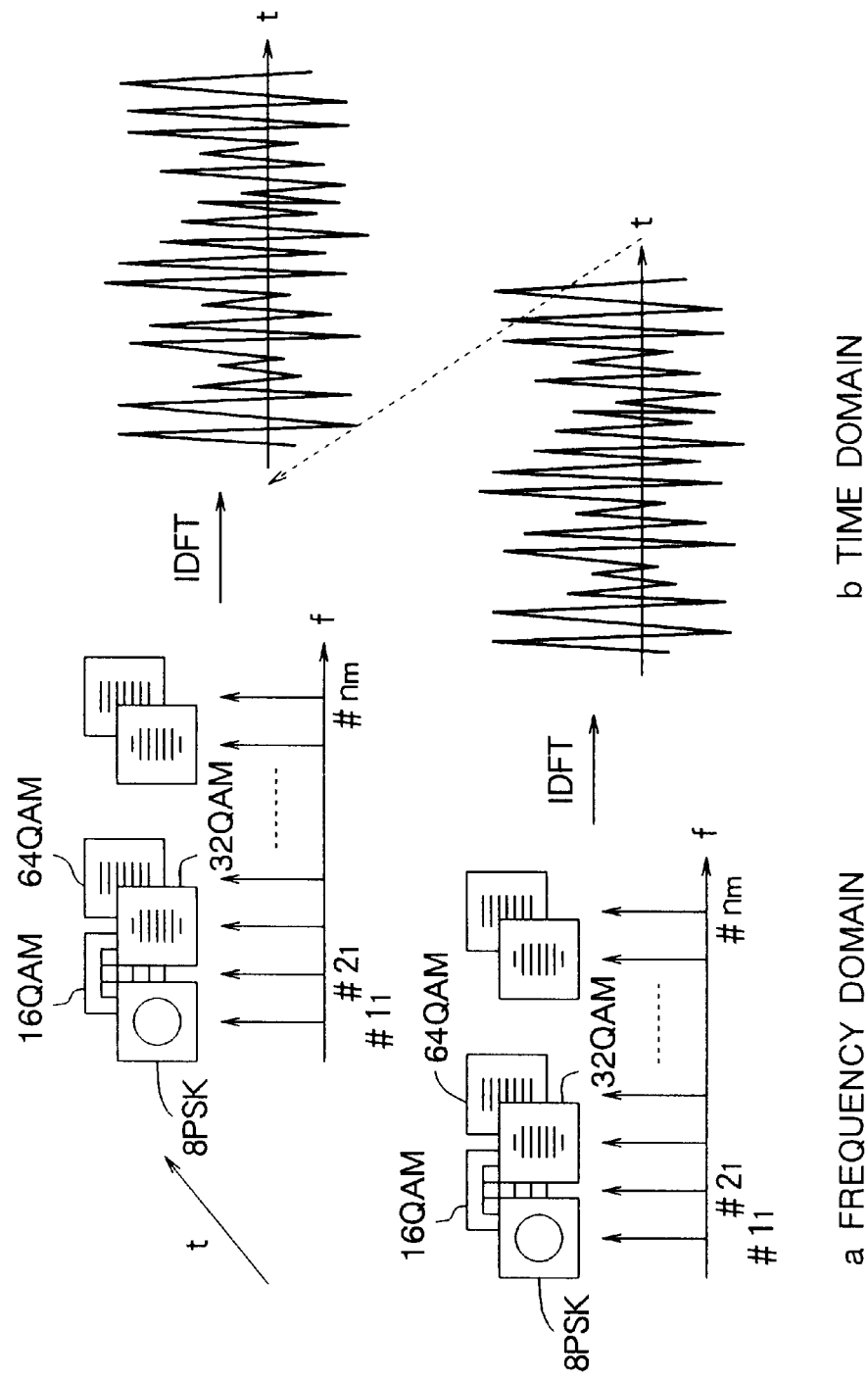
FIG. 31 is a view of the situation where the time domain signal generated in the IDFT circuit shown in FIG. 28 is output as the sum of the time direction to the modulation circuit.

FIG. 31 is a view of the situation where the time domain signals generated in the IDFT circuit 130 are output as the sum of the time direction to the modulation circuit 140.

When assuming that m number of carrier signals (carriers) are assigned to a respective n number of hierarchied input signals, the total number of the carrier signals of the OFDM modulation becomes N=n×m. When the signals input to the input terminals #i are assigned to the (j×n+i)-th ($0 \leq j \leq m-1$; j is an integer) carrier signal as shown in FIG. 23, the influence of selective fading etc. can be reduced by the interleave effect of the frequency. In the IDFT circuit 130, the successively input frequency domain PSK and QAM-modulated information $\#1_m$, $\#2_m$..., $\#n_m$ are transformed to the signals of the time domain in units of symbols by transformation by IDFT and further output as the sum of the time direction. They are respectively subjected to multi-value encoding for every n number of carrier signals (for every symbol) and collectively modulated. The signal of the sum of the signals of the time domain of the respective carrier signals is generated and output in the time direction to the modulation circuit 140 in order for every symbol.

Below, an explanation will be made of the operation of the signal receiving apparatus 54.

The signal receiving apparatus 54, which receives the time domain signals from the signal transmitting apparatus 44, performs substantially the reverse processing to that of the signal transmitting apparatus 44 on the time domain signals similar to the signal receiving apparatus 50 to decode the input signals $IN_i$.

The time domain signals transmitted to the signal receiving apparatus 54 are demodulated at the demodulation circuit 300, transformed to the signals of the frequency domain at the DFT circuit 302, demultiplexed for every time slot at the demultiplexing circuit 310, and output as the demultiplexed signals DS, containing the mutually orthogonal orthogonal signal components I and Q to the P/S transformation circuits $312_i$ of the decoding circuits $540_i$.

The demultiplexed signals $DS_i$ input to the P/S transformation circuits $312_i$ are transformed to signals of the serial format, subjected to Viterbi decoding by the Viterbi decoding circuits $330_i$, subjected to the reverse processing to that of the interleave circuits $104_i$ by the deinterleave circuits $322_i$, subjected to Reed-Solomon decoding by the RSD circuits $324_i$, decoded to the input signals $IN_i$ before transmission, and output from the output terminals #i.

As mentioned above, the signal transmitting apparatus 44 can ensure transmission even in a case where the state of reception becomes poor (C/N ratio of the received signal is low) at the signal receiving apparatus 54 side similar to the signal transmitting apparatus 40 and in addition can transmit the input signals $IN_i$ with a good efficiency.

Seventh embodiment

Below, a seventh embodiment of the present invention will be explained referring to FIG. 32 and FIG. 33.

Figure 32:
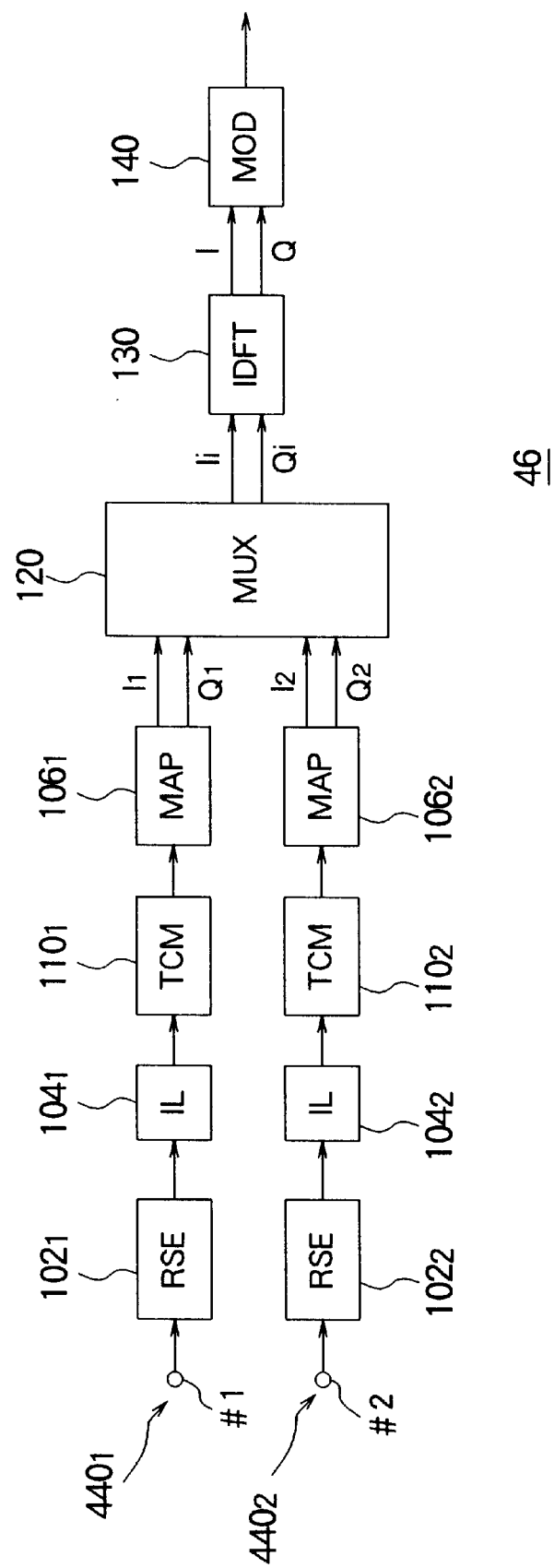
FIG. 32 is a view of the configuration of a signal transmitting apparatus according to a seventh embodiment of the present invention.

FIG. 32 is a view of the configuration of the signal transmitting apparatus 46 according to the seventh embodiment of the present invention.

As shown in FIG. 32, the signal transmitting apparatus 46 is constituted by two encoding circuits $440_i$, a multiplexing circuit 120, an IDFT circuit 130, and a modulation circuit 140.

The encoding circuits $440_i$ are respectively constituted by RSE circuits $102_i$, interleave circuits $104_i$, TCM circuits $110_i$, and mapping circuits (MAP) $106_i$ (i=1, 2; the same below true in the seventh embodiment).

The configurations of the Trellis coding circuits (TCM circuits) $110_i$ are the same as those of FIG. 12 and FIG. 13. They perform the same operation. Further, the configurations of the mapping circuits $106_i$ are the same as those of the first and second embodiments.

The input signals $IN_i$ input to the input terminal i of the signal transmitting apparatus 46 are divided into two classes corresponding to their significance similar to the input signals input to the signal transmitting apparatus 42 shown in FIG. 26 in the fifth embodiment.

The components of the signal transmitting apparatus 46 correspond to the components of the signal transmitting apparatus 44 shown in FIG. 28 in the sixth embodiment given the same symbols, have the same functions, and perform the same operations.

Figure 33:
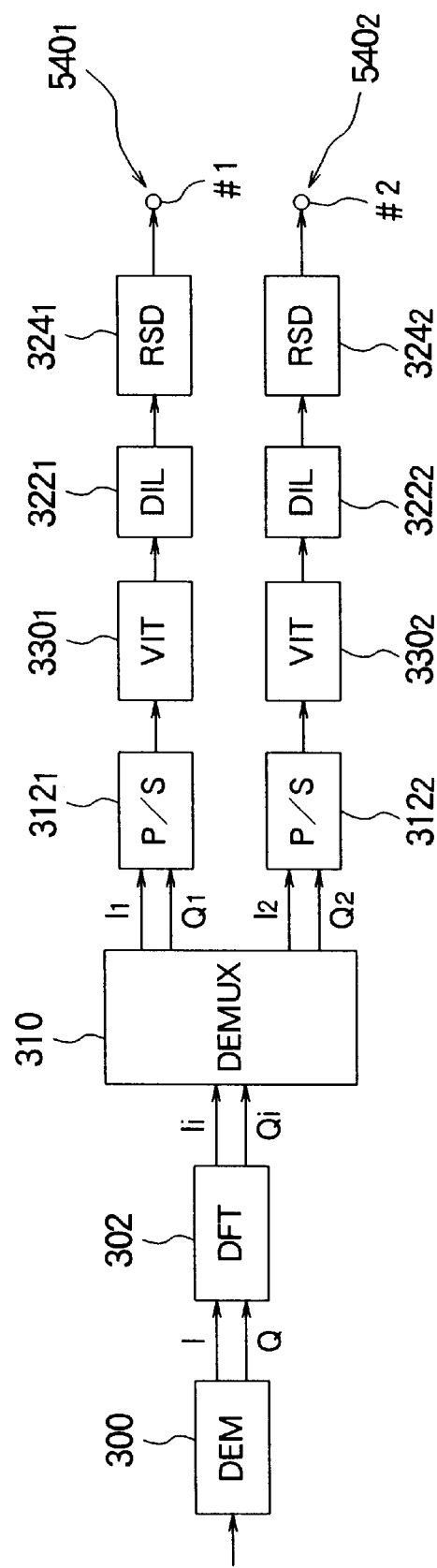
FIG. 33 is a view of the configuration of a signal receiving apparatus according to the seventh embodiment of the present invention.

FIG. 33 is a view of the configuration of the signal receiving apparatus 56 according to the seventh embodiment of the present invention.

As shown in FIG. 33, the signal receiving apparatus 56 is comprised of the signal receiving apparatus 54 shown in the sixth embodiment used for reception of a television signal of a digital format and where n=2.

The signal receiving apparatus 56 is constituted by the demodulation circuit 300, DFT circuit 302, demultiplexing circuit 310, and two decoding circuits $540_i$.

The decoding circuits $540_i$ are constituted by the P/S transformation circuits $312_i$, Viterbi decoding circuits $330_i$, deinterleave circuits $322_i$, and the RSD circuits $324_1$.

The components of the signal transmitting apparatus 56 correspond to the components of the signal transmitting apparatus 54 shown in FIG. 29 in the sixth embodiment given the same symbols, have the same functions, and perform the same operations.

Below, the operation of the signal transmitting apparatus 46 and the signal receiving apparatus 56 will be simply explained by taking as an example the signal transmission system 1 (FIG. 3) where the signal transmitting apparatus 46 and the signal receiving apparatus 56 are replaced by the signal transmitting apparatus 10 and the signal receiving apparatus 30.

The RSE circuits $102_i$ and the interleave circuits $104_i$ process the input signals $IN_1$ and $IN_2$ respectively input from input terminals #1 and #2 of the signal transmitting apparatus 46 and output the results as the interleaved signals $IS_1$ and $IS_2$ to the TCM circuits $110_i$, respectively.

The TCM circuit $110_1$ performs Trellis coding on the interleaved signal $IS_1$ with an encoding rate of 3/4 and outputs the result as the Trellis coded signal $TCS_1$ to the mapping circuit $106_1$.

The TCM circuit $110_2$ performs Trellis coding on the interleaved signal $IS_2$ with an encoding rate of 5/6 and outputs the result as the Trellis coded signal $TCS_2$ to the mapping circuit $106_2$.

The mapping circuits $106_1$ and $106_2$ perform mapping on the encoded signals and output the results as the parallel signals $PRS_1$ and $PRS_2$ to the multiplexing circuit 120.

The multiplexing circuit 120 multiplexes the parallel signals and outputs the same to the IDFT circuit 130.

The IDFT circuit 130 collectively performs 16-QAM modulation and 64-QAM modulation on the signals input from the multiplexing circuit and outputs the results to the modulation circuit 140.

The modulation circuit 140 modulates the carrier of the carrier frequency on the communication transmission line 20 by the signals input from the IDFT to generate the modulated signals and transmits the result to the signal receiving apparatus 56.

The modulated signals transmitted from the signal transmitting apparatus 46 are input to the demodulation circuit 300 of the signal demodulation device 56.

The modulated signals input to the demodulation circuit 300 are demodulated to the signals of the base band by a demodulation system corresponding to the modulation system in the modulation circuit 140 and output as the demodulated signals to the DFT circuit 302.

The demodulated signals of the base band input to the DFT circuit 302 are collectively demodulated by DFT transformation, demultiplexed for every time slot, and output as the demultiplexed signals $DS_i$ to the P/S transformation circuits $312_i$.

The demultiplexed signal $DS_1$ is decoded by Trellis decoding of an encoding rate of 3/4 and output as the convolutional decoded signal $CDS_1$ to the deinterleaving circuit $322_1$.

The demultiplexed signal $DS_2$ is decoded by Trellis decoding of the encoding rate of 5/6 and output as the convolutional decode signal $CDS_2$ to the deinterleave circuit $312_2$.

The convolutional decoded signals $CDS_i$ are deinterleaved by the deinterleave circuits $312_i$ and decoded to the original input signals $IN_i$ by the RSD circuits $324_i$.

When the signal transmitting apparatus 46 and the signal receiving apparatus 56 are used, the relationships among the C/N ratio on the reception side of the television signal, the S/N ratio of the reproduced television signal, and the possibility of the reproduction of data also become as shown in FIG. 16. Accordingly, even if the signal transmitting apparatus 46 and the signal receiving apparatus 56 are used in the signal transmission system 2 (FIG. 9), a similar effect to that of the case using the signal transmitting apparatus 12 and the signal receiving apparatus 32 can be obtained.

Note that, the modifications as shown in the fourth to sixth embodiments are also possible for the signal transmitting apparatus 44 and the signal receiving apparatus 54.

As explained above, according to the signal transmitting apparatus, signal receiving apparatus, and method of the same according to the present invention, when for example transmitting a television signal by the digital format, so-called "graceful degradation" which can provide a good television picture and sound when the signal level is large on the reception side and, at the same time, provide a television picture and sound of a certain degree of quality even in a case where the signal level is small can be realized.

Further, according to the signal transmitting apparatus, signal receiving apparatus, and method of the same according to the present invention, when the C/N ratio of the received signal on the reception side becomes less than a predetermined value, it does not become completely impossible to reproduce the data, and data can be reproduced with a S/N ratio in accordance with the C/N ratio.

Further, according to the signal transmitting apparatus, signal receiving apparatus, and method of the same according to the present invention, data can be transmitted with a throughput in accordance with the state of reception, that is, the C/N ratio of the received signal.

INDUSTRIAL APPLICABILITY

The signal transmitting apparatus, signal receiving apparatus, and signal transmitting and receiving apparatus according to the present invention can be utilized for the improvement of picture quality in the field of the digital television broadcasts via for example a wireless communication channel.

We claim:

1. A signal transmitting apparatus comprising:
   an encoding means for performing error correction coding on a plurality of input signal with encoding rates in accordance with the significance of the respective input signals to generate a plurality of encoded signals,
   a multiplexing means for multiplexing the plurality of encoded signals in a predetermined order, and
   a modulating means for modulating and outputting the multiplexed encoded signals.

2. The signal transmitting apparatus as set forth in claim 1, wherein
   the encoding means encodes the respective plurality of input signals such that the input signals with higher significance are encoded with smaller encoding rates, and wherein the encoding rate is the ratio of the amount of data before encoding to the amount of data after encoding.

3. The signal transmitting apparatus as set forth in claim 2, wherein
   the plurality of input signals constitute one signal as a whole and are divided into a number n of input signals in accordance with their significance and,
   corresponding to the n input signals, the encoding means has n systems of block coding means for performing block coding on the input signals, interleaving means for interleaving the input signals subjected to the block coding, and convolutional coding means for performing convolutional coding on the interleaved input signals.

4. The signal transmitting apparatus as set forth in claim 3, wherein
   the encoding rates are changed by changing the configurations of the n systems of convolutional coding means.

5. The signal transmitting apparatus as set forth in claim 3, wherein
   the apparatus further has a puncturing means for puncturing the signal encoded by the convolutional coding means, and the encoding rates are changed by the puncturing.

6. The signal transmitting apparatus as set forth in claim 2, wherein
   the plurality of input signals constitute one signal as a whole and are divided into a number n of input signals in accordance with their significance and,
   corresponding to the respective n input signals, the encoding means has n systems of means for performing block coding on the input signals, interleaving means for interleaving the input signals subjected to the block coding, and Trellis coding means for performing the Trellis coding on the interleaved input signals.

7. The signal transmitting apparatus as set forth in claim 6, wherein the modulating means modulates the multiplexed plurality of encoded signals by individual multi-value modulation methods corresponding to the significance of the input signals.

8. The signal transmitting apparatus as set forth in claim 7, wherein the modulating means performs the modulation by said multi-value modulation methods in which the higher the significance of the encoded signals, the smaller the amount of information per signal point and performs the modulation by said multi-value modulation methods in which the lower the significance of the encoded signals, the larger the amount of information per signal point.

9. The signal transmitting apparatus as set forth in claim 3, wherein the apparatus further has a transforming means for transforming the multiplexed encoded signals from signals of a frequency domain to signals of a time domain to generate time domain signals, and the modulating means performs orthogonal frequency division multiplexing (OFDM) modulation on the output from the converting means and outputs the result.

10. The signal transmitting apparatus as set forth in claim 9, wherein a plurality of OFDM modulation carriers are assigned to the respective plurality of input signals and the modulation is carried out by the same modulation system in all of the OFDM modulation carriers.

11. The signal transmitting apparatus as set forth in claim 6, wherein the apparatus further has a transforming means for transforming the multiplexed encoded signals from signals of a frequency domain to signals of a time domain to generate time domain signals and the modulating means performs orthogonal frequency division multiplexing (OFDM) modulation on the output from the transforming means and outputs the results.

12. The signal transmitting apparatus as set forth in claim 11, wherein a plurality of OFDM modulation carriers are assigned to the respective plurality of input signals, and the modulation is carried out changing the modulation system for the respective plurality of OFDM carriers corresponding to the respective input signals.

13. A signal receiving apparatus which receives a transmission signal obtained by multiplexing in a predetermined order a plurality of encoded signals prepared by performing error correction coding on the respective plurality of input signals with encoding rates in accordance with the significance of the respective plurality of input signals and by modulating the multiplexed plurality of encoded signals, comprising a demodulating means for demodulating the modulated transmission signal to generate a demodulated signal, a demultiplexing means for demultiplexing the multiplexed plurality of encoded signals from the demodulated signal, and a decoding means for decoding the respective demultiplexed plurality of encoded signals by error correction decoding systems corresponding to the respective plurality of encoded signals and outputting the same as decoded signals.

14. The signal receiving apparatus as set forth in claim 13, wherein the plurality of input signals constitute one signal as a whole and are divided into a number n of input signals in accordance with their significance, the respective plurality of input signals are encoded with smaller encoding rates for input signals with higher significance and encoded with larger encoding rates for input signals with lower significance, and wherein the encoding rate is the ratio of the amount of data before encoding to the amount of data after encoding, and the decoding means outputs only the decoded signals in which uncorrectable error is not generated among the n decoded signals.

15. The signal receiving apparatus as set forth in claim 14, wherein the respective multiplexed plurality of encoded signals are modulated by individual multi-value modulation methods corresponding to the significance of the input signals, and the demodulating means demodulates the received transmission signal by a demodulation system corresponding to the modulation system used for the modulation on the transmission side.

16. The signal receiving apparatus as set forth in claim 14, wherein the plurality of input signals constitute one signal as a whole and are divided into a number n of input signals in accordance with their significance, the respective n input signals are subjected to block coding, interleaving, and convolutional coding and then multiplexed and modulated, and the decoding means comprises a Viterbi decoding means for performing Viterbi decoding for the plurality of encoded signals demultiplexed by the demultiplexing means, a deinterleaving means for deinterleaving the signal subjected to the Viterbi decoding, and a block decoding means for performing block decoding on the deinterleaved signal.

17. The signal transmitting apparatus as set forth in claim 16, wherein the multiplexed encoded signals are transformed from signals of a frequency domain to signals of a time domain, a plurality of orthogonal frequency division multiplexing (OFDM) modulation carriers assigned to the respective plurality of input signals are used, and, at the same time, the OFDM modulation is performed by the same modulation system in all OFDM carriers and the demodulating means comprises an OFDM demodulating means for performing demodulation by the same demodulation system in all of the OFDM modulation carriers, and a transforming means for transforming the demodulated signals from time domain signals to frequency domain signals.

18. The signal receiving apparatus as set forth in claim 14, wherein the respective n input signals are subjected to block coding, interleaving, and Trellis coding, and then multiplexed and modulated, and the decoding means comprises a Viterbi decoding means for performing Viterbi decoding on the plurality of encoded signals demultiplexed by the demultiplexing means, a deinterleaving means for deinterleaving the Viterbi-decoded signal, and a block decoding means for performing block decoding on the deinterleaved signal.

19. The signal transmitting apparatus as set forth in claim 18, wherein the multiplexed encoded signals are transformed from signals of a frequency domain to signals of a time domain, a plurality of orthogonal frequency division multiplexing (OFDM) modulation carriers assigned to the respective plurality of input signals are used, and, at the same time, the OFDM modulation is performed changing the modulation system for each of the plurality of OFDM carriers corresponding to the respective input signals, and the demodulating means performs the demodulation changing the demodulation system for each of the plurality of OFDM carriers corresponding to the respective input signals.

20. A signal transmitting and receiving method which divides the digital signals constituting one signal as a whole into a plurality of input signals in accordance with their significance, applies error correction coding and modulation to them, and transmits the same to the reception side via a transmission line, wherein, on the transmission side, a plurality for encoded signals obtained by performing error correction coding on the respective plurality of divided input signals with encoding rates in accordance with the significance of the respective plurality of input signals are multiplexed in a predetermined order and the multiplexed plurality of encoded signals are modulated and transmitted, and, on the reception side, the received modulated transmission signal is demodulated, said plurality of encoded signals are demultiplexed from the demodulated signal, and the demultiplexed plurality of encoded signals are respectively decoded by error correction decoding systems corresponding to the respective plurality of encoded signals and output as decoded signals.

21. The signal transmitting and receiving method as set forth in claim 20, wherein in the error correction coding on the transmission side, the higher the significance of the input signal, the smaller the encoding rate by which the input signal is encoded and the lower the significance of the input signal, the larger the encoding rate by which the encoding is carried out.

22. The signal transmitting and receiving method as set forth in claim 20, wherein on the transmission side, the respective multiplexed plurality of encoded signals are modulated by individual multi-value modulation methods in accordance with the significances of the input signals, and, on the reception side, the received transmission signal is demodulated by demodulation systems corresponding to the modulation systems by which the received transmission signal was modulated on the transmission side.

23. The signal transmitting and receiving method as set forth in claim 22, wherein on the transmission side, the higher the significance of the encoded signal, the smaller the amount of information per signal point of the multi-value modulation method by which the modulation is carried out and the lower the significance of the encoded signal, the larger the amount of information per signal point of the multi-value modulation method by which the modulation is carried out.

24. The signal transmitting and receiving method as set forth in claim 21, wherein on the transmission side, the multiplexed encoded signals are transformed from signals of a frequency domain to signals of a time domain, the transformed signals are subjected to orthogonal frequency division multiplexing (OFDM) modulation and output, and on the reception side, the received signals are subjected to OFDM demodulation, and the demodulated signals are transformed from signals of the time domain to signals of the frequency domain and demultiplexed to the plurality of encoded signals.

25. The signal transmitting and receiving method as set forth in claim 24, wherein on the transmission side, as the error correction coding, block coding, interleaving, and convolutional coding are carried out, and, on the reception side, as the error correction decoding, Viterbi decoding, deinterleaving, and block decoding are carried out.

26. The signal transmitting and receiving method as set forth in claim 25, wherein on the transmission side, a plurality of orthogonal frequency division multiplexing (OFDM) modulation carriers are assigned to the respective plurality of input signals and the modulation is carried out by the same modulation system in all OFDM modulation carriers.

27. The signal transmitting and receiving method as set forth in claim 24, wherein on the transmission side, as the error correction coding, block coding, interleaving, and Trellis coding are carried out and, on the reception side, as the error correction decoding, Viterbi decoding, deinterleaving, and block decoding are carried out.

28. The signal transmitting and receiving method as set forth in claim 27, wherein on the transmission side, a plurality of orthogonal frequency division multiplexing (OFDM) modulation carriers are assigned to the respective plurality of input signals, and the modulation is carried out while changing the modulation system for each of the plurality of OFDM carriers corresponding to the respective input signals.

* * * * *